(12) United States Patent
Broekaert et al.

(10) Patent No.: US 12,545,929 B2
(45) Date of Patent: Feb. 10, 2026

(54) LACTAM-MODIFIED ADENO-ASSOCIATED VIRUS VECTORS

(71) Applicant: Coave Therapeutics, Paris (FR)

(72) Inventors: Willem Broekaert, Dilbeek (BE); Melanie Glossop, Canterbury (GB); Karl Gibson, Canterbury (GB); Nicolas Ferry, Boulogne Billancourt (FR); Gaëlle Lefèvre, Bourg-la-Reine (FR)

(73) Assignee: Coave Therapeutics, Paris (FR)

( * ) Notice: Subject to any disclaimer, the term of this patent is extended or adjusted under 35 U.S.C. 154(b) by 775 days.

(21) Appl. No.: 17/741,666

(22) Filed: May 11, 2022

(65) Prior Publication Data

US 2022/0380803 A1    Dec. 1, 2022

Related U.S. Application Data

(60) Provisional application No. 63/187,648, filed on May 12, 2021.

(51) Int. Cl.
| | | |
|---|---|---|
| *C12N 15/86* | (2006.01) | |
| *C07D 205/08* | (2006.01) | |
| *A61K 48/00* | (2006.01) | |

(52) U.S. Cl.
CPC ........... *C12N 15/86* (2013.01); *C07D 205/08* (2013.01); *A61K 48/00* (2013.01); *C12N 2750/14121* (2013.01); *C12N 2750/14122* (2013.01); *C12N 2750/14143* (2013.01); *C12N 2750/14151* (2013.01)

(58) Field of Classification Search
None
See application file for complete search history.

(56) References Cited

U.S. PATENT DOCUMENTS

| | | |
|---|---|---|
| 6,335,324 B1 | 1/2002 | Bisacchi et al. |
| 10,087,217 B2 | 10/2018 | Zhou et al. |
| 11,382,988 B2 | 7/2022 | Moullier et al. |
| 2004/0147502 A1 | 7/2004 | Bisacchi et al. |
| 2004/0180855 A1 | 9/2004 | Schumacher et al. |
| 2010/0098666 A1 | 4/2010 | Wright |
| 2014/0336245 A1 | 11/2014 | Mingozzi et al. |
| 2015/0017703 A1 | 1/2015 | Agnew |
| 2016/0297855 A1 | 10/2016 | Zhou et al. |
| 2017/0128594 A1 | 5/2017 | Wright |
| 2018/0201907 A1 | 7/2018 | Agnew |
| 2018/0371496 A1 | 12/2018 | Li et al. |
| 2019/0203227 A1 | 7/2019 | Ho et al. |
| 2019/0388557 A1 | 12/2019 | Mevel et al. |
| 2020/0157570 A1 | 5/2020 | Loiler |
| 2020/0172913 A1 | 6/2020 | Desai et al. |
| 2020/0224219 A1 | 7/2020 | Buning et al. |
| 2020/0325456 A1 | 10/2020 | Li et al. |
| 2020/0340012 A1 | 10/2020 | Mali et al. |
| 2020/0405639 A1 | 12/2020 | Zhang et al. |
| 2021/0162072 A1 | 6/2021 | Moullier et al. |
| 2022/0323610 A1 | 10/2022 | Moullier et al. |

FOREIGN PATENT DOCUMENTS

| | | |
|---|---|---|
| WO | WO-1999/67215 A1 | 12/1999 |
| WO | WO-2005/106046 A1 | 11/2005 |
| WO | WO-2008/128251 A1 | 10/2008 |
| WO | WO-2011/082285 A1 | 7/2011 |
| WO | WO-2013/078400 A1 | 5/2013 |
| WO | WO-2013/112778 A1 | 8/2013 |
| WO | WO-2015/048534 A1 | 4/2015 |
| WO | WO-2017/053629 A2 | 3/2017 |
| WO | WO-2017/212019 A1 | 12/2017 |
| WO | WO-2018/035503 A1 | 2/2018 |
| WO | WO-2018/191750 A2 | 10/2018 |
| WO | WO-2018/226602 A1 | 12/2018 |
| WO | WO-2019/032917 A1 | 2/2019 |
| WO | WO-2019/063747 A1 | 4/2019 |
| WO | WO-2019/126356 A1 | 6/2019 |
| WO | WO-2021/005210 A1 | 1/2021 |
| WO | WO-2022/096681 A1 | 5/2022 |

OTHER PUBLICATIONS

Nicolson et al., "Identification and Validation of Small Molecules That Enhance Recombinant Adeno-associated Virus Transduction following High-Throughput Screens", J. Virology, vol. 90, No. 16, 7019-7031 (2016) (Year: 2016).*
Mehta et al., "2-Azetindinone—A New Profile of Various Pharmacological Activities", Eu. J. of Med. Chem., vol. 45. Issue 12, pp. 551-5560 (Dec. 2010)); (Year: 2010).*
Beutler , "AAV Provides an Alternative for Gene Therapy of the Peripheral Sensory (or Central) Nervous System", Mol Ther. Apr. 2010; 18(4): 670-673. (Year: 2010).*
Thadani et al. ACS Synth Biol (2020) 9(3):461-467 (Year: 2020).*
Pham et al Nanoscale 2024 16(29):13820-13833 (Year: 2024).*
Albright, B. H. et al., Mapping the structural determinants required for AAVrh.10 Transport across the BBB, Mol. Ther., 26(2):510-523 (2018).
Asano, S. et al., Preparation and Activities of Macromolecule Conjugates of the CCR5 Antagonist Maraviroc, ACS Med. Chem. Lett., 5:133-137 (2014).
Aschauer, D. F. et al., Analysis of Transduction Efficiency, Tropism and Axonal Transport of AAV Serotypes 1, 2, 5, 6, 8 and 9 in the Mouse Brain, PLoS One. 8(9):e76310 (2013).
Asokan, A. et al., Reengineering a receptor footprint of adeno-associated virus enables selective and systemic gene transfer to muscle, Nat. Biotechnol., 28(1):79-82 (2010).
Bartel, M. A. et al., Directed evolution of novel adeno-associated viruses for therapeutic gene delivery, Gene Ther., 19(6):694-700 (2012).
Bevan, A. K. et al., Systemic Gene Delivery in Large Species for Targeting Spinal Cord, Brain, and Peripheral Tissues for Pediatric Disorders, Mol Ther., 19(11):1971-80 (2011).

(Continued)

Primary Examiner — Marcia S Noble
(74) Attorney, Agent, or Firm — WCF IP

(57) ABSTRACT

The present invention relates to adeno-associated virus (AAV) vectors modified by the covalent coupling of at least one compound comprising a lactam moiety (e.g., β-lactam) to at least one amino group of an amino acid residue of the capsid of the AAV vectors. The AAV vectors are useful in transducing a cell, especially for gene therapy.

18 Claims, 9 Drawing Sheets

Specification includes a Sequence Listing.

(56) References Cited

OTHER PUBLICATIONS

Boutin, S. et al., Prevalence of Serum IgG and Neutralizing Factors Against Adeno-Associated Virus AAV Types 1, 2, 5, 6, 8, and 9 in the healthy population, Implications for Gene Therapy Using AAV Vectors, Hum. Gene Ther. 21(6):704-12 (2010).
Burger, C. et al., Recombinant AAV Viral Vectors Pseudotyped with Viral Cpasids from Serotypes 1, 2, and 5 Display Differential Efficiency and Cell Tropism after Delivery to Different Regions of the Central Nervous System, Mol. Ther., 10(2):302-317 (2004).
Cearley, C. N. and Wolfe, J. H., Transduction Characteristics of Adeno-associated Virus Vectors Expressing Cap Serotypes 7, 8, 9, and Rh10 in the Mouse Brain, Mol. Ther., 13(3):528-37 (2006).
Cearley, C. N. et al., Expanded Repertoire of AAV Vector Serotypes Mediate Unique Patterns of Transduction in Mouse Brain, Mol. Ther., 16(10):1710-8 (2008).
Ellinwood, M. N. et al., Safe, Efficient, and Reproducible Gene Therapy of the Brain in the Dog Models of Sanfilippo and Hurler Syndromes, Mol. Ther., 19(2):251-259 (2011).
Foust, K. D. et al., Intravascular AAV9 preferentially targets neonatal neurons and adult astrocytes, Nat. Biotechnol., 27(1):59-65 (2009).
Fu, H. et al., Differential Prevalence of Antibodies Against Adeno-Associated Virus in Healthy Children and Patients with Mucopolysaccharidosis III, Perspective for AAV-Mediated Gene Therapy, Hum. Gene Ther. Clin. Dev., 28:187-96 (2017).
Girod, A. et al., Genetic capsid modifications allow efficient retargeting of adeno-associated virus type 2. Nat. Med., 5(9):1052-1056 (1999).
Gray, S. J. et al., Directed Evolution of a Novel Adeno-associated Virus AAV Vector That Crosses the Seizure-compromised Blood-Brain Barrier BBB, Mol. Ther., 18(3):570-8 (2010).
Gray, S. J. et al., Global CNS Gene Delivery and Evasion of Anti-AAV Neutralizing Antibodies by Intrathecal AAV Administration in Non-Human Primates, Gene Ther. 20(4):450-9 (2013).
Gray, S. J. et al., Preclinical Differences of Intravascular AAV9 Delivery to Neurons and Glia, A comparative Study of Adult Mice and Nonhuman Primates, Mol. Ther., 19(6):1058-69 (2011).
Hinderer, C. et al., Evaluation of Intrathecal Routes of Administration for Adeno-Associated Viral Vectors in Large Animals, Hum. Gene Thera., 29(1):15-24 (2018).
Hocquemiller, M. et al., Adeno—Associated Virus-Based Gene Therapy for CNS Diseases, Human Gene Therapy, 27(7):478-496 (2016).
Hordeaux, J. et al., The Neurotropic Properties of AAV-PHP.B Are Limited to C57BL/6J Mice, Mol. Ther., 26(3):664-668 (2018).
Hudry, E. et al., Exosome-associated AAV vector as a robust and convenient neuroscience tool, Gene Ther., 23:380-92 (2016).
International Search Report for PCT/EP2021/080832, 9 pages (mailed Feb. 21, 2022).
Katrekar, D. et al., Oligonucleotide conjugated multifunctional adeno-associated viruses, Sci. Rep., 8(3589):1-8 (2018).
Koerber, J. T. et al., Construction of diverse adeno-associated viral libraries for directed evolution of enhanced gene delivery vehicles, Nat. Protoc., 1(2):701-6 (2006).
Kwon, I. and Schaffer, D., Designer Gene Delivery Vectors, Molecular Engineering and Evolution of Adeno-Associated Viral Vectors for Enhanced Gene Transfer, Pharm. Res., 25(3):489-99 (2008).
Kye-Il, J. et al., Enhanced Real-Time Monitoring of Adena-Associated Virus Trafficking by Virus-Quantum Dot Conjugates, ACS Nano, 5(5):3523-3535 (2011).
Lee, G. K. et al., PEG Conjugation Moderately Protects Adeno-Associated Viral Vectors Against Antibody Neutralization, Biotechnol. Bioeng., 92:24-34 (2005).
Liguore, W. A. et al., AAV-PHP.B Administration Results in a Differential Pattern of CNS Biodistribution in Non-human Primates Compared with Mice, Mol. Thera., 27(11):2018-2037 (2019).
Lykken, E. A. et al., Recent progress and considerations for AAV gene therapies targeting the central nervous system, J. Neurodev. Disord., 10(1):16 (2018).
Maguire, C. A. et al., Microvesicle-associated AAV Vector as a Novel Gene Delivery System, Mol. Ther., 20:960-71 (2012).
Maheshri, N. et al., Directed evolution of adeno-associated virus yields enhanced gene delivery vectors, Nat. Biotechnol., 24(2):198-204 (2006).
Marsic, D. and Zolotukhin, S., Altering Tropism of rAAV by Directed Evolution, Methods Mole. Biol., 1382:151-173 (2016).
Mccurdy, V. J. et al., Sustained normalization of neurological disease after intracranial gene therapy in a feline model, Sci. Transl. Med., 6(231):1-24 (2014).
Mcphee, S. W. J. et al., Immune responses to AAV in a phase I study for Canavan disease, J. Gene Med., 8:577-588 (2006).
Mével, M. et al., Chemical modification of the adeno-associated virus capsid to improve gene delivery, Chem. Sci., 11:1122-1131 (2020).
Mevel, M. et al., Chemical modification of the adeno-associated virus capsid to improve gene delivery, Chem. Sci., 10 pages (2019).
Miyake, N. et al., Global gene transfer into the CNS across the BBB after neonatal systemic delivery of single-stranded AAV vectors, Brain Res., 1389:19-26 (2011).
Niethammer, M. et al., Long-term follow-up of randomized AAV2-GAD gene therapy trial for Parkinson's diease, JCI Insight, 2(7):e90133 (2017).
Perabo, L. et al., Artificial Evolution with Adeno-Associated Viral Libraries, Comb. Chem. High Throu. Screen., 11:118-126 (2008).
Rabinowitz, J. E. et al., Insertional Mutagenesis of AAV2 Capsid and the Production of Recombinant Virus, Virology, 265(2):274-85 (1999).
Raja, K. S. et al., Icosahedral Virus Particles as Polyvalent Carbohydrate Display Platforms, ChemBioChem, 4:1348-1351 (2003).
Samaranch, L. et al., AAV9-mediated Expression of a Non-self Protein in Nonhuman Primate CNS Triggers Widespread Neuroinflammation Driven by Antigen-presenting Cell Transduction, Mol. Ther., 22(2):329-37 (2014).
Samaranch, L. et al., Adeno-Associated Virus Serotype 9 Transduction in the CNS of Nonhuman Primates, Hum. Gene Ther., 23(4):382-9 (2012).
Sato, S. et al., Chemically Programmed Antibodies As HIV-1 Attachment Inhibitors, ACS Med. Chem. Lett., 4:460-465 (2013).
Schaffer, D. V. and Maheshri, N., Directed Evolution of AAV Mutants for Enhanced Gene Delivery, 26th Annual International Conference of the IEEE EMBS, San Francisco, CA, 3520-3523 (Sep. 2004).
Shen, S. et al., Engraftment of a Galactose Receptor Footprint onto Adeno-associated Viral Capsids Improves Transduction Efficiency, J. Biol. Chem., 288(40):28814-23 (2013).
Sletten, E. M. and Bertozzi, C. R., Bioorthogonal chemistry: fishing for selectivity in a sea of functionalit, Angew. Chem. Int. Ed. Engl., 48(38):6974-98 (2009).
Taymans, J-M. et al., Comparative analysis of adeno-associated viral vector serotypes 1, 2, 5, 7, and 8 in mouse brain, Hum. Gene Ther., 18(3):195-206 (2007).
Tse, L. V. et al., Structure-guided evolution of antigenically distinct AAV variants for immune evasion, Proc. Natl. Acad. Sci. USA, 114(24):E4812-E4821 (2017).
Vite, C. H. et al., Effective Gene Therapy for an Inherited CNS Disease in a Large Animal Model, Annals Neuro., 57(3):355-364 (2005).
Watakabe, A. et al., Comparative analyses of AAV vector serotypes 1, 2, 5, 8 and 9 in marmoset, mouse and macaque cerebral cortex, Neurosci. Res., 93:144-57 (2015).
Wobus, C. E. et al., Monoclonal Antibodies against the Adena-Associated Virus Type 2 (AAV-2) Capsid: Epitope Mapping and Identification of Capsid Domains Involved in AAV-2-Cell Interaction and Neutralization of AAV-2 Infection, Jrnl. Viro., 74(19):9281-9293 (2000).
Zuleta, A. et al., AAV-mediated delivery of the transcription factor XBP1s into the striatum reduces mutant Huntingtin aggregation in

(56) References Cited

OTHER PUBLICATIONS a mouse model of Huntington's disease, Biochem. Biophys. Res. Comm., 420(3):558-563 (2012).

* cited by examiner

SEQUENCE LISTING

<160> NUMBER OF SEQ ID NOS: 2

<210> SEQ ID NO 1
<211> LENGTH: 1611
<212> TYPE: DNA
<213> ORGANISM: Homo sapiens

<400> SEQUENCE: 1

```
atggagtttt caagtccttc cagagaggaa tgtcccaagc ctttgagtag ggtaagcatc      60
atggctggca gcctcacagg attgcttcta cttcaggcag tgtcgtgggc atcaggtgcc     120
cgcccctgca tccctaaaag cttcggctac agctcggtgg tgtgtgtctg caatgccaca     180
tactgtgact ccttttgaccc cccgaccttt cctgcccttg gtaccttcag ccgctatgag     240
agtacacgca gtgggcgacg gatggagctg agtatggggc ccatccaggc taatcacacg     300
ggcacaggcc tgctactgac cctgcagcca gaacagaagt tccagaaagt gaagggattt     360
ggaggggcca tgacagatgc tgctgctctc aacatccttg ccctgtcacc ccctgcccaa     420
aatttgctac ttaaatcgta cttctctgaa gaaggaatcg gatataacat catccggta      480 cccatggcca gctgtgactt ctccatccgc acctacacct atgcagacac ccctgatgat     540
ttccagttgc acaacttcag cctcccagag gaagatacca agctcaagat ccccctgatt     600
caccgagccc tgcagttggc ccagcgtccc gtttcactcc ttgccagccc ctggacatca     660
cccacttggc tcaagaccaa tggagcggtg aatgggaagg ggtcactcaa gggacagccc     720
ggagacatct accaccagac ctgggccaga tactttgtga agttcctgga tgcctatgct     780
gagcacaagt tacagttctg ggcagtgaca gctgaaaatg agccttctgc tgggctgttg     840
agtggatacc ccttccagtg cctgggcttc acccctgaac atcagcgaga cttcattgcc     900
cgtgacctag gtcctacccg cgccaacagt actcaccaca atgtccgcct actcatgctg     960
gatgaccaac gcttgctgct gccccactgg gcaaaggtgg tactgacaga cccagaagca    1020
gctaaatatg ttcatggcat tgctgtacat tggtacctgg actttctggc tccagccaaa    1080
gccacctagg gggagacaca ccgcctgttc cccaacacca tgctctttgc ctcagaggcc    1140
tgtgtgggct ccaagttctg ggagcagagt gtgcggctag gtcctggga tcgagggatg    1200 cagtacagcc acagcatcat cacgaacctc ctgtaccatg tggtcggctg gaccgactgg    1260
aaccttgccc tgaaccccga aggaggaccc aattgggtgc gtaactttgt cgacagtccc    1320
```

-continued

```
atcattgtag acatcaccaa ggacacgttt tacaaacagc ccatgttcta ccaccttggc    1380
cacttcagca agttcattcc tgagggctcc cagagagtgg ggctggttgc cagtcagaag    1440
aacgacctgg acgcagtggc actgatgcat cccgatggct ctgctgttgt ggtcgtgcta    1500
aaccgctcct ctaaggatgt gcctcttacc atcaaggatc ctgctgtggg cttcctggag    1560
acaatctcac ctggctactc cattcacacc tacctgtggc gtcgccagtg a             1611
```

<210> SEQ ID NO 2
<211> LENGTH: 536
<212> TYPE: PRT
<213> ORGANISM: Homo sapiens
<400> SEQUENCE: 2

```
Met Glu Phe Ser Ser Pro Ser Arg Glu Glu Cys Pro Lys Pro Leu Ser
1               5                   10                  15

Arg Val Ser Ile Met Ala Gly Ser Leu Thr Gly Leu Leu Leu Leu Gln
                20                  25                  30

Ala Val Ser Trp Ala Ser Gly Ala Arg Pro Cys Ile Pro Lys Ser Phe
            35                  40                  45

Gly Tyr Ser Ser Val Val Cys Val Cys Asn Ala Thr Tyr Cys Asp Ser
        50                  55                  60

Phe Asp Pro Pro Thr Phe Pro Ala Leu Gly Thr Phe Ser Arg Tyr Glu
65                  70                  75                  80

Ser Thr Arg Ser Gly Arg Arg Met Glu Leu Ser Met Gly Pro Ile Gln
                85                  90                  95

Ala Asn His Thr Gly Thr Gly Leu Leu Leu Thr Leu Gln Pro Glu Gln
            100                 105                 110

Lys Phe Gln Lys Val Lys Gly Phe Gly Gly Ala Met Thr Asp Ala Ala
        115                 120                 125

Ala Leu Asn Ile Leu Ala Leu Ser Pro Pro Ala Gln Asn Leu Leu Leu
130                 135                 140

Lys Ser Tyr Phe Ser Glu Glu Gly Ile Gly Tyr Asn Ile Ile Arg Val
145                 150                 155                 160

Pro Met Ala Ser Cys Asp Phe Ser Ile Arg Thr Tyr Thr Tyr Ala Asp
                165                 170                 175

Thr Pro Asp Asp Phe Gln Leu His Asn Phe Ser Leu Pro Glu Glu Asp
            180                 185                 190

Thr Lys Leu Lys Ile Pro Leu Ile His Arg Ala Leu Gln Leu Ala Gln
        195                 200                 205

Arg Pro Val Ser Leu Leu Ala Ser Pro Trp Thr Ser Pro Thr Trp Leu
210                 215                 220

Lys Thr Asn Gly Ala Val Asn Gly Lys Gly Ser Leu Lys Gly Gln Pro
225                 230                 235                 240

Gly Asp Ile Tyr His Gln Thr Trp Ala Arg Tyr Phe Val Lys Phe Leu
                245                 250                 255

Asp Ala Tyr Ala Glu His Lys Leu Gln Phe Trp Ala Val Thr Ala Glu
            260                 265                 270

Asn Glu Pro Ser Ala Gly Leu Leu Ser Gly Tyr Pro Phe Gln Cys Leu
        275                 280                 285

Gly Phe Thr Pro Glu His Gln Arg Asp Phe Ile Ala Arg Asp Leu Gly
290                 295                 300

Pro Thr Leu Ala Asn Ser Thr His His Asn Val Arg Leu Leu Met Leu
305                 310                 315                 320

Asp Asp Gln Arg Leu Leu Leu Pro His Trp Ala Lys Val Val Leu Thr
```

```
                    325                 330                 335
Asp Pro Glu Ala Ala Lys Tyr Val His Gly Ile Ala Val His Trp Tyr
                340                 345                 350

Leu Asp Phe Leu Ala Pro Ala Lys Ala Thr Leu Gly Glu Thr His Arg
                355                 360                 365

Leu Phe Pro Asn Thr Met Leu Phe Ala Ser Glu Ala Cys Val Gly Ser
                370                 375                 380

Lys Phe Trp Gln Ser Val Arg Leu Gly Ser Trp Asp Arg Gly Met
385                 390                 395                 400

Gln Tyr Ser His Ser Ile Ile Thr Asn Leu Leu Tyr His Val Val Gly
                    405                 410                 415

Trp Thr Asp Trp Asn Leu Ala Leu Asn Pro Glu Gly Gly Pro Asn Trp
                420                 425                 430

Val Arg Asn Phe Val Asp Ser Pro Ile Ile Val Asp Ile Thr Lys Asp
                435                 440                 445

Thr Phe Tyr Lys Gln Pro Met Phe Tyr His Leu Gly His Phe Ser Lys
                450                 455                 460

Phe Ile Pro Glu Gly Ser Gln Arg Val Gly Leu Val Ala Ser Gln Lys
465                 470                 475                 480

Asn Asp Leu Asp Ala Val Ala Leu Met His Pro Asp Gly Ser Ala Val
                    485                 490                 495

Val Val Val Leu Asn Arg Ser Ser Lys Asp Val Pro Leu Thr Ile Lys
                500                 505                 510

Asp Pro Ala Val Gly Phe Leu Glu Thr Ile Ser Pro Gly Tyr Ser Ile
                515                 520                 525

His Thr Tyr Leu Trp Arg Arg Gln
                530                 535
```

LACTAM-MODIFIED ADENO-ASSOCIATED VIRUS VECTORS

CROSS-REFERENCE TO RELATED APPLICATIONS

This application claims the benefit of and priority to U.S. provisional application No. 63/187,648, filed May 12, 2021, which is herein incorporated by reference in its entirety.

FIELD OF INVENTION

The present invention relates to adeno-associated virus (AAV) vectors modified by the covalent coupling of at least one compound comprising a lactam (e.g., β-lactam) to at least one amino group of an amino acid residue of the capsid of the AAV vectors. In some embodiments, provided AAV vectors are useful in transducing a cell, especially for gene therapy.

SEQUENCE LISTING

The instant application contains a Sequence Listing which has been submitted electronically in ASCII format and is hereby incorporated by reference in its entirety. Said ASCII copy, created on Jul. 19, 2022, is named 2013857-0022_ST25.txt and is 6.91 kilobytes in size.

BACKGROUND OF INVENTION

Gene therapy is based on the genetic modification of cells to produce a therapeutic effect by the delivery of nucleic acid into patient's cells. Indeed, sometimes the whole or part of a gene is defective or missing from birth, or a gene can change or mutate during life. Any of these variations can disrupt how proteins are synthesized, which can contribute to health problems or diseases. By gene therapy, a defective gene or genetic sequence that causes a medical problem can be replaced with a healthy version that doesn't; genes (or sequences) can also be added to help the body fight or treat disease; or genes (or sequences) that are causing problems can be knocked down or knocked out. Thereby, gene therapy can be used to treat inherited or acquired diseases.

The delivery of new genes (or sequences) into cells can be carried-out by various methods, such as using a vector which is genetically engineered to deliver the sequence (e.g., gene) of interest. Viral vectors can be used for that purpose, especially adeno-associated virus (AAV) vectors. AAV vectors have proven to be reliable, efficient, versatile, and safe tools to deliver a transgene of interest to a variety of tissues. AAV vectors present the advantage of having a relatively broad tropism, a high transduction efficacy, a persistent episomal expression, and a high safety profile, in particular because wild-type AAV is not associated with any human diseases.

Clinical trials of gene therapy using AAV vectors were conducted or are ongoing for several types of diseases. Nevertheless, certain trials have shown some limitations of these AAV vectors including immunogenicity, unselective distribution, and reduced therapeutic index.

In particular, it was recently evidenced that humoral immunity can preexist to certain AAV serotypes, especially AAV of serotype 2. Therefore, preexisting anti-AAV neutralizing antibodies can preclude transduction in targeted tissues, resulting in a lack of efficacy, especially upon systemic administration. Moreover, when it is necessary to re-administer the AAV vector to complete the treatment, it can be precluded by the appearance of neutralizing antibodies following the first administration. Consequently, AAV vectors capable of avoiding immune detection would be highly desirable.

Another limitation of AAV vectors is linked to their broad tropism. Indeed, the broad distribution of AAV vectors leads to transgene expression in tissues other than targeted ones, thus lacking specificity. This can lead to reduced therapeutic index. Indeed, high doses of vectors may be required to achieve therapeutic efficacy in a given tissue. Such high doses pose a challenge not only for vector production but also by increasing the risk of immune response. Consequently, AAV vectors capable of ensuring cell-specific transduction would be highly desirable.

Various strategies have been explored in order to improve AAV vectors in order to evade the immune system and enhance cell transduction and cell specificity, especially by modifying the capsid proteins of the vectors. Such modifications of capsid proteins can be achieved by introducing mutations in surface-exposed amino acid residues of capsids of AAV vectors. Alternatively or additionally, chemical modification of viral capsids has been proposed in order to add a specific ligand on the capsid or to mask certain exposed amino acids. Such chemical modifications can be obtained, for example, by introducing a non-natural amino acid residue comprising a reactive functional group into the capsid proteins and then selectively coupling a ligand by orthogonal reaction with said reactive functional group. Another strategy is to perform a direct chemical modification on the viral capsid, without any preliminary mutation of the capsid proteins. For example, WO2017/212019 provides surface modified AAV vectors obtained by covalently coupling a ligand bearing a certain isothiocyanate group to an amino group present in an amino acid residue of the capsid proteins of the AAV, leading to improved gene transfer into specific cells. The modification of tyrosine residues of the AAV capsid is reported in WO2021/005210, which provides a method of chemically modifying tyrosine residues of the AAV capsid in order to modify immunogenicity of AAV vectors.

However, there is still a need for new methods for modifying the properties of AAV vectors in order to achieve efficient gene transduction, especially for gene therapy.

SUMMARY

Among other things, the present invention relates to an adeno-associated virus (AAV) vector comprising a moiety resulting from reaction of a compound comprising a lactam (e.g., β-lactam) with an amino group present within the capsid of the AAV vector (e.g., amino group of a lysine side chain).

In some aspects, the present invention relates to technologies for and/or methods of manufacturing a provided AAV.

In some aspects, the present invention provides an adeno-associated virus (AAV) vector comprising a moiety according to formula (II):

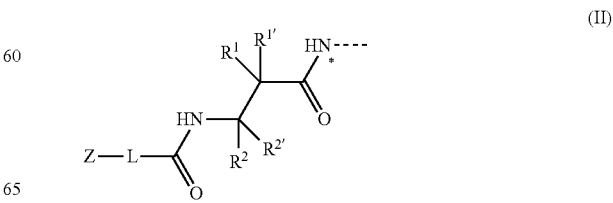

or a pharmaceutically acceptable salt thereof, wherein N*, -----, Z, L, $R^1$, $R^{1'}$, $R^2$ and $R^{2'}$, are as defined and described in classes and subclasses below and herein.

In some aspects, at least one N* is a nitrogen atom of an amino group of a lysine residue of the AAV vector's capsid.

In some aspects, Z comprises or consists of a cell-type specific ligand selected from the group consisting of saccharides, hormones, peptides, proteins or functionally active fragments thereof, membrane receptors or functionally active fragments thereof, antibodies or functionally active fragments thereof, spiegelmers, nucleic acid or peptide aptamers, vitamins, and drugs.

In some aspects, Z is a saccharide selected from the group consisting of monosaccharides, oligosaccharides, polysaccharides and derivatives thereof.

In some aspects, Z is selected from the group consisting of mannose, galactose, fucose, desosamine, N-acetylglucosamine, N-acetylgalactosamine, S6-galactose, S6-N-acetylgalactosamine, glucuronic acid, P6-galactose and P1-galactose.

In some aspects, Z comprises or consists of a steric shielding agent selected from the group consisting of polyethylene glycol, pHPMA, and polysaccharides.

In some aspects, L comprises an optionally substituted group comprising saturated or unsaturated, linear or branched $C_2$-$C_{40}$ hydrocarbon chains, polyethylene glycol, polypropylene glycol, pHPMA, PLGA, polymers of alkylene diamines, and combinations thereof.

In some aspects, L comprises a polyethylene glycol (PEG), comprising 2 to 40 ethylene glycol monomers.

In some aspects, L further comprises one or more aryl or heteroaryl groups.

In some aspects, L further comprises a phenyl.

In some aspects, L further comprises a 1,2,3-triazolyl.

In some aspects, the AAV vector comprises a moiety according to formula (IIa)

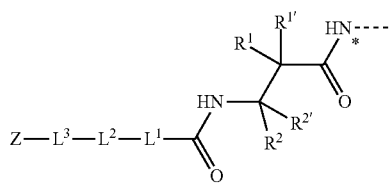

(IIa)

or a pharmaceutically acceptable salt thereof, wherein N*, -----, Z, $L^1$, $L^2$, $L^3$, $R^1$, $R^{1'}$, $R^2$ and $R^{2'}$, are as defined and described in classes and subclasses below and herein.

In some aspects, $L^1$ is optionally substituted phenyl.

In some aspects, $L^2$ is an optionally substituted 5-membered heteroaryl group comprising 1-3 heteroatoms independently selected from nitrogen, oxygen, or sulfur.

In some aspects, $L^2$ is triazolyl.

In some aspects, the AAV comprises a moiety according to formula (IIc):

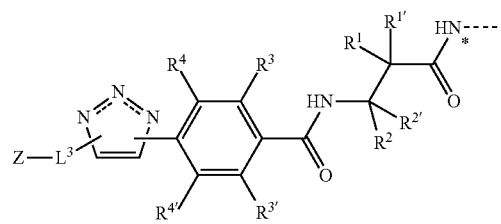

(IIc)

or a pharmaceutically acceptable salt thereof, wherein N*, -----, ==, Z, $L^3$, $R^1$, $R^{1'}$, $R^2$, $R^{2'}$, $R^3$, $R^{3'}$, $R^4$ and $R^{4'}$, are as defined and described in classes and subclasses below and herein.

In some aspects, $L^3$ is an optionally substituted group selected from the group consisting of saturated or unsaturated, linear or branched $C_2$-$C_{40}$ hydrocarbon chains, polyethylene glycol, polypropylene glycol, pHPMA, PLGA, polymers of alkyl diamines and combinations thereof, preferably $L^3$ is polyethylene glycol.

In some aspects, $L^3$ is a polyethylene glycol (PEG), comprising from 2 to 40 ethylene glycol monomers.

In some aspects, $L^3$ is PEG3, PEG4, or PEG5.

In some aspects, the AAV vector comprises a moiety according to formula (IIe)

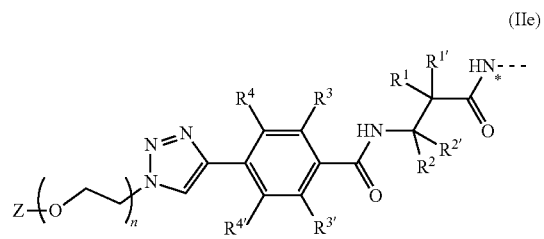

(IIe)

or a pharmaceutically acceptable salt thereof, wherein N*, -----, n, Z, $R^1$, $R^{1'}$, $R^2$, $R^{2'}$, $R^3$, $R^{3'}$, $R^4$ and $R^{4'}$, are as defined and described in classes and subclasses below and herein.

In some aspects, the AAV vector comprises a moiety selected from those of Table 1' hereafter.

In some aspects, the AAV vector is selected from the group consisting of AAV1, AAV2, AAV3, AAV4, AAV5, AAV6, AAV7, AAV8, AAV9, AAV10, AAV11, AAV12, pseudotypes, chimeras, and variants thereof; preferably the AAV vector is selected from the group consisting of AAV2, AAV5, AAV8, and AAV9.

In some aspects, the AAV vector comprises at least one transgene, and the transgene is optionally under control of a promoter.

In some aspects, the AAV vector comprises at least one transgene comprising the cDNA from a GBA gene, preferably from a human GBA gene, and the transgene is optionally under control of a promoter.

In some aspects, the invention also provides a pharmaceutical composition comprising an AAV vector according to the invention and at least one pharmaceutically acceptable vehicle.

In some aspects, the invention also relates to an AAV vector according to the invention or a pharmaceutical composition according to the invention, for use as a diagnostic agent and/or a medicament, preferably in gene therapy.

In some aspects, the invention also provides a method of manufacturing of an AAV vector according to the invention comprising the step of incubating an AAV with a compound of formula (I)

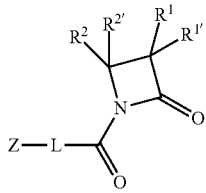

or a salt thereof, under conditions suitable to obtain the AAV vector according to the invention.

In some aspects, the invention further provides a compound of formula (Ia):

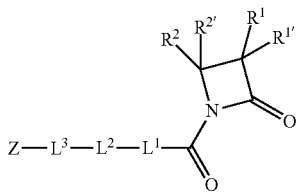

or a salt thereof, wherein Z, $L^1$, $L^2$, $L^3$, $R^1$, $R^{1'}$, $R^2$ and $R^{2'}$, are as defined and described in classes and subclasses below and herein.

In some aspects, $L^1$ is optionally substituted phenyl.

In some aspects, $L^2$ is an optionally substituted 5-membered heteroaryl group comprising 1-3 heteroatoms independently selected from nitrogen, oxygen, or sulfur.

In some aspects, the compound is of formula (Ic)

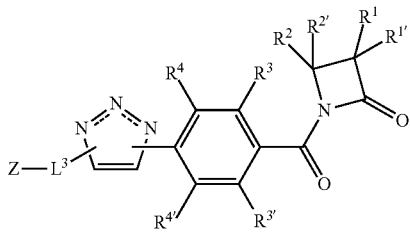

or a salt thereof, wherein Z, $L^3$, $R^1$, $R^{1'}$, $R^2$, $R^{2'}$, $R^3$, $R^{3'}$, $R^4$ and $R^{4'}$, are as defined and described in classes and subclasses below and herein.

In some aspects, $L^3$ is an optionally substituted group selected from the group consisting of saturated or unsaturated, linear or branched $C_2$-$C_{40}$ hydrocarbon chains, polyethylene glycol, polypropylene glycol, pHPMA, PLGA, polymers of alkyl diamines and combinations thereof, preferably $L^3$ is polyethylene glycol.

In some aspects, $L^3$ is a polyethylene glycol (PEG), comprising from 2 to 40 ethylene glycol monomers.

In some aspects, In some aspects, $L^3$ is PEG3, PEG4, or PEG5.

In some aspects, the compound is of formula (IIe)

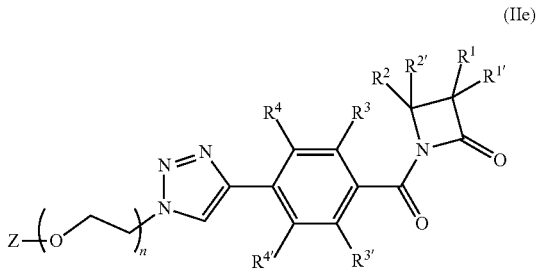

or a salt thereof, wherein n, Z, $R^1$, $R^{1'}$, $R^2$, $R^{2'}$, $R^3$, $R^{3'}$, $R^4$ and $R^{4'}$, are as defined and described in classes and subclasses below and herein.

In some aspects, Z comprises or consists of a cell-type specific ligand selected from the group consisting of saccharides, hormones, peptides, proteins or functionally active fragments thereof, membrane receptors or functionally active fragments thereof, aptamers, antibodies or functionally active fragments thereof, ScFv, spiegelmers, peptide aptamers, vitamins and drugs.

In some aspects, Z is a saccharide selected from the group consisting of monosaccharides, oligosaccharides, polysaccharides, and derivatives thereof.

In some aspects, Z is selected from the group consisting of mannose, galactose, fucose, desosamine, N-acetylglucosamine, N-acetylgalactosamine, S6-galactose, S6-N-acetylgalactosamine, glucuronic acid, P6-galactose and P1-galactose.

In some aspects, the invention also provides the use of a compound according to the invention to manufacture a modified AAV vector.

DETAILED DESCRIPTION OF CERTAIN EMBODIMENTS

Various coupling chemistries that conjugate through an amino group (e.g., of a lysine or arginine sidechain) have been described. However, not all such coupling chemistries are compatible with and/or effective under particular conditions and/or with particular substrates.

The present disclosure relates to couplings that conjugate to amino acids of adeno-associated viruses (AAVs). The present disclosure appreciates that not all coupling chemistries are effective for such conjugation. For example, certain coupling chemistries require or are typically performed under conditions that may disrupt one or more structural or functional properties of the AAV (e.g., do not preserve AAV integrity). Alternatively or additionally, various coupling chemistries require or are typically performed under conditions that are not compatible with certain biochemical ligands, such as saccharides and/or (poly)peptides, for example because the relevant conditions may favor self-coupling with another ligand molecule (inter- and/or intramolecular coupling) rather than coupling with the AAV. For example, in certain contexts, it has been observed that coupling chemistries comprising certain isothiocyanate groups are often too reactive and thus susceptible to significant self-coupling reactions.

Some coupling strategies include 2-step coupling reactions. Without wishing to be bound to a particular theory, the present disclosure identifies the source of a problem with various such 2-step coupling reactions for coupling to AAVs. For example, the present disclosure appreciates that, in certain conditions, when only a first coupling reaction occurs, but not a second, then an AAV can be rendered immunogenic, for example due to non-natural chemical structures decorating the capsid surface.

A one-step coupling chemistry has been described in, e.g., WO2017/212019, which uses a certain isothiocyanate group that has been shown to be compatible in certain circumstances. However, without wishing to be bound to a particular theory, the present disclosure identifies the source of a potential problem with use of such isothiocyanate groups for coupling to AAV. For example, the present disclosure observes that such coupling reactions results in a lipophilic linker that may form an immunogenic hapten (see Scheme 1).

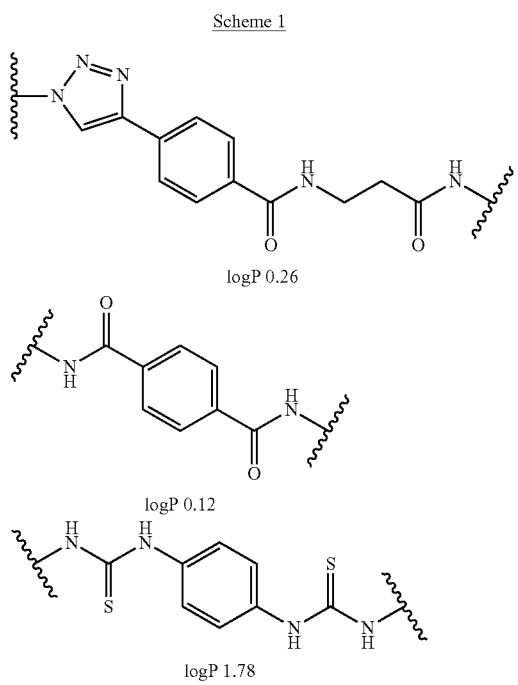 [SMILES: *NC(=O)CCNC(=O)c1ccc(-c2cn(*)nn2)cc1 ; *NC(=O)c1ccc(C(=O)N*)cc1 ; *NC(=S)Nc1ccc(NC(=S)N*)cc1]

Scheme 1

As shown in Scheme 1, use of certain isothiocyanate groups (e.g., those disclosed in WO2017/212019) when coupling to an AAV results in a linkage with a log P value of 1.78, which has a higher likelihood of causing immunogenicity to the AAV after coupling. Linkages may be envisioned with lower log P values and thus lower risk of causing immunogenicity (e.g., see Scheme 1), however, their compatibility with coupling to AAV is uncertain.

The present disclosure therefore recognizes a particular remaining need to provide suitable coupling chemistries that i) are compatible with and maintain the integrity of a multiplicity of AAV serotypes, ii) are 1-step, iii) minimize self-coupling of the ligand, and/or iv) do not result in an immunogenic linker. In some embodiments, provided technologies provide coupling chemistries that do not result in a lipophilic linker.

In some aspects, the present invention relates to an adeno-associated virus (AAV) vector comprising a moiety resulting from reaction of a compound comprising a lactam (e.g., β-lactam) with an amino group present within the capsid of the AAV vector (e.g., amino group of a lysine side chain), e.g., a modified AAV as results from such reaction.

For example, in some embodiments, the present invention provides adeno-associated virus (AAV) vectors comprising a moiety according to formula (II):

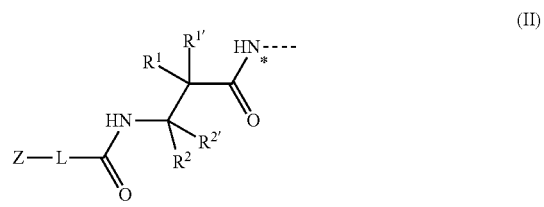

(II)

or a pharmaceutically acceptable salt thereof, wherein -----, N*, Z, L, R', R$^{1'}$, R$^2$ and R$^{2'}$ are as defined and described within classes and subclasses herein.

In some aspects, the present invention relates to methods of modifying AAV vectors, especially by modification of at least one amino acid residue of the capsid of the AAV. In some embodiments, the present invention provides methods of modifying an amino group of an amino acid residue of the capsid, preferably an amino group of a surface-exposed amino acid residue. As described herein, modification of an AAV vector was successfully achieved by covalently coupling a linker comprising a lactam group (e.g., β-lactam) as a reactive moiety.

As a proof of concept, several linkers comprising lactams (e.g., β-lactams) were prepared, bearing a saccharide moiety as functional group, for modifying amino groups of amino acid residues of the capsid of AAV vectors. It was evidenced that capsid proteins of several AAV serotypes, including AAV2, AAV5, AAV8, and AAV9, can be efficiently modified while maintaining the integrity of the AAV particles. It was further shown that these modified AAVs remain infectious, e.g., in the U87-MG glioblastoma cell line. It was further shown that these modified AAVs display better transduction properties, both in terms of tissue distribution and transgene expression levels, considering the whole brain, in comparison with unmodified AAVs.

Lactam-Modified AAV Vectors

In some aspects, the present invention relates to an adeno-associated virus (AAV) vector comprising a moiety resulting from reaction of a compound comprising a lactam (e.g., β-lactam) and an amino group present within the capsid of the AAV vector (e.g., amino group of a lysine side chain).

In some embodiments, the present invention provides an adeno-associated virus (AAV) vector having at least one modified amino group of an amino acid residue of the capsid. More particularly, in some embodiments, the invention relates to an AAV vector having at least one amino group of an amino acid residue of the capsid modified by covalent coupling of a lactam (e.g., β-lactam) group of a linker which advantageously comprises a functional moiety of interest.

In some embodiments, the present invention provides a modified AAV vector comprising a moiety resulting from reaction of a compound comprising a lactam moiety with an amino group present within the capsid of the AAV vector. In some embodiments, the present invention provides a modified AAV vector comprising a moiety resulting from reaction of a compound comprising a β-lactam moiety with an amino group present within the capsid of the AAV vector. In some embodiments, the present invention provides a modified AAV vector comprising a moiety resulting from reaction of a compound comprising a β-lactam moiety with an amino group of an amino acid residue of the capsid of the AAV vector. In some embodiments, the present invention provides a modified AAV vector comprising a moiety resulting from reaction of a compound comprising a β-lactam moiety with an amino group of a lysine side chain present within the capsid of the AAV vector.

AAV Vectors

AAV vectors suitable in the present invention may comprise or be derived from any natural or recombinant AAV serotype.

A "serotype" is traditionally defined on the basis of a lack of cross-reactivity between antibodies to one virus as compared to another virus. Such cross-reactivity differences are usually due to differences in capsid protein sequences/antigenic determinants (e.g., due to VP1, VP2, and/or VP3 sequence differences of AAV serotypes). As used herein, AAV includes various naturally occurring and synthetic serotypes.

In some embodiments, an AAV vector according to the present invention is selected from natural serotypes AAV1, AAV2, AAV3, AAV4, AAV5, AAV6, AAV7, AAV8, AAV9, AAV10, AAV11 and AAV12; or pseudotypes, chimeras, and variants thereof.

In some embodiments, an AAV vector according to the present invention is of AAV phylogenetic Clade A, B, C, D, E, or F (see e.g., Gao et al., Clade of Adeno-Associated Viruses Are Widely Disseminated in Human Tissues. *J. Virology.* 2004). In some embodiments, an AAV vector according to the present invention is of AAV phylogenetic Clade E. In some embodiments, an AAV vector according to the present invention is of AAV phylogenetic Clade D. In some embodiments, an AAV vector according to the present invention is of AAV phylogenetic Clade F. In some embodiments, an AAV vector according to the present invention is of AAV phylogenetic Clade A. In some embodiments, an AAV vector according to the present invention is of AAV phylogenetic Clade C. In some embodiments, an AAV vector according to the present invention is of AAV phylogenetic Clade B. In some embodiments, an AAV vector according to the present invention is an AAV that does not belong to a classical phylogenetic Clade.

As used herein, the term "pseudotype" when referring to an AAV vector, or a "pseudotyped AAV vector", refers to an AAV vector which comprises portions of an AAV genome, in particular the inverted terminal repeats (ITRs), of one AAV serotype packaged in the capsid of another AAV serotype. These pseudotypes are denoted using a slash or a hyphen, so that "AAV2/5" or "AAV2-5" indicates an AAV vector comprising a serotype 2 genome, packaged into a serotype 5 capsid.

In some embodiments, an AAV vector is transcapsidated. In some embodiments, transcapsidation approaches comprise transfection of combinations of AAV serotype helper plasmids to produce mosaic recombinant AAV capsid (see e.g., Rabinowitz et al. (2004), J. Virol. 78: 4421-4432). In some embodiments, polyploid (when utilizing more than two parental AAV helpers) or haploid (when only using two) approaches are utilized. In some embodiments, for example, AAV capsids can be made from VP1/VP2 of one serotype and VP3 donated from a unique serotype, or combinations thereof. In some embodiments, haploid AAVs have the potential to uniquely combine structural advantages of parental AAVs. In some embodiments, haploid AAVs have demonstrated 1) synergistic effects in transduction, 2) unexpected new tropisms, and 3) the ability to escape Nab (see e.g., Chai et. al. (2019), Viruses 11: 1138)

For example, in some embodiments, pseudotyped AAV vectors include, but are not limited to, AAV2/1, AAV2/2, AAV2/3, AAV2/4, AAV2/5, AAV2/6, AAV2/7, AAV2/8 and AAV2/9.

As used herein, the term "chimera" when referring to an AAV vector, or a "chimeric AAV vector", refers to an AAV vector which comprises a capsid containing VP1, VP2 and VP3 proteins from at least two different AAV serotypes; or alternatively, which comprises VP1, VP2 and VP3 proteins, at least one of which comprises at least a portion from another AAV serotype.

Examples of chimeric AAV vectors include, but are not limited to, AAV-DJ, AAV2G9, AAV2i8, AAV2i8G9, AAV8G9, and AAV9i1.

In some embodiments, an AAV vector according to the present invention is selected from the group comprising or consisting of AAV1, AAV2, AAV3, AAV4, AAV5, AAV6, AAV7, AAV8, AAV9, AAV10, AAV11, AAV12, AAV106.1/hu.37, AAV114.3/hu.40, AAV127.2/hu.41, AAV127.5/hu.42, AAV128.1/hu.43, AAV128.3/hu.44, AAV130.4/hu.48, AAV145.1/hu.53, AAV145.5/hu.54, AAV145.6/hu.55, AAV16.12/hu.11, AAV16.3, AAV16.8/hu.10, AAV161.10/hu.60, AAV161.6/hu.61, AAV1-7/rh.48, AAV1-8/rh.49, AAV2i8, AAV2i8G9, AAV2-15/rh.62, AAV223.1, AAV223.2, AAV223.4, AAV223.5, AAV223.6, AAV223.7, AAV2-3/rh.61, AAV24.1, AAV2-4/rh.50, AAV2-5/rh.51, AAV2.5T, AAV27.3, AAV29.3/bb.1, AAV29.5/bb.2, AAV2G9, AAV3B, AAV3.1/hu.6, AAV3.1/hu.9, AAV3-11/rh.53, AAV3-3, AAV33.12/hu.17, AAV33.4/hu.15, AAV33.8/hu.16, AAV3-9/rh.52, AAV3a, AAV3b, AAV4-19/rh.55, AAV42.12, AAV42-10, AAV42-11, AAV42-12, AAV42-13, AAV42-15, AAV42-1b, AAV42-2, AAV42-3a, AAV42-3b, AAV42-4, AAV42-5a, AAV42-5b, AAV42-6b, AAV42-8, AAV42-aa, AAV43-1, AAV43-12, AAV43-20, AAV43-21, AAV43-23, AAV43-25, AAV43-5, AAV4-4, AAV44.1, AAV44.2, AAV44.5, AAV46.2/hu.28, AAV46.6/hu.29, AAV4-8/rh.64, AAV4-9/rh.54, AAV52.1/hu.20, AAV52/hu.19, AAV5-22/rh.58, AAV5-3/rh.57, AAV54.1/hu.21, AAV54.2/hu.22, AAV54.4R/hu.27, AAV54.5/hu.23, AAV54.7/hu.24, AAV58.2/hu.25, AAV6.1, AAV6.1.2, AAV6.2, AAV7m8, AAV7.2, AAV7.3/hu.7, AAV-8b, AAV8G9, AAV-8h, AAV9i1, AAV9.11, AAV9.13, AAV9.16, AAV9.24, AAV9.45, AAV9.47, AAV9.61, AAV9.68, AAV9.84, AAV9.9, AAVcy.2, AAVcy.3, AAVcy.4, AAVcy.5, AAVcy.5R1, AAVcy.5R2, AAVcy.5R3, AAVcy.5R4, AAVcy.6, AAVhu.1, AAVhu.2, AAVhu.3, AAVhu.4, AAVhu.5, AAVhu.6, AAVhu.7, AAVhu.8, AAVhu.9, AAVhu.10, AAVhu.11, AAVhu.12, AAVhu.13, AAVhu.14/9, AAVhu.15, AAVhu.16, AAVhu.17, AAVhu.18, AAVhu.19, AAVhu.20, AAVhu.21, AAVhu.22, AAVhu.23.2, AAVhu.24, AAVhu.25, AAVhu.27, AAVhu.28, AAVhu.29, AAVhu.29R, AAVhu.31, AAVhu.32, AAVhu.34, AAVhu.35, AAVhu.37, AAVhu.39, AAVhu.40, AAVhu.41, AAVhu.42, AAVhu.43, AAVhu.44, AAVhu.44R1, AAVhu.44R2, AAVhu.44R3, AAVhu.45, AAVhu.46, AAVhu.47, AAVhu.48, AAVhu.48R1, AAVhu.48R2, AAVhu.48R3, AAVhu.49, AAVhu.51, AAVhu.52, AAVhu.53, AAVhu.54, AAVhu.55, AAVhu.56, AAVhu.57, AAVhu.58, AAVhu.60, AAVhu.61, AAVhu.63, AAVhu.64, AAVhu.66, AAVhu.67, AAVpi.1, AAVpi.2, AAVpi.3, AAVrh.2, AAVrh.2R, AAVrh.8, AAVrh.8R, AAVrh8R R533A mutant, AAVrh8R A586R mutant, AAVrh.10, AAVrh.12, AAVrh.13, AAVrh. 13R, AAVrh.14, AAVrh.17, AAVrh.18, AAVrh.19, AAVrh.20, AAVrh.21, AAVrh.22, AAVrh.23, AAVrh.24, AAVrh.25, AAVrh.31, AAVrh.32, AAVrh.33, AAVrh.34, AAVrh.35, AAVrh.36, AAVrh.37, AAVrh.37R2, AAVrh.38, AAVrh.39, AAVrh.40, AAVrh.43, AAVrh.44, AAVrh.45, AAVrh.46, AAVrh.47, AAVrh.48, AAVrh.48.1, AAVrh.48.1.2, AAVrh.48.2, AAVrh.49, AAVrh.50, AAVrh.51, AAVrh.52, AAVrh.53, AAVrh.54, AAVrh.55, AAVrh.56, AAVrh.57, AAVrh.58, AAVrh.59, AAVrh.60, AAVrh.61, AAVrh.62, AAVrh.64, AAVrh.64R1, AAVrh.64R2, AAVrh.65, AAVrh.67, AAVrh.68, AAVrh.69, AAVrh.70, AAVrh.72, AAVrh.73, AAVrh.74, AAV-PHP.B, AAV-PHP.A, AAV-G2B-26, AAV-G2B-13, AAV-TH1.1-32, AAV-TH1.1-35, AAV-PHP.B2, AAV-PHP.B3, AAV-PHP.N/PHP.B-DGT, AAV-PHP.B-EST, AAV-PHP.B-GGT, AAV-PHP.B-ATP, AAV-PHP.B-ATT-T, AAV-PHP.B-DGT-T, AAV-PHP.B-GGT-T, AAV-PHP.B-SGS, AAV-PHP.B-AQP, AAV-PHP.B-QQP, AAV-PHP.B-SNP(3), AAV-PHP.B-SNP, AAV-PHP.B-QGT, AAV-PHP.B-NQT, AAV-PHP.B-EGS, AAV-PHP.B-SGN, AAV-PHP.B-EGT, AAV-PHP.B-DST, AAV-PHP.B-DST, AAV-PHP.B-STP, AAV-PHP.B-PQP, AAV-PHP.B-SQP, AAV-PHP.B-QLP, AAV-PHP.B-TMP, AAV-PHP.B-TTP, AAV-PHP.S/G2A12, AAV-G2A15/G2A3, AAV-G2B4, AAV-G2B5, PHP.S, AAAV, AAV A3.3, AAV A3.4, AAV A3.5, AAV A3.7, AAV CBr-7.3, AAV CBr-7.1, AAV CBr-7.10, AAV CBr-7.2, AAV CBr-7.4, AAV CBr-7.5, AAV CBr-7.7, AAV CBr-7.8, AAV CBr-B7.3, AAV CBr-B7.4, AAV CBr-E1, AAV CBr-E2, AAV CBr-E3, AAV CBr-E4, AAV CBr-E5, AAV CBr-e5, AAV CBr-E6, AAV CBr-E7, AAV CBr-E8, AAV CHt-1, AAV CHt-2, AAV CHt-3, AAV CHt-6.1, AAV CHt-6.10, AAV CHt-6.5, AAV CHt-6.6, AAV CHt-6.7, AAV CHt-6.8, AAV CHt-P1, AAV CHt-P2, AAV CHt-P5, AAV CHt-P6, AAV CHt-P8, AAV CHt-P9, AAV CKd-N4, AAV CKd-1, AAV CKd-10, AAV CKd-2, AAV CKd-3, AAV CKd-4, AAV CKd-6, AAV CKd-7, AAV CKd-8, AAV CKd-B1, AAV CKd-B2, AAV CKd-B3, AAV CKd-B4, AAV CKd-B5, AAV CKd-B6, AAV CKd-B7, AAV CKd-B8, AAV CKd-H1, AAV CKd-H2, AAV CKd-H3, AAV CKd-H4, AAV CKd-H5, AAV CKd-H6, AAV CKd-N3, AAV CKd-N9, AAV CLg-F1, AAV CLg-F2, AAV CLg-F3, AAV CLg-F4, AAV CLg-F5, AAV CLg-F6, AAV CLg-F7, AAV CLg-F8, AAV CLv-M9, AAV CLv-R6, AAV CLv-1, AAV CLv1-1, AAV CLv1-10, AAV CLv1-2, AAV CLv-12, AAV CLv1-3, AAV CLv-13, AAV CLv1-4, AAV CLv1-7, AAV CLv1-8, AAV CLv1-9, AAV CLv-2, AAV CLv-3, AAV CLv-4, AAV CLv-6, AAV CLv-8, AAV CLv-D1, AAV CLv-D2, AAV CLv-D3, AAV CLv-D4, AAV CLv-D5, AAV CLv-D6, AAV CLv-D7, AAV CLv-D8, AAV CLv-E1, AAV CLv-K1, AAV CLv-K3, AAV CLv-K6, AAV CLv-L4, AAV CLv-L5, AAV CLv-L6, AAV CLv-M1, AAV CLv-M11, AAV CLv-M2, AAV CLv-M5, AAV CLv-M6, AAV CLv-M7, AAV CLv-M8, AAV CLv-R1, AAV CLv-R2, AAV CLv-R3, AAV CLv-R4, AAV CLv-R5, AAV CLv-R7, AAV CLv-R8, AAV CLv-R9, AAV CSp-8.10, AAV CSp-1, AAV CSp-10, AAV CSp-11, AAV CSp-2, AAV CSp-3, AAV CSp-4, AAV CSp-6, AAV CSp-7, AAV CSp-8, AAV CSp-8.2, AAV CSp-8.4, AAV CSp-8.5, AAV CSp-8.6, AAV CSp-8.7, AAV CSp-8.8, AAV CSp-8.9, AAV CSp-9, AAV-LK08, AAV-LK15, AAV Shuffle 100-1, AAV Shuffle 100-2, AAV Shuffle 100-3, AAV Shuffle 100-7, AAV Shuffle 10-2, AAV Shuffle 10-6, AAV Shuffle 10-8, AAV SM 100-10, AAV SM 100-3, AAV SM 10-1, AAV SM 10-2, AAV SM 10-8, AAV.VR-355, AAV-b, AAVC1, AAVC2, AAVC5, AAVCh.5, AAVCh.5R1, AAV-DJ, AAV-DJ8, AAVF1/HSC1, AAVF11/HSC11, AAVF12/HSC12, AAVF13/HSC13, AAVF14/HSC14, AAVF15/HSC15, AAVF16/HSC16, AAVF17/HSC17, AAVF2/HSC2, AAVF3, AAVF3/HSC3, AAVF4/HSC4, AAVF5, AAVF5/HSC5, AAVF6/HSC6, AAVF7/HSC7, AAVF8/HSC8, AAVF9/HSC9, AAV-h, AAVH-1/hu.1, AAVH2, AAVH-5/hu.3, AAVH6, AAVhE1.1, AAVhEr1.14, AAVhEr1.16, AAVhEr1.18, AAVhER1.23, AAVhEr1.35, AAVhEr1.36, AAVhEr1.5, AAVhEr1.7, AAVhEr1.8, AAVhEr2.16, AAVhEr2.29, AAVhEr2.30, AAVhEr2.31, AAVhEr2.36, AAVhEr2.4, AAVhEr3.1, AAVLG-10/rh.40, AAVLG-4/rh.38, AAVLG-9/hu.39, AAVLG-9/hu.39, AAV-LK01, AAV-LK02, AAV-LK03, AAV-LK03, AAV-LK04, AAV-LK05, AAV-LK06, AAV-LK07, AAV-LK09, AAV-LK10, AAV-LK11, AAV-LK12, AAV-LK13, AAV-LK14, AAV-LK16, AAV-LK17, AAV-LK18, AAV-LK19, AAVN721-8/rh.43, AAV-PAEC, AAV-PAEC 12, AAV-PAEC11, AAV-PAEC2, AAV-PAEC4, AAV-PAEC6, AAV-PAEC7, AAV-PAEC8, Anc80, Anc80L65, Anc81, Anc82, Anc83, Anc84, Anc94, Anc110, Anc113, Anc126, Anc127, BAAV, BNP61 AAV, BNP62 AAV, BNP63 AAV, bovine AAV, caprine AAV, Japanese AAV 10 serotype, UPENN AAV10, VOY101, and VOY201.

In some embodiments, "AAV vectors variants" include vectors which have been genetically modified, e.g., by substitution, deletion or addition of one or several amino acid residues in one or more of the capsid proteins VP1, VP2 and VP3. Examples of such variants include, but are not limited to, AAV vectors comprising at least one Y-to-F, K-to-R, T-to-A, S-to-A and/or T-to-V mutation in any one or several of their VP1, VP2 and/or VP3 capsid proteins.

Further examples of such variants include, but are not limited to, AAV1 with a Y731F mutation (or corresponding site in other AAV serotypes); AAV2 with one or more of Y272F, Y444F, T491V, Y500F, S662V and/or Y730F mutations (or corresponding sites in other AAV serotypes), such as AAV2 with Y444F mutation, AAV2 with Y444F+Y500F+Y730F mutations, AAV2 with Y272F+Y444F+Y500F+Y730F mutations, AAV2 with Y444F+Y500F+Y730F+T491V mutations and AAV2 with Y272F+Y444F+Y500F+Y730F+T491V mutations; AAV3 with one or more of Y705F, Y731F and/or T492V mutations (or corresponding sites in other AAV serotypes); AAV5 with one or more of Y263F and/or Y719F mutations (or corresponding sites in other AAV serotypes); AAV6 with one or more of Y445F, T492V, S663V, Y705F and/or Y731F mutations (or corresponding sites in other AAV serotypes), such as AAV6 with Y445F mutation, AAV6 with Y705F+Y731F mutations, AAV6 with T492V mutation, AAV6 with Y705F+Y731F+T492V mutations, AAV6 with S663V mutation and AAV6 with S663V+T492V mutations; and AAV8 with one or more of Y447F, T494V and/or Y733F mutations (or corresponding sites in other AAV serotypes).

In some embodiments, an AAV vector according to the present invention is selected from the group consisting of AAV2, AAV5, AAV8, and AAV9. In some embodiments, an AAV vector according to the present invention is AAV2. In some embodiments, an AAV vector according to the present invention is AAV5. In some embodiments, an AAV vector according to the present invention is AAV8. In some embodiments, an AAV vector according to the present invention is AAV9. In some embodiments, an AAV vector according to the present invention is AAV2/2. In some embodiments, an AAV vector according to the present invention is AAV2/5. In some embodiments, an AAV vector according to the present invention is AAV2/8. In some embodiments, an AAV vector according to the present invention is AAV2/9.

In some embodiments, an AAV vector according to the present invention has a capsid of an AAV serotype selected from the group consisting of serotypes 2, 5, 8 and 9. In some embodiments, an AAV vector according to the present invention has a capsid of AAV serotype 2. In some embodiments, an AAV vector according to the present invention has a capsid of AAV serotype 5. In some embodiments, an AAV vector according to the present invention has a capsid of AAV serotype 8. In some embodiments, an AAV vector according to the present invention has a capsid of AAV serotype 9.

In some embodiments, an AAV vector can target a large variety of cells, tissues, and organs. In some embodiments, examples of cells targeted by AAV vectors encompass, but are not limited to, hepatocytes; cells of the retina; i.e. photoreceptors, retinal pigmented epithelium (RPE), Müller cells; muscle cells, i.e. myoblasts, satellite cells; cells of the central nervous system (CNS), i.e. neurons, glial cells; cells of the heart; cells of the peripheral nervous system (PNS); osteoblasts; tumor cells; blood cells such as lymphocytes, monocytes, basophils, eosinophils, neutrophils, mast cells; hematopoietic cells including hematopoietic stem cells; cells of the inner ear (e.g., inner and/or outer hair cells, Hensen's cells, Deiter's cells, pillar cells, inner phalangeal cells, border cells, etc.); induced pluripotent stem cells (iPS) and the like. In some embodiments, examples of tissues and/or organs which can be targeted by AAV include eye, retina, liver, skeletal muscle, cardiac muscle, smooth muscle, ear, brain, spine, bone, connective tissue, heart, kidney, lung, lymph node, mammary gland, myelin, prostate, testes, thymus, thyroid, trachea, and the like. In some embodiments, preferred cell types are hepatocytes, retinal cells, muscle cells, cells of the CNS, cells of the PNS, and hematopoietic cells. In some embodiments, preferred tissue and/or organs are liver, muscle, heart, eye, and brain.

The tropism of AAVs can vary depending on their serotype. In some embodiments, for example, AAV2 can be used to transduce the central nervous system (CNS), kidney, and photoreceptor cells, while in some embodiments, for example, AAV8 is effective for transducing the CNS, heart, liver, photoreceptor cells, retinal pigment epithelium (RPE), and skeletal muscle.

In some embodiments, an AAV can be produced by any methods known in the art, such as transient transfection in cell lines of interest e.g. in HEK293 cells as described in the Examples section.

Recombinant AAV Vectors

In some embodiments, an AAV vector modified according to the present invention may be a recombinant AAV (rAAV) vector. In general, wild-type (WT) AAVs have a single-stranded linear DNA genome about 5 kb long with two major open reading frames (ORFs) flanked by two inverted terminal repeats (ITRs). The 5' and 3' ORFs encode replication, and capsid proteins, respectively. In general, an ITR contains 145 nucleotides and serves as an AAV genome replication origin and packaging signal. In recombinant AAV, viral ORFs are replaced by an exogenous gene expression cassette, while replication and capsid proteins are provided in trans. In some embodiments, an AAV vector modified according to the present invention may comprise a double-stranded, self-complementary DNA genome (scAAV) (see e.g., Buie et al., Self-complementary AAV Virus (scAAV) Safe and Long-term Gene Transfer in the Trabecular Meshwork of Living Rats and Monkeys. *Invest Opthalmol Vis Sci.* 2010).

Therefore, a "recombinant AAV vector" or "rAAV" herein refers to an AAV wherein an exogenous nucleic acid sequence (e.g., a payload, e.g., a transgene) has been introduced in the viral genome. Said exogenous nucleic acid sequence may be of any type and is selected in view of the intended use of the AAV vector. For instance, said nucleic acid may comprise and/or may template any RNA or DNA sequence. In some embodiments, a nucleic acid may preferably comprise a DNA sequence. In some embodiments, rAAV vectors can be used as gene vectors for in vivo or in vitro applications.

For illustration, an exemplary rAAV vector modified according to the present invention may comprise an exogenous gene expression cassette replacing the viral ORFs and placed between two ITRs. In some embodiment, an exogenous gene expression cassette may comprise a promoter sequence, a sequence encoding a gene of interest, and a terminator sequence. In some embodiments, a promoter and a gene of interest are selected depending on a targeted tissue and/or organ and a known indication, e.g., for treatment and/or prevention of a disease state.

As an additional or alternative example, in some embodiments, a rAAV vector used in the present invention may comprise a DNA template for homologous recombination in cells. In some embodiments, a rAAV can be used in combination with gene editing tools, for promoting homologous recombination in targeted cells, in vivo, in vitro, and/or ex vivo. In some embodiments, a gene editing tools can be of any type, and encompass, without being limited to, CRISPR and its associated systems (Cas proteins, guide RNA), TALEN, Zinc Finger Nuclease, meganuclease, as well as RNA and/or DNA encoding said proteins.

In some embodiments, an AAV vector modified according to the present invention comprises at least one transgene, selected in view of the intended use of the AAV vector.

The term "transgene", as used herein, refers to a polynucleotide that is introduced into a cell and is capable of being transcribed into RNA and optionally translated and/or expressed under appropriate conditions. In some embodiments, a transgene confers a desired property to a cell into which it was introduced, or otherwise leads to a desired therapeutic or prophylactic outcome. In some embodiments, the transgene may be incorporated, either entirely or partially, in the host cell's genome, such as, e.g., via corrective gene editing using a CRISPR-based method, TALEN-based method, ZFN-based method or the like, in presence of appropriate means. In some embodiments, a transgene may be transcribed into a molecule that mediates RNA interference (i.e., gene silencing), such as into a miRNA, siRNA, shRNA, piRNA, or the like.

In some embodiments, the at least one transgene comprises a cDNA encoding a protein or a fragment thereof.

As used herein, the term "cDNA" refers to complementary DNA and corresponds to a DNA molecule, usually synthesized from a single-stranded RNA (such as, e.g., a messenger RNA [mRNA] or a microRNA [miRNA]) template in a reaction catalyzed by a reverse transcriptase. In particular, when a cDNA is obtained from reverse transcription of a mRNA, it does not comprise an entire gene coding from a protein, but only the coding sequence of said protein (i.e., exons without introns).

In some embodiments, a fragment of a cDNA can comprise a part of said cDNA encoding the N-terminal part or the C-terminal part of a protein. In some embodiments, for example, such fragment could be useful in cases of large cDNAs which cannot readily be carried by a single AAV vector, and would thus require the use of more than one vector, e.g., dual AAV vectors.

In some embodiments, a fragment of a cDNA can comprise a part of said cDNA encoding a functional and/or structural portion of a protein.

In some embodiments, a fragment of a cDNA can comprise a sequence encoding a functional and/or structural portion of an RNA molecule. In some embodiments, such an RNA molecule may be a ribosomal RNA, transfer RNA, small nuclear RNA, small nucleolar RNA, micro RNA, long non-coding RNA, short interfering RNA, guide RNA, and/or any functional RNA species.

In some embodiments, a cDNA is from a gene selected from the group comprising or consisting of ABCA4, ADAM9, AGBL5, AHR, AIPL1, APOE, ARHGEF18, ARL2BP, ARL3, ARL6, BBS2, BEST1, C2ORF71, C8orf37, CACNAIF, CAPN5, CDHR1, CEP290, CEP78, CERKL, CFH, CHM, CLCC1, CLRN1, CNGA1, CNGB1, COL2A1, CRB1, CRB2, CRX, CTNNB1, CX3CR1, DHDDS, DHX38, EFEMP1, ELOVL4, EYS, FAM161A, FBN2, FSCN2, FZD4, GDF6, GUCA1A, GUCA1B, GUCY2D, HGSNAT, HK1, HMCN1, HRG4, HTRA1, IDH3A, IDH3B, IFTI40, IFT172, IFT43, IMPDH1, IMPG2, KCNJ13, KIAA1549, KIF3B, KIZ, KLHL7, LCA5, LRAT, LRP5, MAK, MERTK, MYO7A, NDP, NEK2, NMNAT1, NR2E3, NRL, PDE6A, PDE6B, PDE6G, PITPNM3, POMGT1, PRCD, PROM1, PRPF3, PRPF4, PRPF6, PRPF8, PRPF31, PRPH2, RAXL1, RBP3, RBP4, RD3, RDH12, RDH5, REEP6, RGR, RHO, RIMS1, RLBP1, RP1, RP1L1, RP2, RP4, RP7, RP9, RP10, RP11, RP12, RP13, RP14, RP17, RP18, RP19, RP20, RP25, RP26, RP27, RP28, RP30, RP31, RP32, RP33, RP35, RP36, RP37, RP38, RP39, RP40, RP41, RP42, RP43, RP44, RP45, RP46, RP47, RP48, RP49, RP50, RP51, RP53, RP54, RP55, RP56, RP57, RP58, RP59, RP60, RP61, RP62, RP64, RP65, RP66, RP67, RP68, RP69, RP70, RP71, RP72, RP73, RP74, RP75, RP76, RP77, RP78, RP79, RP80, RP81, RP82, RP83, RP84, RP85, RP86, RP87, RP88, RP89, RP90, RPE65, RPE87, RPGR, RPGRIP1, SAG, SEMA4A, SLC7A14, SNRNP200, SPATA7, TFEB, TOPORS, TSPAN12, TTC8, TULP1, USH2A, VCAN, ZNF408, and ZNF513.

In some embodiments, a cDNA is from a Crumbs Cell Polarity Complex Component 2 (CRB2) gene. In some embodiments, a cDNA is from a Phosphodiesterase 6B (PDE6B) gene. In some embodiments, a cDNA is from a Retinaldehyde Binding Protein 1 (RLBP1) gene. In some embodiments, a cDNA is from a Retinoid Isomerohydrolase (RPE65) gene. In some embodiments, a cDNA is from a RPGR Interacting Protein 1 (RPGRIP1) gene. In some embodiments, a cDNA is from a ATP Binding Cassette Subfamily A Member 4 (ABCA4) gene. In some embodiments, a cDNA is an N- or C-terminal coding region from a ATP Binding Cassette Subfamily A Member 4 (ABCA4) gene.

In some embodiments, a cDNA is from a gene selected from the group comprising or consisting of 3R tau, 4R tau, AARS, ABCD1, ACOX1, ADGRV1, ADRA2B, AGA, AGER, ALDH7A1, ALG13, ALS2, ANG, ANXA11, APP, ARHGEF9, ARSA, ARSB, ARV1, ASAH1, ASPA, ATN1, ATP10A, ATP13A2, ATXN1, ATXN2, ATXN3, BAX, BCL-2, BDNF, BICD2, C9orf72, CACNA1A, CACNA1H, CACNB4, CASR, CCNF, CDKL5, CERS1, CFAP410, CHCHD10, CHD2, CHMP2B, CHRNA2, CHRNA4, CHRNA7, CHRNB2, CLCN2a, CLN1, CLN2, CLN3, CLN5, CLN6, CLN8, CNTN2, CPA6, CSTB, CTNS, CTSA, CTSD, DAO, DCTN1, DEPDC5, DMD, DNAJB2, DNM1, DOCK7, DRD2, DYNC1H1, EEF1A2, EFHC1, EGLN1, EPHA4, EPM2A, ERBB4, FGF12, FIG. 4, FRRS1L, FTL, FUCA1, FUS, FXN, GAA, GABRA1, GABRB1, GABRB3, GABRD, GABRG2, GAL, GALC, GALNS, GBA, GFAP, GLA, GLB1, GLE1, GLT8D1, GNAO1, GNS, GOSR2, GPR98, GRIA1, GRIA2, GRIK1, GRIN1, GRIN2A, GRIN2B, GRIN2D, GSTM1, GUF1, GUSB, HCN1, HGSNAT, HNRNPA1, HTT, HYAL1, IDS, IDUA, IGHMBP2, IL-1, IT15, ITPA, JPH3, KCNA2, KCNB1, KCNC1, KCNMA1, KCNQ2, KCNQ3, KCNT1, KCTD7, LAL, LAMP2, LGI1, LMNB2, LRRK2, MAN2B1, MAN2B2, MAN2C1, MANBA, MATR3, MBD5, MFSD8, NAGA, NAGLU, NECAP1, NEFH, NEK1, NEU1, NHLRC1, NPC1, NPC2, NR4A2, NTRK2, OCA2, OPTN, PARK2, PARK7, PCDH19, PEX1, PEX2, PEX3, PEX5, PEX6, PEX10, PEX11B, PEX12, PEX13, PEX14, PEX16, PEX19, PEX26, PFN1, PINK1, PLCB1, PNPO, PON1, PON2, PON3, PPARGC1A, PRDM8, PRICKLE1, PRKN, PRNP, PRPH, PRRT2, PSAP, S106β, SCARB2, SCN1A, SCN1B, SCN2A, SCN8A, SCN9A, SCN9Ab, SETX, SGSH, SIGMAR1, SIK1, SKP1, SLC1A1, SLC1A2, SLC2A1, SLC6A1, SLC9A6, SLC12A5, SLC13A5, SLC25A12, SLC25A22, SLCA17A5, SMN1, SMPD1, SNCA, SNRPN, SOD1, SPG11, SPTAN1, SQSTM1, ST3GAL3, ST3GAL5, STX1B, STXBP1, SYP, SYT1, SZT2, TAF15, TARDBP, TBCID24, TBCE, TBK1, TBP, TFEB, TITF-1, TREM2, UBA5, UBE1, UBE3A, UBQLN2, UCH-L1, UNC13A, VAPB, VCP, VPS35, WWOX, and XBP1.

In some particular embodiments, the cDNA is from the GBA gene, preferably from the human GBA gene.

An exemplary nucleic acid sequence of the cDNA of the human GBA gene comprises or consists of SEQ ID NO: 1, or a nucleic acid sequence having at least 70, 75, 80, 85, 90, 91, 92, 93, 94, 95, 96, 97, 98, 99% or more sequence identity with SEQ ID NO: 1.

In one embodiment, the nucleic acid sequence of the cDNA of the human GBA gene encodes an amino acid sequence comprising or consisting of SEQ ID NO: 2, or an amino acid sequence having at least 70, 75, 80, 85, 90, 91, 92, 93, 94, 95, 96, 97, 98, 99% or more sequence identity with SEQ ID NO: 2.

SEQ ID NO: 1 atggagttttcaagtccttccagagaggaatgtcccaagcctttgag tagggtaagcatcatggctggcagcctcacaggattgcttctacttc aggcagtgtcgtgggcatcaggtgcccgcccctgcatccctaaaagc ttcggctacagctcggtggtgtgtgtctgcaatgccacatactgtga ctcctttgacccccgaccttttcctgcccttggtaccttcagccgct atgagagtacacgcagtgggcgacggatggagctgagtatgggcc atccaggctaatcacacgggcacaggcctgctactgaccctgcagcc agaacagaagttccagaaagtgaagggatttggagggccatgacag atgctgctgctctcaacatccttgccctgtcacccctgcccaaaat ttgctacttaaatcgtacttctctgaagaaggaatcggatataacat catccgggtacccatggccagctgtgacttctccatccgcacctaca cctatgcagacacccctgatgatttccagttgcacaacttcagcctc ccagaggaagataccaagctcaagatacccctgattcaccgagcct gcagttggcccagcgtcccgtttcactccttgccagcccctggacat cacccacttggctcaagaccaatggagcggtgaatgggaagggtca ctcaagggacagcccggagacatctaccaccagacctgggcagata ctttgtgaagttcctggatgcctatgctgagcacaagttacagttct gggcagtgacagctgaaaatgagccttctgctgggcgtgttgagtgga taccccttccagtgcctgggcttcacccctgaacatcagcgagactt cattgcccgtgacctaggtcctaccctcgccaacagtactcaccaca atgtccgcctactcatgctggatgaccaacgcttgctgctgcccac tgggcaaaggtggtactgacagacccagaagcagctaaatatgttca tggcattgctgtacattggtacctggactttctggctccagccaaag -continued

```
ccacccctaggggagacacaccgcctgttccccaacaccatgctcttt gcctcagaggcctgtgtgggctccaagttctgggagcagagtgtgcg gctaggctcctgggatcgagggatgcagtacagccacagcatcatca cgaacctcctgtaccatgtggtcggctggaccgactggaaccttgcc ttgccctgaaccccgaaggaggacccaattgggtgcgtaactttgtc gacagtcccatcattgtagacatcaccaaggacacgttttacaaaca gcccatgttctaccaccttggccacttcagcaagttcattcctgagg gctcccagagagtggggctggttgccagtcagaagaacgacctggac gcagtggcactgatgcatcccgatggctctgctgttgtggtcgtgct aaaccgctcctctaaggatgtgcctcttaccatcaaggatcctgctg tgggcttcctggagacaatctcacctggctactccattcacacctac ctgtggcgtcgccagtga
```

SEQ ID NO: 2
```
MEFSSPSREECPKPLSRVSIMAGSLTGLLLLQAVSWASGARPCIPKS

FGYSSVVCVCNATYCDSFDPPTFPALGTFSRYESTRSGRRMELSMGP

IQANHTGTGLLLTLQPEQKFQKVKGFGGAMTDAAALNILALSPPAQN

LLLKSYFSEEGIGYNIIRVPMASCDFSIRTYTYADTPDDFQLHNFSL

PEEDTKLKIPLIHRALQLAQRPVSLLASPWTSPTWLKTNGAVNGKGS

LKGQPGDIYHQTWARYFVKFLDAYAEHKLQFWAVTAENEPSAGLLSG

YPFQCLGFTPEHQRDFIARDLGPTLANSTHHNVRLLMLDDQRLLLPH

WAKVVLTDPEAAKYVHGIAVHWYLDFLAPAKATLGETHRLFPNTMLF

ASEACVGSKFWEQSVRLGSWDRGMQYSHSIITNLLYHVVGWTDWNLA

LNPEGGPNWVRNFVDSPIIVDITKDTFYKQPMFYHLGHFSKFIPEGS

QRVGLVASQKNDLDAVALMHPDGSAVVVVLNRSSKDVPLTIKDPAVG

FLETISPGYSIHTYLWRRQ
```

In some embodiments, at least one transgene is under the control of at least one element which enhances the transgene target specificity and/or expression. In some embodiments, examples of elements which enhance the transgene target specificity and/or expression include, but are not limited to, promoters, post-transcriptional regulatory elements (PREs), polyadenylation (poly A) signal sequences, translational regulatory elements, targets for control by endogenous RNA processing pathways, upstream enhancers (USEs), CMV enhancers, and introns.

In some embodiments, at least one transgene is under the control of at least one promoter.

A person skilled in the art may recognize that expression of transgenes in a target cell may require a specific promoter, including, but not limited to, a promoter that is species-specific, inducible, tissue-specific, temporally-specific, cell-specific, and/or cell cycle-specific.

In some embodiments, a promoter is a promoter having a tropism for a cell being targeted, i.e., a cell-specific promoter.

In some embodiments, a promoter drives expression of a transgene for a period of time in targeted tissues. Expression driven by a promoter may be for a period of 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 1 day, 2 days, 3 days, 4 days, 5 days, 6 days, 1 week, 8 days, 9 days, 10 days, 11 days, 12 days, 13 days, 2 weeks, 15 days, 16 days, 17 days, 18 days, 19 days, 20 days, 3 weeks, 22 days, 23 days, 24 days, 25 days, 26 days, 27 days, 28 days, 29 days, 30 days, 31 days, 1 month, 2 months, 3 months, 4 months, 5 months, 6 months, 7 months, 8 months, 9 months, 10 months, 11 months, 1 year, 13 months, 14 months, 15 months, 16 months, 17 months, 18 months, 19 months, 20 months, 21 months, 22 months, 23 months, 2 years, 3 years, 4 years, 5 years, 6 years, 7 years, 8 years, 9 years, 10 years, or more than 10 years.

In some embodiments, a promoter is a weak promoter for sustained expression of a transgene.

In some embodiments, promoters may be naturally occurring or non-naturally occurring. In some embodiments, examples of promoters include, but are not limited to, viral promoters, plant promoters, and animal promoters (e.g., mammalian promoters). In some embodiments, a promoter may be a human promoter.

In some embodiments, a promoter may be truncated relative to a reference. In some embodiments, a promoter may be mutated relative to a reference.

In some embodiments, a promoter may be one that drives expression in multiple tissues. In some embodiments, such a promoter which drives or promotes expression in multiple tissues includes, but is not limited to, human elongation factor 1a-subunit (EF1a), cytomegalovirus (CMV) immediate-early enhancer and/or promoter, chicken β-actin (CBA) and its derivative CAG, β-glucuronidase (GUSB), and ubiquitin C (UBC).

In some embodiments, tissue- or cell-specific expression elements can be used to restrict expression of a transgene to certain cell types.

In some embodiments, a tissue and/or cell specific promoter may be a neuron specific promoter. Suitable examples of tissue- or cell-specific expression elements for neurons include, but are not limited to, neuron-specific enolase (NSE) promoter, platelet-derived growth factor (PDGF) promoter, platelet-derived growth factor B-chain (PDGF-β) promoter, synapsin (Syn) promoter, methyl-CpG binding protein 2 (MeCP2) promoter, $Ca^{2+}$/calmodulin-dependent protein kinase II (CaMKII) promoter, metabotropic glutamate receptor 2 (mGluR2) promoter, neurofilament light (NFL) promoter, neurofilament heavy (NFH) promoter, β-globin minigene ηβ2 promoter, preproenkephalin (PPE) promoter, enkephalin (Enk) promoter and excitatory amino acid transporter 2 (EAAT2) promoter.

In some embodiments, a tissue and/or cell specific promoter may be an astrocyte specific promoter. Suitable examples of tissue- or cell-specific expression elements for astrocytes include, but are not limited to, glial fibrillary acidic protein (GFAP) promoter and EAAT2 promoter.

In some embodiments, a tissue and/or cell specific promoter may be an oligodendrocyte specific promoter. Suitable examples of tissue- or cell-specific expression elements for oligodendrocytes include, but are not limited to, myelin basic protein (MBP) promoter.

In some embodiments, a promoter is a ubiquitous promoter. In some embodiments, such a ubiquitous promoter can include, but is not limited to CMV, CBA (including its derivatives CAG, CBh, and the like), EF-1a, PGK, UBC, GUSB (hGBp), and UCOE.

In some embodiments, a promoter is not tissue- or cell-specific.

In some embodiments, a promoter is an engineered promoter.

In some embodiments, a promoter is a promoter from a naturally-expressed protein.

In some preferred embodiments, a promoter is a CAG promoter (e.g., comprising a CMV immediate early enhancer and a chicken R-actin promoter).

Site of Coupling on the AAV Vector

In some embodiments of the invention, a provided AAV vector is one that is modified by covalent coupling of at least one lactam (e.g., β-lactam) linker to at least one amino acid of the AAV capsid (e.g., to at least one capsid protein of the AAV vector). A typical AAV capsid comprises three capsid proteins, named VP1, VP2 and VP3. In some embodiments, at least one lactam (e.g., β-lactam) linker is covalently bound to at least one VP1 protein of an AAV vector. In some embodiments, at least one lactam (e.g., β-lactam) linker is covalently bound to at least one VP2 protein of the AAV vector. In some embodiments, at least one lactam (e.g., β-lactam) linker is covalently bound to at least one VP3 protein of the AAV vector.

In some embodiments, an AAV vector is modified by covalent coupling of at least one lactam (e.g., β-lactam) linker to at least one surface-exposed amino acid residue of at least one capsid protein of the AAV vector.

As used herein, the term "surface-exposed" refers to an amino acid residue with a side chain that is at least partially exposed at the outer surface of the AAV vector.

In some embodiments, at least one lactam (e.g., β-lactam) linker is covalently bound to at least one amino group of a surface-exposed amino acid residue of the capsid of an AAV vector. By "amino group" it is herein referred to a primary amine group (—NH$_2$) or a secondary amine group (—NH—), or salts thereof; preferably the amino group is a primary amino group. In some embodiments, the amino group is from an amino acid residue selected from lysine and arginine. In some preferred embodiments, the amino group is from a lysine residue, preferably from a surface-exposed lysine residue of the capsid of the AAV vector.

As used herein, "at least one amino group of an amino acid residue of the capsid" encompasses at least 1, 2, 3, 4, 5, 6, 7, 8, 9, 10, 20, 30, 40, 50, 60, 70, 80, 90, 100 or more amino groups of amino acid residue(s).

In some embodiments, the AAV vector of the invention comprises a plurality of (e.g., several) modified amino acid residues in its capsid. In some embodiments, a plurality of (e.g., several) amino acid residues of a same capsid protein are modified. In some embodiments, a plurality of (e.g., several) amino acid residues present in different capsid proteins are modified.

In some embodiments, the invention relates to an AAV vector comprising a moiety according to formula (II):

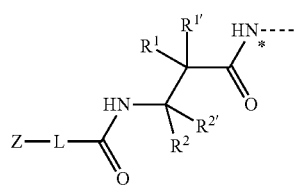

(II)

or a pharmaceutically acceptable salt thereof, wherein
N* is a nitrogen atom of an amino group of an amino acid residue of the AAV vector's capsid;
----- represents the point of attachment to the capsid of the AAV vector;
Z is a functional moiety, which may, in some embodiments, be characterized by and/or selected based on its ability to confer or achieve a particular functional modification of the AAV vector;
L is a linker; and
$R^1$, $R^{1'}$, $R^2$ and $R^{2'}$ are each independently hydrogen, halogen, or an optionally substituted $C_1$-6 alkyl; or
$R^1$ and $R^{1'}$ or $R^2$ and $R^{2'}$, together with their intervening atoms, may come together of form an optionally substituted spiro-fused ring; or
$R^1$ and $R^2$, together with their intervening atoms, may form an optionally substituted 3- to 7-membered saturated, partially unsaturated, or aryl or heteroaryl ring having 0-2 heteroatoms independently selected form nitrogen, oxygen, or sulfur;
preferably $R^1$, $R^{1'}$, $R^2$ and $R^{2'}$ are hydrogen.

General Description and Definitions

By "aryl group" it is herein referred to a polyunsaturated, aromatic hydrocarbyl group having a single ring (i.e. phenyl) or multiple aromatic rings fused together (e.g. naphthyl) or linked covalently, typically containing 5 to 12 atoms; preferably 6 to 10, wherein at least one ring is aromatic. A non-limiting example of aryl group is phenyl.

By "heteroaryl group" it is herein referred to a 5 to 12 carbon-atom aromatic ring or ring system containing 1 to 2 rings which are fused together or linked covalently, typically containing 5 to 6 atoms on each ring; at least one of which is aromatic and in which one or more carbon atoms in one or more of these rings is replaced by oxygen, nitrogen or sulfur atoms where the nitrogen and sulfur heteroatoms may optionally be oxidized and the nitrogen heteroatoms may optionally be quaternized. Such rings may be fused to an aryl, cycloalkyl, heteroaryl or heterocyclyl ring. Non-limiting examples of such heteroaryl groups include: triazolyl, pyrrolyl, furanyl, thiophenyl, pyrazolyl, imidazolyl, oxazolyl, isoxazolyl, thiazolyl, isothiazolyl, oxadiazolyl, thiadiazolyl, tetrazolyl, oxatriazolyl, thiatriazolyl, pyridinyl, pyrimidyl, pyrazinyl, pyridazinyl, oxazinyl, dioxinyl, thiazinyl, triazinyl, imidazo[2,1-b][1,3]thiazolyl, thieno[3,2-b] furanyl, thieno[3,2-b]thiophenyl, thieno[2,3-d][1,3]thiazolyl, thieno[2,3-d]imidazolyl, tetrazolo[1,5-a]pyridinyl, indolyl, indolizinyl, isoindolyl, benzofuranyl, isobenzofuranyl, benzothiophenyl, isobenzothiophenyl, indazolyl, benzimidazolyl, 1,3-benzoxazolyl, 1,2-benzisoxazolyl, 2,1-benzisoxazolyl, 1,3-benzothiazolyl, 1,2-benzoisothiazolyl, 2,1-benzoisothiazolyl, benzotriazolyl, 1,2,3-benzoxadiazolyl, 2,1,3-benzoxadiazolyl, 1,2,3-benzothiadiazolyl, 2,1,3-benzothiadiazolyl, thienopyridinyl, purinyl, imidazo[1,2-a] pyridinyl, 6-oxo-pyridazin-1(6H)-yl, 2-oxopyridin-1 (2H)-yl, 6-oxo-pyrudazin-1(6H)-yl, 2-oxopyridin-1(2H)-yl, 1,3-benzodioxolyl, quinolinyl, isoquinolinyl, cinnolinyl, quinazolinyl, quinoxalinyl. A preferred heteroaryl group used herein is triazolyl.

The term "heteroatom" means one or more of oxygen, sulfur, nitrogen, phosphorus, selenium, or silicon (including, any oxidized form of nitrogen, sulfur, phosphorus, selenium, or silicon; the quaternized form of any basic nitrogen or; a substitutable nitrogen of a heterocyclic ring, for example N (as in 3,4-dihydro-2H-pyrrolyl), NH (as in pyrrolidinyl) or NR$^+$ (as in N-substituted pyrrolidinyl)).

The term "unsaturated", as used herein, means that a moiety has one or more units of unsaturation.

The term "halogen" means F, Cl, Br, or I.

As described herein, compounds may contain "optionally substituted" moieties. In general, the term "substituted", whether preceded by the term "optionally" or not, means that one or more hydrogens of the designated moiety of compounds are replaced with a suitable substituent. "Substituted" applies to one or more hydrogens that are either explicit or implicit from the structure (e.g.,

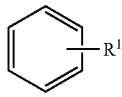

refers to at least

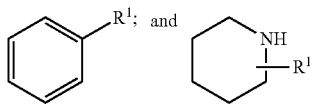

refers to at least

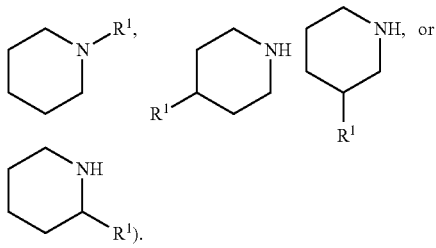

Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this disclosure are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R$^\circ$; —(CH$_2$)$_{0-4}$OR$^\circ$; —O(CH$_2$)$_{0-4}$R$^\circ$, —O—(CH$_2$)$_{0-4}$C(O)OR$^\circ$; —(CH$_2$)$_{0-4}$CH(OR$^\circ$)$_2$; —(CH$_2$)$_{0-4}$SR$^\circ$; —(CH$_2$)$_{0-4}$Ph, which may be substituted with R$^\circ$; —(CH$_2$)$_{0-4}$O(CH$_2$)$_{0-1}$Ph which may be substituted with R$^\circ$; —CH=CHPh, which may be substituted with R$^\circ$; —(CH$_2$)$_{0-4}$O(CH$_2$)$_{0-1}$-pyridyl which may be substituted with R$^\circ$; —NO$_2$; —CN; —N3; —(CH$_2$)$_{0-4}$N(R$^\circ$)$_2$; —(CH$_2$)$_{0-4}$N(R$^\circ$)C(O)R$^\circ$; —N(R$^\circ$)C(S)R$^\circ$; —(CH$_2$)$_{0-4}$N(R$^\circ$)C(O)NR$^\circ$$_2$; —N(R$^\circ$)C(S)NR$^\circ$$_2$; —(CH$_2$)$_{0-4}$N(R$^\circ$)C(O)OR$^\circ$; —N(R$^\circ$)N(R$^\circ$)C(O)R$^\circ$; —N(R$^\circ$)N(R$^\circ$)C(O)NR$^\circ$$_2$; —N(R$^\circ$)N(R$^\circ$)C(O)OR$^\circ$; —(CH$_2$)$_{0-4}$C(O)R$^\circ$; —C(S)R$^\circ$; —(CH$_2$)$_{0-4}$C(O)OR$^\circ$; —(CH$_2$)$_{0-4}$C(O)SR$^\circ$; —(CH$_2$)$_{0-4}$C(O)OSiR$^\circ$$_3$; —(CH$_2$)$_{0-4}$OC(O)R$^\circ$; —OC(O)(CH$_2$)$_{0-4}$SR$^\circ$, SC(S)SR$^\circ$; —(CH$_2$)$_{0-4}$SC(O)R$^\circ$; —(CH$_2$)$_{0-4}$C(O)NR$^\circ$$_2$; —C(S)NR$^\circ$$_2$; —C(S)SR$^\circ$; —SC(S)SR$^\circ$, —(CH$_2$)$_{0-4}$OC(O)NR$^\circ$$_2$; —C(O)N(OR$^\circ$)R$^\circ$; —C(O)C(O)R$^\circ$; —C(O)CH$_2$C(O)R$^\circ$; —C(NOR$^\circ$)R$^\circ$; —(CH$_2$)$_{0-4}$SSR$^\circ$; —(CH$_2$)$_{0-4}$S(O)$_2$R$^\circ$; —(CH$_2$)$_{0-4}$S(O)$_2$OR$^\circ$; —(CH$_2$)$_{0-4}$OS(O)$_2$R$^\circ$; —S(O)$_2$NR$^\circ$$_2$; —(CH$_2$)$_{0-4}$S(O)R$^\circ$; —N(R$^\circ$)S(O)$_2$NR$^\circ$$_2$; —N(R$^\circ$)S(O)$_2$R$^\circ$; —N(OR$^\circ$)R$^\circ$; —C(NH)NR$^\circ$$_2$; —P(O)$_2$R$^\circ$; —P(O)R$^\circ$$_2$; —OP(O)R$^\circ$$_2$; —OP(O)(OR$^\circ$)$_2$; SiR$^\circ$$_3$; —(C$_{1-4}$ straight or branched alkylene)O—N(R$^\circ$)$_2$; or —(C$_{1-4}$ straight or branched alkylene)C(O)O—N(R$^\circ$)$_2$, wherein each R$^\circ$ may be substituted as defined below and is independently hydrogen, C$_{1-6}$ aliphatic, —CH$_2$Ph, —O(CH$_2$)$_{0-1}$Ph, —CH$_2$-(5- to 6 membered heteroaryl ring), or a 5- to 6-membered saturated, partially unsaturated, or aryl ring having 0-4 heteroatoms independently selected from nitrogen, oxygen, or sulfur, or, notwithstanding the definition above, two independent occurrences of R$^\circ$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^\circ$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group of a compound of Formula II, and subgenera thereof, include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R* is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R†)S(O)₂R†; wherein each R† is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R† are independently halogen, —R●, -(haloR●), —OH, —OR●, —O(haloR●), —CN, —C(O)OH, —C(O)OR●, —NH₂, —NHR●, —NR●₂, or —NO₂, wherein each R● is unsubstituted or where preceded by "halo" is substituted only with one or more halogens, and is independently $C_{1-4}$ aliphatic, —CH₂Ph, —O(CH₂)₀₋₁Ph, or a 5-6-membered saturated, partially unsaturated, or aryl ring having 0-4 heteroatoms independently selected from nitrogen, oxygen, or sulfur.

As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, S. M. Berge et al., describe pharmaceutically acceptable salts in detail in J. Pharmaceutical Sciences, 1977, 66, 1-19, incorporated herein by reference. Pharmaceutically acceptable salts include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Additional or Alternative pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxyl-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, pivalate, propionate, stearate, succinate, sulfate, tartrate, thiocyanate, p-toluenesulfonate, undecanoate, valerate salts, and the like.

Salts derived from appropriate bases include alkali metal, alkaline earth metal, ammonium and $N^+(C_{1-4}alkyl)_4$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate and aryl sulfonate.

Unless otherwise stated, structures depicted herein are also meant to include all isomeric (e.g., enantiomeric, diastereomeric, and geometric (or conformational)) forms of the structure; for example, the R and S configurations for each asymmetric center, Z and E double bond isomers, and Z and E conformational isomers. Therefore, single stereochemical isomers as well as enantiomeric, diastereomeric, and geometric (or conformational) mixtures of the present compounds are within the scope of the present disclosure. Unless otherwise stated, all tautomeric forms are within the scope of the disclosure. Additionally, unless otherwise stated, the present disclosure also includes compounds that differ only in the presence of one or more isotopically enriched atoms. For example, compounds having the present structures including the replacement of hydrogen by deuterium or tritium, or the replacement of a carbon by a $^{13}C$- or $^{14}C$-enriched carbon are within the scope of this disclosure. Such compounds are useful, for example, as analytical tools, as probes in biological assays, or as therapeutic agents in accordance with the present disclosure. In some embodiments, compounds of this disclosure comprise one or more deuterium atoms.

Combinations of substituents and variables envisioned by this disclosure are only those that result in the formation of stable compounds. The term "stable", as used herein, refers to compounds which possess stability sufficient to allow manufacture and which maintains the integrity of the compound for a sufficient period of time to be useful for the purposes detailed herein (e.g., therapeutic or prophylactic administration to a subject).

Functional Moiety Z

The functional moiety Z may be of any type and is typically selected depending on the biological effect which is sought when chemically modifying the capsid of the AAV vector.

In some embodiments, Z is a functional moiety comprising, or consisting of, a cell-type specific ligand, a labelling agent, a steric shielding agent, a drug moiety or combinations thereof. In some embodiments, functional moiety Z may be also a (nano)-particle, including a magnetic (nano-) particle and a quantum dot. For instance, in some embodiments, Z may be an iron, stain, silicium, gold or carbon (nano)-particle.

In some embodiments, Z is a functional moiety comprising, or consisting of, a labeling agent, e.g. a fluorescent dye such as fluorescein, rhodamine, boron-dipyrromethene (Bodipy®) dyes, and Alexa Fluor®, or a radionuclide.

In some embodiments, Z is a functional moiety comprising, or consisting of, a steric shielding agent, e.g. an agent able to mask certain epitopes of the capsid, thereby avoiding the binding of neutralizing antibodies. For instance, in some embodiments, Z may be a polyethylene glycol (PEG), pHPMA, or a polysaccharide. In some embodiments, Z is a polyethylene glycol (PEG), comprising from 1 to 40 ethylene glycol monomers, e.g. from 1 to 10, such as e.g. —(OCH₂CH₂)— (referred to herein as "PEG1"), —(OCH₂CH₂)₂— (referred to herein as "PEG2"), —(OCH₂CH₂)₃— (referred to herein as "PEG3"), —(OCH₂CH₂)₄— (referred to herein as "PEG4"), or —(OCH₂CH₂)₅— (referred to herein as "PEG5").

In some embodiments, Z is a functional moiety comprising, or consisting of, a cell-type specific ligand, namely a ligand enabling targeting of a specific type of cell. In some embodiments, such a ligand can enable modification of the tropism of the AAV vector, namely its capacity to selectively infect and/or transduce a given cell line, tissue, and/or organ. For instance, in some embodiments, Z can be a ligand which specifically binds to a membrane biological entity (e.g. a membrane receptor) of the targeted cell. In some embodiments, such a ligand can be, for instance, a saccharide, a hormone, including a steroid hormone, a peptide such as RGD peptide, Angiopep-2 or muscle targeting peptides, a protein or a functionally active fragment thereof, a membrane receptor or a functionally active fragment thereof, CB1 and CB2 ligands, an antibody including heavy-chain antibody, or functionally active fragments thereof such as Fab, Fab', and VHH, a ScFv, a diabody, a spiegelmer, an aptamer including nucleic acid aptamer and peptide aptamer, a small chemical molecules known to bind to the targeted biological entity and the likes such as vitamins and drugs, and/or any suitable combination thereof.

By "functionally active fragment", it is meant a fragment of, e.g., a protein, a membrane receptor or an antibody, which retains the functional activity of its full-length counterpart.

In some embodiments, Z comprises, or consists of, a cell-type specific ligand derived from a saccharide. Details on saccharides are provided hereafter.

In some embodiments, Z comprises, or consists of, a cell-type specific ligand derived from proteins such as transferrin, Epidermal Growth Factor (EGF), and basic Fibroblast Growth Factor FGF.

In some embodiments, Z comprises, or consists of, a cell-type specific ligand derived from vitamins such as folic acid.

In some embodiments, Z comprises, or consists of, a cell-type specific ligand derived from a muscle targeting peptide (MTP). In certain embodiments, Z is a cancer cell targeting peptide and comprises a peptide such as RGD, including cyclic RGD.

In some embodiments, Z comprises, or consists of, a cell-type specific ligand derived from small molecules or hormones such as naproxen, ibuprofen, cholesterol, progesterone, or estradiol.

In some embodiments, Z comprises an antibody or antigen-binding portion thereof. In some such embodiments, an antibody may be or comprise, for example, a single chain antibody or variable domain, such as a camelid antibody, a heavy-chain antibody, a nanobody, a shark antibody, etc. In some embodiments, an antibody or antigen binding portion thereof may be or comprise a Fab, a Fab', a VHH, a ScFv, a diabody, etc. In some particular embodiments, an antibody or antigen binding portion thereof may be characterized by having specific affinity for a particular cell-specific protein, membrane protein, and/or membrane protein receptor.

In some embodiments, Z comprises or consists of a cell-type specific ligand selected from the group consisting of saccharides, hormones, peptides, proteins or fragments thereof, membrane receptors or fragments thereof, antibodies or fragments thereof, spiegelmers, nucleic acid or peptide aptamers, vitamins, and drugs. In a specific embodiment, Z is a saccharide selected from the group consisting of monosaccharides, oligosaccharides and polysaccharides; preferably Z is selected from the group consisting of mannose, glucose, galactose, fucose, desosamine, N-acetylglucosamine, N-acetylgalactosamine, S6-galactose, S6-N-acetylgalactosamine, glucuronic acid, P6-galactose and P1-galactose. In a specific embodiment, Z is a saccharide selected from the group consisting of monosaccharides, oligosaccharides and polysaccharides; preferably Z is selected from the group consisting of mannose, galactose, fucose, desosamine, N-acetylglucosamine, and N-acetylgalactosamine.

In some embodiments, Z comprises or consists of a saccharide.

In some embodiments, suitable examples of saccharides include, but are not limited to, monosaccharides, oligosaccharides, polysaccharides, and derivatives thereof.

As used herein, the term "derivatives" when referring to monosaccharides, oligosaccharides or polysaccharides, is meant to encompass saccharides containing one or more non-hydroxyl group(s). Examples of such non-hydroxyl groups include, but are not limited to, a hydrogen, an alkyl, an amino group (such as e.g. $NH_2$, an alkyl amino, a dialkyl amino), an N-acetylamino group and/or a thiol group.

In some embodiments, the non-hydroxyl group is a negatively charged group such as a phosphate, a phosphonate, a sulfate, a sulfonate and a carboxyl group.

"Monosaccharides", also called "simple sugars", are the simplest form of sugar and the most basic units of carbohydrates. Monosaccharides can be classified by the number of carbon atoms they contain, e.g., 3 (trioses), 4 (tetroses), 5 (pentoses), 6 (hexoses), 7 (heptoses), and so on.

Examples of monosaccharides include, but are not limited to, glycolaldehyde, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, and sedoheptulose.

Deoxymonosaccharides are common derivatives of monosaccharides encompassed in the present invention, i.e., monosaccharides that have had a hydroxyl group replaced with a hydrogen atom.

Examples of deoxymonosaccharides include, but are not limited to, deoxyribose, fucose, fuculose, rhamnose, quinovose, pneumose.

2-amino-2-deoxymonosaccharides are also common derivatives of monosaccharides encompassed in the present invention, i.e., monosaccharides that have had a hydroxyl group replaced with an amino group.

Examples of 2-amino-2-deoxymonosaccharides include, but are not limited to, glucosamine, galactosamine, and daunosamine, as well as their acetylated forms, including, but not limited to, N-acetylglucosamine, and N-acetylgalactosamine.

In some embodiments, the monosaccharide contains a negatively charged group such as a phosphate group, a sulfate group or a carboxyl group.

Examples of monosaccharides containing a phosphate group, include, but are not limited to, galactose-1-phosphate (P1-galactose) and galactose-6-phosphate (P6-galactose).

Examples of monosaccharides containing a sulfate group, include, but are not limited to, galactose-6-sulfate (S6-galactose), N-acetylgalactosamine-6-sulfate (S6-N-acetylgalactosamine).

Examples of monosaccharides containing a carboxyl group, include, but are not limited to, glucuronic acid.

It is to be understood that the monosaccharides and derivatives thereof mentioned herein also encompass acyclic (open-chain) forms and cyclic forms.

It is also to be understood that the monosaccharides and derivatives thereof mentioned herein also encompass D-stereoisomers and L-stereoisomers, as well as mixtures of D- and L-stereoisomers (e.g., racemic mixtures).

It is also to be understood that the monosaccharides and derivatives thereof mentioned herein also encompass α-anomers and β-anomers, as well as racemic mixtures of α- and β-anomers.

"Oligosaccharides" are saccharide polymers comprising a small number (typically from two to ten) of monosaccharides.

In some embodiments, an oligosaccharide according to the present invention comprises at least two, three, four, five, six, seven, eight, nine or ten monosaccharides, e.g., selected from the monosaccharides disclosed hereinabove, including their derivatives.

In some embodiments, such oligosaccharide(s) can be a homooligosaccharide (i.e., composed of units of the same monosaccharide, including their derivatives) or heterooligosaccharides (i.e., composed of units of at least two different monosaccharides, including their derivatives).

In some embodiments, examples of oligosaccharides include, but are not limited to, disaccharides, trisaccharides, tetrasaccharides, pentasaccharides, hexasaccharides, heptasaccharides, octasaccharides, nonasaccharides, and decasaccharides.

In some embodiments, specific examples of disaccharides include, but are not limited to, cellobiose, chitobiose, gentiobiose, gentiobiulose, isomaltose, kojibiose, lactose, lactulose, laminaribiose, maltose, maltulose, mannobiose, melibiose, melibiulose, nigerose, palatinose, rutinose, rutinulose, sophorose, sucrose, trehalose, turanose, and xylobiose.

In some embodiments, specific examples of trisaccharides include, but are not limited to, kestose, maltotriose, maltotriulose, melezitose, nigerotriose, and raffinose.

In some embodiments, specific examples of tetrasaccharides include, but are not limited to, lychnose, maltotetraose, nigerotetraose, nystose, sesamose, and stachyose.

In some embodiments, specific examples of oligosaccharides include, but are not limited to, acarbose, fructooligosaccharide, galactooligosaccharide, isomaltooligosaccharide, and maltodextrin.

In some embodiments, oligosaccharides can be multi-antennary structures whereby some or all monosaccharides in the oligosaccharide are not linked to one another through O-glycosidic bonds but with branched linker structures. An example of a multi-antennary saccharide is tri-antennary N-acetylgalactosamine, which is a ligand for asialoglycoprotein receptor ASGPR (see e.g., Zhou et al., Development of Triantennary N-Acetylgalactosamine Conjugates as Degraders for Extracellular Proteins; *ACS Cent. Sci.* 2021).

"Polysaccharides" are saccharide polymers comprising a large number (typically more than ten) of monosaccharides. They range in structure from linear to highly branched.

In some embodiments, a polysaccharide comprises more than ten monosaccharides (such as, e.g., 11, 12, 13, 14, 15, 16, 17, 18, 19, 20 or more), e.g., selected from monosaccharides disclosed hereinabove, including their derivatives. In a similar way as described above for oligosaccharides, polysaccharides can be homopolysaccharides or heteropolysaccharides.

In some embodiments, examples of polysaccharides include, but are not limited to, beta-glucans, lentinan, sizofiran, zymosan, cellulose, hemicellulose, chitin, chitosan, dextrins, dextran, fructan, inulin, galactan, glucan, glycogen, levan β2→6, lignin, mannan, pectin, starch, amylopectin, amylose, and xanthan gum.

In some embodiments, a saccharide or derivative thereof according to the present invention is a monosaccharide, preferably a hexose. In some embodiments, a preferential saccharide or derivative thereof according to the present invention is mannose, glucose, galactose, N-acetylglucosamine, N-acetylgalactosamine, S6-galactose, S6-N-acetylgalactosamine, glucuronic acid, P6-galactose or P1-galactose. In some embodiments, a preferential saccharide or derivative thereof according to the present invention is mannose, galactose, N-acetylglucosamine, or N-acetylgalactosamine.

In some embodiments, a saccharide or derivative thereof is mannose. In some embodiments, a saccharide or derivative thereof is galactose. In some embodiments, a saccharide or derivative thereof is N-acetylglucosamine. In some embodiments, a saccharide or derivative thereof is N-acetylgalactosamine.

In some embodiments, a saccharide or derivative thereof according to the present invention is a deoxymonosaccharide. In some preferential embodiments, a deoxymonosaccharide is preferably fucose.

In some embodiments, a saccharide or derivative thereof is a saccharide containing a non-hydroxyl group which is a dialkyl amino group. In some preferential embodiments, a saccharide containing a non-hydroxyl group which is a dialkyl amino group is a desosamine.

In some embodiments, a saccharide or derivative thereof is a saccharide containing a non-hydroxyl group which is a sulfate group. In some preferential embodiments, a saccharide containing a non-hydroxyl group which is sulfate group is S6-galactose, or S6-N-acetylgalactosamine.

In some embodiments, a saccharide or derivative thereof is a saccharide containing a non-hydroxyl group which is a phosphate group. In some preferential embodiments, a saccharide containing a non-hydroxyl group which is phosphate group is P6-galactose or P1-galactose.

In some embodiments, a saccharide or derivative thereof is a saccharide containing a non-hydroxyl group which is a carboxyl group. In some preferential embodiments, a saccharide containing a non-hydroxyl group which is carboxyl group is glucuronic acid.

In some embodiments, Z is selected from the group comprising, or consisting of, mannose, glucose, galactose, fucose, desosamine, N-acetylglucosamine, N-acetylgalactosamine, S6-galactose, S6-N-acetylgalactosamine, glucuronic acid, P6-galactose and P1-galactose. In some embodiments, Z is selected from the group comprising, or consisting of, mannose, galactose, fucose, desosamine, N-acetylglucosamine, and N-acetylgalactosamine.

Linker L

In some embodiments, a linker L is present for linking the functional moiety Z to the carbonyl moiety resulting from the opening of a lactam (e.g., β-lactam) group by an amino group of an amino acid residue of the capsid of the AAV vector.

In some embodiments, L may be any chemical chain which can comprise heteroatoms as well as cyclic moieties such as aryl and/or heteroaryl groups.

In some embodiments, L may comprise up to 1000 carbon atoms and even more. The length and the chemical nature of L may be optimized depending on the functional moiety Z which is intended to be coupled to the AAV vector and the biological effect which is sought.

In some embodiments, L is a chemical chain group comprising from 2 to 1000 carbon atoms, preferably from 2 to 500 carbon atoms, from 2 to 300 carbon atoms, e.g. from 2 to 100 carbon atoms, 2 to 40 carbon atoms, from 4 to 30 carbon atoms, or from 4 to 20 carbon atoms.

In some embodiments, L links the functional moiety Z to the carbonyl moiety, and preferably comprises up to 1000 carbon atoms and is preferably in the form of a chemical chain which optionally comprises heteroatoms (e.g. O, NH, S, Se or P) and/or cyclic moieties, such as aryl and/or heteroaryl groups.

In some embodiments, L may be selected from alkyl (e.g., $C_{1-20}$, $C_{1-12}$, $C_{1-6}$ alkyl), ether, polyether, polyester, alkyl amide, or a combination thereof. As used herein, "combination" means that L may comprise several hydrocarbon chains, oligomer chains or polymeric chains (e.g. 2, 3, 4, 5 or 6) linked by any appropriate group, such as —O—, —S—, —NHC(O)—, —OC(O)—, —C(O)—O—C(O)—, —NH—, —NH—CO—NH—, —O—CO—, —NH—(CS)—NH—, —NH—CS— phosphodiester or phosphorothioate groups. The use of a variety of alkyls is contemplated, including, but not limited to, —(CH$_2$)$_n$—, wherein "n" is from about 2 to about 20 or more. In some embodiments, L comprises a C$_{2-20}$ straight or branched alkyl chain. In some embodiments, L is a polyether (e.g., polyethylene or polypropylene glycol). The use of a variety of ethers and polyethers is contemplated, including, but not limited to, —(OCH$_2$CH$_2$)$_n$—, wherein "n" is an integer from about 1 to about 20 or more. In some embodiments, L is a polyethylene glycol ("PEG") of formula —(OCH$_2$CH$_2$)$_n$—, wherein "n" is an integer from 1-10, an integer from 1-6, and integer from 3-6, and integer from 3-5, or an integer selected from 1, 2, 3, 4, 5, 6, 7, 8, 9, or 10. In some embodiments, L is a polypropylene glycol, e.g., of formula —(OCH(CH$_3$)CH$_2$)$_n$—, wherein "n" is an integer from 1-10, an integer from 1-6, and integer from 3-6, and integer from 3-5, or an integer selected from 1, 2, 3, 4, 5, 6, 7, 8, 9, or 10. In some embodiments, L is an alkyl amide. The use of a variety of alkyl amides is contemplated, including, but not limited to, —(CH$_2$)$_m$—C(O)NH—(CH$_2$)$_p$— and —(OCH$_2$CH$_2$)$_m$—C(O)NH—(OCH$_2$CH$_2$)$_p$—, wherein "m" and "p" can be the same or different and "m" and "p" are from about 1 to about 20 or more. In some embodiments, L is an alkyl amide of formula —(CH$_2$)$_m$—C(O)NH—(CH$_2$)$_p$— or —(OCH$_2$CH$_2$)$_m$—C(O)NH—(OCH$_2$CH$_2$)$_p$—, wherein "m" and "p" are each independently selected from an integer from 1-10, an integer from 1-6, and integer from 3-6, and integer from 3-5, or an integer independently selected from 1, 2, 3, 4, 5, 6, 7, 8, 9, or 10. The use of a variety of amides having the linking units of alkyl or ether bonds is contemplated, including, but not limited to, —R$_5$—C(O)NH—R$_6$—, wherein "R$_5$" and "R$_6$" are each independently selected from alkyls (e.g., C$_{1-20}$, C$_{1-12}$, C$_{1-6}$ alkyl), ethers, or polyethers (e.g., PEGs having a molecular weight between about 200 to 2,000 g/mol).

In some embodiments, L may also comprise an alkylene diamine, e.g., —NH—(CH$_2$)$_r$—NH—, where "r" is an integer from 2 to 20, for instance from 2 to 10, or an integer selected from 2, 3, 4, or 5. In some embodiments, L is a polymer of alkylene diamines (also known as polyamines), e.g., a compound of formula —NH—[(CH$_2$)$_r$—NH]$_t$—, where "r" is as defined above and herein, and t is an integer of at least 2, for example of at least 3, 4, 5, 10 or more. Polymers of alkyl diamines of interest are, for instance, spermidine, and spermine.

In some embodiments, L may also comprise polyamides such as poly(N-(2-hydroxypropyl)methacrylamide) (pHPMA), (e.g., pHPMA having a molecular weight between about 200 and about 5000 g/mol).

In some embodiments, L may also comprise polyesters such as polycaprolactone (e.g., polycaprolactone having a molecular weight between about 200 and about 5000 g/mol) or poly(D,L-lactic-co-glycolic acid) (PLGA) (e.g., PLGA having a molecular weight between about 200 and about 5000 g/mol).

In some embodiments, L may be selected from an optionally substituted group comprising, or consisting of, a saturated or unsaturated, linear or branched C$_2$-C$_{40}$ hydrocarbon chains, polyethylene glycol, polypropylene glycol, pHPMA, PLGA, polymers of alkylene diamines, and combinations thereof.

In some embodiments, L is a polyethylene glycol (PEG), comprising from 2 to 40 ethylene glycol monomers, e.g. from 2 to 10, such as e.g. —(OCH$_2$CH$_2$)$_2$— (referred to herein as "PEG2"), —(OCH$_2$CH$_2$)$_3$— (referred to herein as "PEG3"), —(OCH$_2$CH$_2$)$_3$-(referred to herein as "PEG3"), —(OCH$_2$CH$_2$)$_4$— (referred to herein as "PEG4"), or —(OCH$_2$CH$_2$)$_5$— (referred to herein as "PEG5").

In some embodiments, L is may comprise one or more aromatic group such as aryl groups and/or heteroaryl group. For example, in some embodiments, L comprises an optionally substituted phenyl moiety. For example, in some embodiments, L comprises a triazolyl moiety, preferably a 1,2,3-triazolyl moiety. In some embodiments, L comprises both a phenyl and 1,2,3-triazolyl moiety.

In some embodiments, L may comprise an alkyl, ether, polyether, alkyl amide, aryl group, heteroaryl group, or a combination thereof. In a specific embodiment, L comprises a polyether, aryl group, heteroaryl group, or a combination thereof.

In a specific embodiment, L is a PEG comprising one or more aromatic groups, such as aryl groups and/or heteroaryl groups. In a specific embodiment, L is PEG comprising an aryl group and a heteroaryl group, preferably a phenyl group and a triazolyl group.

R$^1$, R$^{1'}$, R$^2$, and R$^{2'}$

In some embodiments, R$^1$, R$^{1'}$, R$^2$ and R$^{2'}$ are each independently hydrogen, halogen, or an optionally substituted C$_{1-6}$ alkyl. In some embodiments, each of R$^1$, R$^{1'}$, R$^2$ and R$^{2'}$ is hydrogen.

In some embodiments, R$^1$ is halogen. In some embodiments, R$^1$ is fluorine. In some embodiments, R$^1$ is optionally substituted C$_{1-6}$ alkyl. In some embodiments, R$^{1'}$ is halogen. In some embodiments, R$^{1'}$ is fluorine. In some embodiments, R$^{1'}$ is optionally substituted C$_{1-6}$ alkyl. In some embodiments, R$^2$ is halogen. In some embodiments, R$^2$ is fluorine. In some embodiments, R$^2$ is optionally substituted C$_{1-6}$ alkyl. In some embodiments, R$^{2'}$ is halogen. In some embodiments, R$^{2'}$ is fluorine. In some embodiments, R$^{2'}$ is optionally substituted C$_{1-6}$ alkyl.

In some embodiments, R$^1$ and R$^{1'}$ or R$^2$ and R$^{2'}$, together with their intervening atoms, come together of form an optionally substituted spiro-fused ring. In some embodiments, R$^1$ and R$^{1'}$ or R$^2$ and R$^{2'}$, together with their intervening atoms, come together of form an optionally substituted 6- to 11-membered spiro-fused ring having 0-4 heteroatoms independently selected form nitrogen, oxygen, and sufur.

In some embodiments, R$^1$ and R$^2$, together with their intervening atoms, form an optionally substituted 3- to 7-membered saturated, partially unsaturated, or aryl ring having 0-2 heteroatoms independently selected form nitrogen, oxygen, or sulfur.

Formulae of AAV Vectors

In some embodiments, the present invention relates to an AAV vector, comprising a moiety according to formula (II):

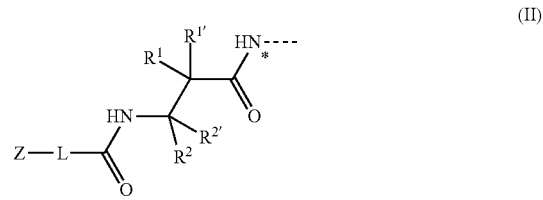

(II)

or a pharmaceutically acceptable salt thereof, wherein N*, -----, R$^1$, R$^{1'}$, R$^2$, R$^{2'}$ L, and Z are as defined and described in classes and subclasses above and herein.

In some embodiments, the present invention relates to an AAV vector, comprising a moiety according to formula (IIa):

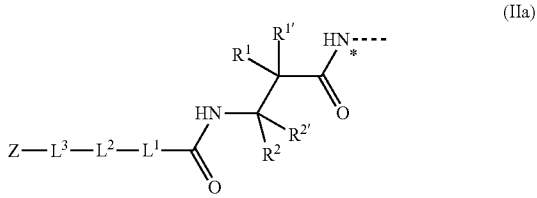

(IIa)

or a pharmaceutically acceptable salt thereof, wherein N*, ---, $R^1$, $R^{1'}$, $R^2$, $R^{2'}$ and Z are as defined and described in classes and subclasses above and herein;

$L^1$ is an optionally substituted aryl or heteroaryl group;

$L^2$ is an optionally substituted heteroaryl group; and $L^3$ is a linker, which preferably comprising up to 1000 carbon atoms and which is preferably in the form of a chemical chain which optionally comprises heteroatoms and/or cyclic moieties.

In some embodiments, $L^1$ is an optionally substituted aryl group. In some embodiments, $L^1$ is optionally substituted phenyl. In some embodiments, $L^1$ is phenyl. In some embodiments, $L^1$ is optionally substituted heteroaryl. In some embodiments, $L^1$ is an optionally substituted 6-membered heteroaryl group comprising 1-3 heteroatoms independently selected from nitrogen, oxygen, or sulfur. In some embodiments, $L^1$ is optionally substituted pyrazinyl, pyridinyl, pyrimidinyl, or triazinyl. In some embodiments, $L^1$ is pyrazinyl, pyridinyl, pyrimidinyl, or triazinyl.

In some embodiments, $L^2$ is an optionally substituted heteroaryl group. In some embodiments, $L^2$ is an optionally substituted 5-membered heteroaryl group comprising 1-3 heteroatoms independently selected from nitrogen, oxygen, or sulfur. In some embodiments, $L^2$ is an optionally substituted pyrazolyl, imidazolyl, or triazolyl. In some embodiments, $L^2$ is an optionally substituted triazolyl. In some embodiments, $L^2$ is an pyrazolyl, imidazolyl, or triazolyl. In some embodiments, $L^2$ is a triazolyl.

In some embodiments, $L^3$ is an optionally substituted group selected from the group consisting of saturated or unsaturated, linear or branched $C_2$-$C_{40}$ hydrocarbon chains, polyethylene glycol, polypropylene glycol, pHPMA, PLGA, polymers of alkyl diamines and combinations thereof; preferably $L^3$ is polyethylene glycol.

In some embodiments, $L^3$ may be selected from alkyl (e.g., $C_{1-20}$, $C_{1-12}$, $C_{1-6}$ alkyl), ether, polyether, polyester, alkyl amide, or a combination thereof. As used herein, "combination" means that $L^3$ may comprise several hydrocarbon chains, oligomer chains or polymeric chains (e.g. 2, 3, 4, 5 or 6) linked by any appropriate group, such as —O—, —S—, —NHC(O)—, —OC(O)—, —C(O)—O—C(O)—, —NH—, —NH—CO—NH—, —O—CO—, —NH—(CS)—NH—, —NH—CS— phosphodiester or phosphorothioate groups. The use of a variety of alkyls is contemplated, including, but not limited to, —(CH$_2$)$_n$—, wherein "n" is from about 2 to about 20 or more. In some embodiments, $L^3$ comprises a $C_{2-20}$ straight or branched alkyl chain. In some embodiments, $L^3$ is a polyether (e.g., polyethylene or polypropylene glycol). The use of a variety of ethers and polyethers is contemplated, including, but not limited to, —(OCH$_2$CH$_2$)$_n$—, wherein "n" is an integer from about 1 to about 20 or more. In some embodiments, $L^3$ is a polyethylene glycol ("PEG") of formula —(OCH$_2$CH$_2$)$_n$—, wherein "n" is an integer from 1-10, an integer from 1-6, and integer from 3-6, and integer from 3-5, or an integer selected from 1, 2, 3, 4, 5, 6, 7, 8, 9, or 10. In some embodiments, $L^3$ is a polypropylene glycol, e.g., of formula —(OCH(CH$_3$)CH$_2$)$_n$—, wherein "n" is an integer from 1-10, an integer from 1-6, and integer from 3-6, and integer from 3-5, or an integer selected from 1, 2, 3, 4, 5, 6, 7, 8, 9, or 10. In some embodiments, $L^3$ is an alkyl amide. The use of a variety of alkyl amides is contemplated, including, but not limited to, —(CH$_2$)$_m$—C(O)NH—(CH$_2$)$_p$— and —(OCH$_2$CH$_2$)$_m$—C(O)NH—(OCH$_2$CH$_2$)$_p$—, wherein "m" and "p" can be the same or different and "m" and "p" are from about 1 to about 20 or more. In some embodiments, $L^3$ is an alkyl amide of formula —(CH$_2$)$_m$—C(O)NH—(CH$_2$)$_p$— or —(OCH$_2$CH$_2$)$_m$—C(O)NH—(OCH$_2$CH$_2$)$_p$—, wherein "m" and "p" are each independently selected from an integer from 1-10, an integer from 1-6, and integer from 3-6, and integer from 3-5, or an integer independently selected from 1, 2, 3, 4, 5, 6, 7, 8, 9, or 10. The use of a variety of amides having the linking units of alkyl or ether bonds is contemplated, including, but not limited to, —R$_5$—C(O)NH—R$_6$—, wherein "R$_5$" and "R$_6$" are each independently selected from alkyls (e.g., $C_{1-20}$, $C_{1-12}$, $C_{1-6}$ alkyl), ethers, or polyethers.

In some embodiments, $L^3$ may also comprise an alkylene diamine, e.g., —NH—(CH$_2$)$_r$—NH—, where "r" is an integer from 2 to 20, for instance from 2 to 10, or an integer selected from 2, 3, 4, or 5. In some embodiments, $L^3$ is a polymer of alkylene diamines (also known as polyamines), e.g., a compound of formula —NH—[(CH$_2$)$_r$—NH]$_t$—, where "r" is as defined above and herein, and t is an integer of at least 2, for example of at least 3, 4, 5, 10 or more. Polymers of alkyl diamines of interest are, for instance, spermidine, and spermine.

In some embodiments, $L^3$ may also comprise polyamides such as poly(N-(2-hydroxypropyl)methacrylamide) (pHPMA), (e.g., pHPMA having a molecular weight between about 200 and about 5000 g/mol).

In some embodiments, $L^3$ may also comprise polyesters such as poly caprolactone (e.g., polycaprolactone having a molecular weight between about 200 and about 5000 g/mol) or poly(D,L-lactic-co-glycolic acid) (PLGA) (e.g., PLGA having a molecular weight between about 200 and about 5000 g/mol).

In some embodiments, $L^3$ may be selected from an optionally substituted group comprising, or consisting of, saturated or unsaturated, linear or branched $C_2$-$C_{40}$ hydrocarbon chains, polyethylene glycol, polypropylene glycol, pHPMA, PLGA, polymers of alkylene diamines, and combinations thereof.

In some embodiments, $L^3$ is a polyethylene glycol (PEG), comprising from 2 to 40 ethylene glycol monomers, e.g. from 2 to 10, such as e.g. —(OCH$_2$CH$_2$)$_2$— (referred to herein as "PEG2"), —(OCH$_2$CH$_2$)$_3$— (referred to herein as "PEG3"), —(OCH$_2$CH$_2$)$_3$-(referred to herein as "PEG3"), —(OCH$_2$CH$_2$)$_4$— (referred to herein as "PEG4"), or —(OCH$_2$CH$_2$)$_5$— (referred to herein as "PEG5").

In some embodiments, $L^3$ is may comprise one or more aromatic group such as aryl groups and/or heteroaryl group. For example, in some embodiments, L comprises an optionally substituted phenyl moiety. For example, in some embodiments, L comprises a triazolyl moiety, preferably a 1,2,3-triazolyl moiety. In some embodiments, $L^3$ comprises both a phenyl and 1,2,3-triazolyl moiety.

In some embodiments, $L^3$ may be comprise an alkyl, ether, polyether, alkyl amide, aryl group, heteroaryl group, or a combination thereof. In a specific embodiment, $L^3$ comprises a polyether, aryl group, heteroaryl group, or a combination thereof.

In a specific embodiment, $L^3$ is a PEG comprising one or more aromatic groups, such as aryl groups and/or heteroaryl groups. In a specific embodiment, $L^3$ is PEG comprising an aryl group and a heteroaryl group, preferably a phenyl group and a triazolyl group.

In some embodiments, the present invention relates to an AAV vector, comprising a moiety according to formula (IIb):

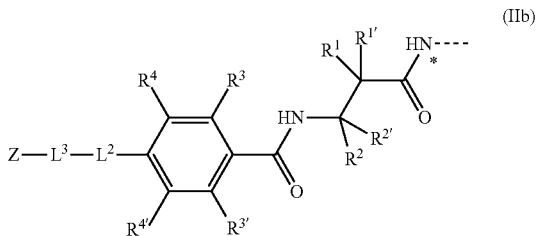

(IIb)

or a pharmaceutically acceptable salt thereof, wherein
-----, $N^*$, $R^1$, $R^{1'}$, $R^2$, $R^{2'}$, $L^2$, $L^3$ and Z are as defined and described in classes and subclasses above and herein;
$R^3$, $R^{3'}$, $R^4$ and $R^{4'}$ are each independently hydrogen, halogen, —OR, —$NR_2$, —CN, —SR or an optionally substituted group selected from $C_{1-6}$ alkyl or a 3- to 7-membered saturated, partially unsaturated, aryl, or heteroaryl ring having 0-3 heteroatoms independently selected form nitrogen, oxygen, or sulfur; or
$R^3$ and $R^4$, or $R^{3'}$ and $R^{4'}$, together with their intervening atoms, may form an optionally substituted 3- to 7-membered saturated, partially unsaturated, or aryl or heteroaryl ring having 0-2 heteroatoms independently selected form nitrogen, oxygen, or sulfur;
preferably $R^3$, $R^{3'}$, $R^4$ and $R^{4'}$ are hydrogen atoms; and
each R is independently selected from hydrogen or $C_{1-6}$ alkyl.

In some embodiments, $R^3$ is hydrogen. In some embodiments, $R^3$ is halogen. In some embodiments, $R^3$ is fluorine. In some embodiments, $R^3$ is an optionally substituted group selected from $C_{1-6}$ alkyl. In some embodiments, $R^3$ is methyl, ethyl, propyl, butyl, pentyl, or hexyl. In some embodiments, $R^3$ is optionally substituted phenyl. In some embodiments, $R^3$ is an optionally substituted saturated or partially unsaturated ring comprising 0-3 heteroatoms independently selected from nitrogen, oxygen, or sulfur. In some embodiments, $R^3$ is an optionally substituted 5- to 6-membered heteroaryl ring having 1-3 heteroatoms independently selected from nitrogen, oxygen, or sulfur.

In some embodiments, $R^{3'}$ is hydrogen. In some embodiments, $R^{3'}$ is halogen. In some embodiments, $R^{3'}$ is fluorine. In some embodiments, $R^{3'}$ is an optionally substituted group selected from $C_{1-6}$ alkyl. In some embodiments, $R^{3'}$ is methyl, ethyl, propyl, butyl, pentyl, or hexyl. In some embodiments, $R^{3'}$ is optionally substituted phenyl. In some embodiments, $R^{3'}$ is an optionally substituted saturated or partially unsaturated ring comprising 0-3 heteroatoms independently selected from nitrogen, oxygen, or sulfur. In some embodiments, $R^{3'}$ is an optionally substituted 5- to 6-membered heteroaryl ring having 1-3 heteroatoms independently selected from nitrogen, oxygen, or sulfur.

In some embodiments, $R^4$ is hydrogen. In some embodiments, $R^4$ is halogen. In some embodiments, $R^4$ is fluorine. In some embodiments, $R^4$ is an optionally substituted group selected from $C_{1-6}$ alkyl. In some embodiments, $R^4$ is methyl, ethyl, propyl, butyl, pentyl, or hexyl. In some embodiments, $R^4$ is optionally substituted phenyl. In some embodiments, $R^4$ is an optionally substituted saturated or partially unsaturated ring comprising 0-3 heteroatoms independently selected from nitrogen, oxygen, or sulfur. In some embodiments, $R^4$ is an optionally substituted 5- to 6-membered heteroaryl ring having 1-3 heteroatoms independently selected from nitrogen, oxygen, or sulfur.

In some embodiments, $R^{4'}$ is hydrogen. In some embodiments, $R^{4'}$ is halogen. In some embodiments, $R^{4'}$ is fluorine. In some embodiments, $R^{4'}$ is an optionally substituted group selected from $C_{1-6}$ alkyl. In some embodiments, $R^{4'}$ is methyl, ethyl, propyl, butyl, pentyl, or hexyl. In some embodiments, $R^{4'}$ is optionally substituted phenyl. In some embodiments, $R^{4'}$ is an optionally substituted saturated or partially unsaturated ring comprising 0-3 heteroatoms independently selected from nitrogen, oxygen, or sulfur. In some embodiments, $R^{4'}$ is an optionally substituted 5- to 6-membered heteroaryl ring having 1-3 heteroatoms independently selected from nitrogen, oxygen, or sulfur.

In some embodiments, $R^3$ and $R^4$, or $R^{3'}$ and $R^{4'}$, together with their intervening atoms, may form an optionally substituted 3- to 7-membered saturated, partially unsaturated, or aryl or heteroaryl ring having 0-2 heteroatoms independently selected form nitrogen, oxygen, or sulfur.

In some embodiments, each of $R^3$, $R^{3'}$, $R^4$ and $R^{4'}$ is hydrogen.

In some embodiments, the present invention relates to an AAV vector, comprising a moiety according to formula (IIc):

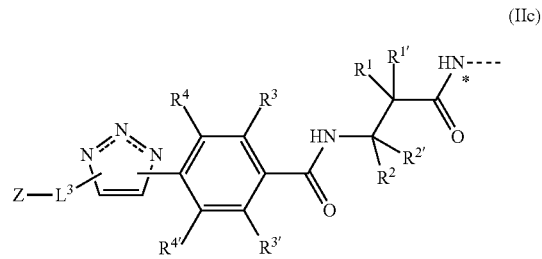

(IIc)

or a pharmaceutically acceptable salt thereof, wherein
-----, $N^*$, $R^1$, $R^{1'}$, $R^2$, $R^{2'}$, $R^3$, $R^{3'}$, $R^4$, $R^{4'}$, $L^3$ and Z are as defined and described in classes and subclasses above and herein; and
each ═══ is independently a single or double bond.

In some embodiments, each ═══ is independently a single or double bond, such that the resulting ring is triazolyl.

In some embodiments, the present invention relates to an AAV vector, comprising a moiety according to formula (IId):

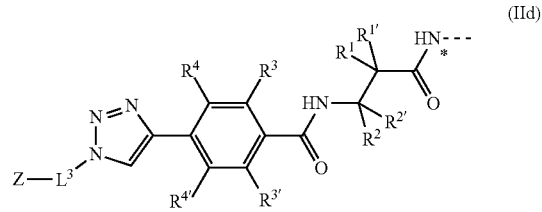

(IId)

or a pharmaceutically acceptable salt thereof, wherein
-----, $N^*$, $R^1$, $R^{1'}$, $R^2$, $R^{2'}$, $R^3$, $R^{3'}$, $R^4$, $R^{4'}$, $L^3$ and Z are as defined and described in classes and subclasses above and herein.

In some embodiments, the present invention relates to an AAV vector, comprising a moiety according to formula (IIe):

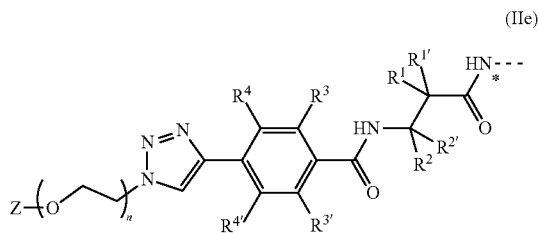

(IIe)

or a pharmaceutically acceptable salt thereof, wherein
-----, N*, $R^1$, $R^{1'}$, $R^2$, $R^{2'}$, $R^3$, $R^{3'}$, $R^4$, $R^{4'}$ and Z are as defined and described in classes and subclasses above and herein, and n is an integer ranging from 1 to 20; preferably n is ranging from 3 to 5; more preferably n is 3.

It will be appreciated that, in the case wherein L (or $L^3$) comprises a PEG group directly linked to the functional moiety Z, the terminal oxygen atom of the PEG group when present on the side of Z can be part of Z. This is the case for example when Z is a saccharide wherein the anomeric carbon bears the PEG linker. This case is illustrated with linkers (1)-(4) detailed hereafter and implemented as listed below.

In an illustrative embodiment, the AAV vector of the invention is selected from:

TABLE 1

| n° | Structure |
|---|---|
| (1)-AAV | |
| (2)-AAV | |
| (3)-AAV | |
| (4)-AAV | |
| (5)-AAV | |

TABLE 1-continued

| n° | Structure |
|---|---|
| (6)-AAV | [Chemical structure: N-acetylglucosamine with triethylene glycol linker to triazole-phenyl-amide-β-alanine-AAV] |
| (7)-AAV | [Chemical structure: 6-O-sulfonate (NaO₃SO) galactose with triethylene glycol linker to triazole-phenyl-amide-β-alanine-AAV] |
| (8)-AAV | [Chemical structure: 6-O-sulfonate (HO₃SO) N-acetylglucosamine with triethylene glycol linker to triazole-phenyl-amide-β-alanine-AAV] |
| (9)-AAV | [Chemical structure: glucuronate (sodium salt) with triethylene glycol linker to triazole-phenyl-amide-β-alanine-AAV] | and pharmaceutically acceptable salts thereof.

In an illustrative embodiment, the AAV vector of the invention comprises a moiety selected from:

TABLE 1'

| n° | Structure of modification |
|---|---|
| (1)-AAV | [Chemical structure: mannose/galactose with triethylene glycol linker to triazole-phenyl-amide-β-alanine-NH----] |

TABLE 1'-continued

| n° | Structure of modification |
|---|---|
| (2)-AAV | |
| (3)-AAV | |
| (4)-AAV | |
| (5)-AAV | |
| (6)-AAV | |
| (7)-AAV | |

TABLE 1'-continued

| n° | Structure of modification |
|---|---|
| (8)-AAV | 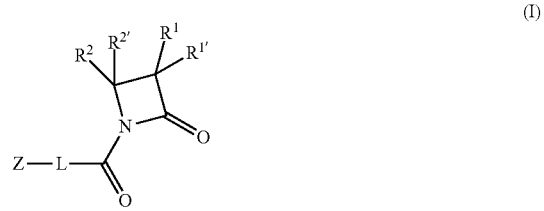 |
| (9)-AAV | 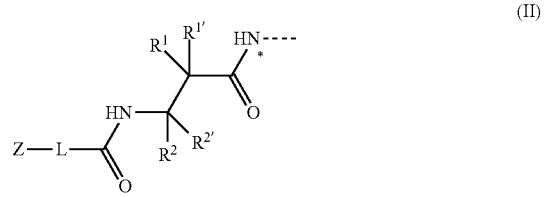 | and pharmaceutically acceptable salts thereof;
wherein N* is a nitrogen atom of an amino group of an amino acid residue of the AAV vector's capsid.

In some embodiments, the AAV vector of the invention is selected from (1)-AAV2, (2)-AAV2, (3)-AAV2, (4)-AAV2, (7)-AAV2, (8)-AAV2, (9)-AAV2, (1)-AAV5, (1)-AAV8, (3)-AAV8, and (1)-AAV9. In some embodiments, the AAV vector of the invention is selected from (1)-AAV2, (2)-AAV2, (3)-AAV2, (4)-AAV2, (1)-AAV5, (1)-AAV8, (3)-AAV8, and (1)-AAV9. The nomenclature used herein, e.g., "(1)-AAV2", refers to an AAV vector of serotype AAV2 which is modified with moiety (1), resulting in (1)-AAV2. The same nomenclature is used for the other AAV serotypes and modifying groups.

In some embodiments, the AAV vector of the invention is (1)-AAV2 comprising at least one transgene comprising the cDNA from a GBA gene, preferably a human GBA gene, optionally the transgene is under control of a at least one regulatory element, preferably of a promoter as defined above, more preferably of a CAG promoter.

An exemplary nucleic acid sequence of the cDNA of the human GBA gene comprises or consists of SEQ ID NO: 1, or a nucleic acid sequence having at least 70, 75, 80, 85, 90, 91, 92, 93, 94, 95, 96, 97, 98, 99% or more sequence identity with SEQ ID NO: 1.

In one embodiment, the nucleic acid sequence of the cDNA of the human GBA gene encodes an amino acid sequence comprising or consisting of SEQ ID NO: 2, or an amino acid sequence having at least 70, 75, 80, 85, 90, 91, 92, 93, 94, 95, 96, 97, 98, 99% or more sequence identity with SEQ ID NO: 2.

In some embodiments, the AAV vector of the invention is not an AAV vector comprising moiety (1), resulting in (1)-AAV.

Method for Preparing Lactam Modified AAV Vectors

In some embodiments, this invention further relates to methods of manufacturing of an AAV vector according to the invention. In some embodiments, a method of the present invention comprises incubating the AAV vector with a compound comprising a lactam (e.g., β-lactam) group in conditions suitable for reacting said lactam (e.g., β-lactam) group with at least one amino group of an amino acid residue of the capsid of the AAV vector so as to open the lactam (e.g., β-lactam) and form a covalent bond.

In some embodiments, a method of manufacturing of an AAV vector according to the invention comprises the step of incubating an AAV with a compound of formula (I)

(I)

or a salt thereof,
wherein $R^1$, $R^{1'}$, $R^2$, $R^{2'}$, L and Z are as herein defined and described in classes and subclasses herein;
under conditions suitable to obtain at least one moiety of formula (II):

(II)

wherein -----, N*, $R^1$, $R^{1'}$, $R^2$, $R^{2'}$, L and Z are as defined above and described in classes and subclasses herein.

In some embodiments, suitable conditions to obtain at least one moiety of formula (II) include those suitable for reacting a β-lactam with an amine of an amino acid residue of the capsid of the AAV vector.

In some embodiments, an AAV vector is incubated with a compound comprising a lactam (e.g., β-lactam) group (e.g., a compound of formula (I)) in conditions suitable to promote the formation of a covalent bond between an amino group of an amino acid residue of the capsid of the AAV vector and said lactam (e.g., β-lactam) group without impairing the structural integrity of said AAV.

In some embodiments, an incubation can be performed in an aqueous buffer having a pH ranging from 5.5 to 10, preferably from 7 to 10, e.g. from 9 to 10, such as 9.3. In some preferred embodiments, the pH is 9.3.

In some embodiments, an incubation buffer can be selected from TRIS buffer, borate buffer, Hepes buffer, acetate buffer, phosphate buffer e.g. PBS, or Dulbecco's phosphate-buffered saline (dPBS). In some preferred embodiments, the buffer is TRIS buffer.

In some embodiments, an incubation can last from several minutes to several hours, for instance from 5 min to 6 hours, e.g. from 3 to 5 hours. In some preferential embodiments, the incubation is about 4 hours. In some embodiments, the incubation is ended when a sufficient yield of coupling is achieved.

In some embodiments, the temperature of incubation is typically from 4° C. to 50° C. In some preferential embodiments, the incubation is performed at room temperature, i.e. at a temperature from 18° C. to 30° C., e.g. at around 20° C. In some embodiments, the incubating solution can be stirred.

In some embodiments, the molar ratio of the compound comprising the lactam (e.g., β-lactam) group to the AAV vector may be from $1 \cdot 10^5$ to $1 \cdot 10^7$, e.g. $1 \cdot 10^6$ to $5 \cdot 10^6$. In some preferential embodiments, there is a $3 \cdot 10^6$ equivalents molar excess of the lactam (e.g., β-lactam).

In some embodiments, a method of the invention may comprise one or several additional steps prior to, or after the step of incubation as described above.

For instance, in some embodiments, a method of the invention may comprise a preliminary step of providing or producing an AAV vector to be modified. In some embodiments, a method of the invention may also comprise a preliminary step of providing or preparing the compound comprising a lactam (e.g., β-lactam) group (e.g., a compound of formula (I)).

In some embodiments, a method of the invention may also comprise one or several additional steps following the step of incubation, such as:
- a step of removing the unreacted compound comprising a lactam (e.g., β-lactam) group (e.g., a compound of formula (I)) at the end of the incubation step, e.g. by dialysis or tangential flow filtration, and/or
- a step of collecting the chemically modified AAV particles, and/or
- a step of purifying the AAV vector, and/or
- a step of recovering the AAV vector, and/or
- a step of formulating and/or packaging the AAV vector.

Compounds Comprising Lactam Groups

In some embodiments, the invention further relates to compounds comprising a lactam (e.g., β-lactam) group used to obtain the AAV vectors of the invention.

In some embodiments, the present invention provides a compound of formula (I):

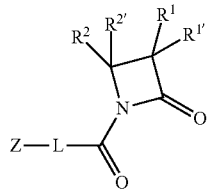

or a salt thereof, wherein
Z, L, $R^1$, $R^{1'}$, $R^2$, and $R^{2'}$ are as defined and described in classes and subclasses above and herein.

In some embodiments, a provided compound is of formula (Ia):

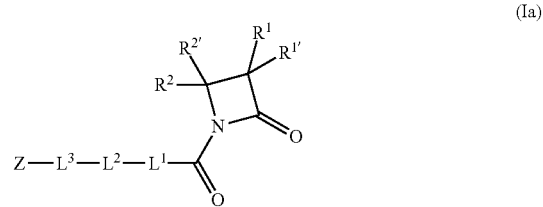

or a salt thereof, wherein
Z, $L^1$, $L^2$, $L^3$, $R^1$, $R^{1'}$, $R^2$, and $R^{2'}$ are as defined and described in classes and subclasses above and herein.

In some embodiments, a provided compound is of formula (Ib):

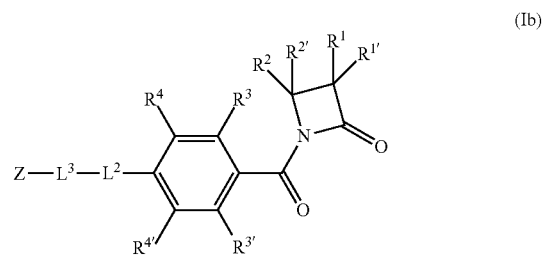

or a salt thereof, wherein
$R^1$, $R^{1'}$, $R^2$, $R^{2'}$, $R^3$, $R^{3'}$, $R^4$, $R^{4'}$ $L^2$, $L^3$ and Z are as defined and described in classes and subclasses above and herein.

In some embodiments, a provided compound is of formula (Ic):

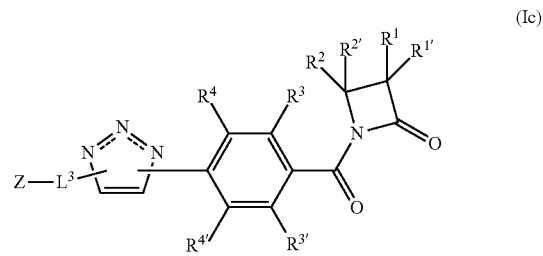

or a salt thereof, wherein $R^1$, $R^{1'}$, $R^2$, $R^{2'}$, $R^3$, $R^{3'}$, $R^4$, $R^{4'}$, $L^3$, Z, and ⁝⁝⁝ are as defined and described classes and subclasses above and herein.

In some embodiments, a provided compound is of formula (Id):

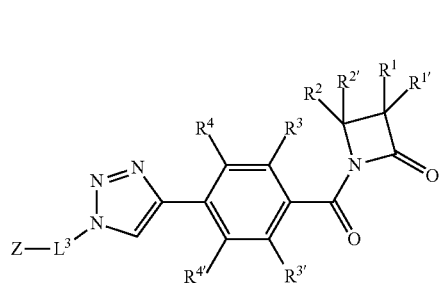

(Id)

or a salt thereof, wherein $R^1$, $R^{1'}$, $R^2$, $R^{2'}$, $R^3$, $R^{3'}$, $R^4$, $R^{4'}$, $L^3$ and Z are as defined and described in classes and subclasses above and herein.

In some embodiments, a provided compound is of formula (Ie):

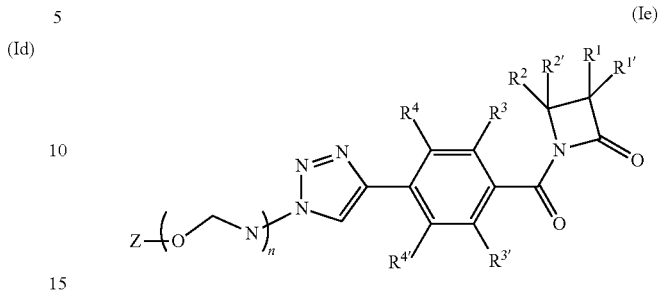

(Ie)

or a salt thereof, wherein $R^1$, $R^{1'}$, $R^2$, $R^{2'}$, $R^3$, $R^{3'}$, $R^4$, $R^{4'}$ and Z are as defined and described in classes and subclasses above and herein; and n is an integer ranging from 1 to 20; preferably n is ranging from 3 to 5; more preferably n is 3.

In some embodiments, a compound is selected from a compound of Table 2, or a salt thereof

TABLE 2

| n° | Structure | Saccharide |
|---|---|---|
| (1) | | mannose |
| (2) | | galactose |
| (3) | | fucose |
| (4) | | desosamine |
| (5) | | none |

TABLE 2-continued

| n° | Structure | Saccharide |
|---|---|---|
| (6) | [structure with sugar, PEG linker, triazole, phenyl, lactam] | N-acetyl-glucosamine |
| (7) | [structure with NaO₃SO-sugar, PEG linker, triazole, phenyl, lactam] | S6-galactose |
| (8) | [structure with HO₃SO-sugar, NHAc, PEG linker, triazole, phenyl, lactam] | S6-N-acetyl-galactosamine |
| (9) | [structure with carboxylate ONa-sugar, PEG linker, triazole, phenyl, lactam] | glucuronic acid |

In some embodiments, the present invention provides compounds of formula (I), (Ia), (Ib), (Ic), (Id), or (Ie), or salts thereof, provided that the compound is not compound (1).

It will be appreciated, that compounds of formula (I) can be manufactured by methods known by one skilled in the art.

In the case of compounds of formula (I) comprising a triazole, a step of click chemistry can be used to provide the compound. As an illustration, one can refer to the synthesis of lactam linkers (1), (2), (3), (4), (5), (6), (7), (8) and (9) described in the Example section.

Uses of Provided AAV Vectors

In some embodiments, AAV vectors of the present invention can be used as a research tool. In some embodiments, AAV vectors of the present invention can be used as a medicament, for instance in gene therapy as vectors for the delivery of therapeutic nucleic acids such as DNA or RNA. In some embodiments, AAV vectors of the present invention can be used in a diagnostic means, e.g. as an imaging agent. In some embodiments, AAV vectors of the present invention can be used as a combination of both a therapeutic and diagnostic tool, e.g., theragnostic use.

Modifications of Biological Functionalities and/or Properties of AAV Vectors

In some embodiments, chemical modifications of the capsid of an AAV vector may modify one, or several, of its biological functionalities and/or properties. In some embodiments, biological functionalities and/or properties can depend on the nature of functional moiety Z which is introduced to modify the AAV vector in the present invention. In some embodiments, one or more biological properties of a modified AAV vector can be altered compared to the unmodified AAV vector, such as:

- a modified selectivity of the AAV vector towards a specific organ, tissue, and/or cell type (e.g. an increased selectivity or a shifted selectivity from one tissue/organ/cell to another); and/or
- a modified immunoreactivity of the AAV vector, e.g. a decreased immunogenicity of the AAV vector and/or a decreased affinity for neutralizing antibodies, and/or said AAV vector triggers an altered humoral response when administered in vivo, e.g. does not generate AAV-directed neutralizing antibodies; and/or
- an increased infectivity efficiency of the AAV vector; and/or an increased transduction efficacy of the AAV vector towards a specific cell, tissue, and/or organ; and/or a reduced cellular toxicity when transducing cells in culture; and/or an induced cellular targeted mortality of cancer cells; and/or enabling the visualization/monitoring of the AAV vector upon in vivo administration or upon modification of cells in vitro; and/or enabling theragnostic applications; e.g. combining a therapeutic agent and a diagnostic agent.

In some embodiments, when the AAV vector is used as a medicament, e.g. as a gene vector for gene therapy, such modified properties may result in an improvement in the therapeutic index of the AAV vector. In some embodiments, an improvement in the therapeutic index of the AAV vector can result from decreases in the relative dose of AAV to administer to the subject in order to achieve the sought therapeutic effect, such a reduction in dosage can decrease the relative toxicity of the AAV therapeutic regime.

In some embodiments, an AAV vector of the present invention shows a preferential tropism for an organ or cell selected from liver, heart, brain, joints, retina, and/or skeletal muscle. In some embodiments, an AAV vector of the invention shows a preferential tropism for cultured cells selected from, but not limited to, hepatocytes, cardiomyocytes, myocytes, neurons, motor neurons, retinal pigmented cells, photoreceptors, chondrocytes, hematopoietic stem cells (HSC), and/or induced pluripotent stem cells (iPS).

Uses and Method for Transducing Cells

In some embodiments, the present invention relates to an AAV vector according to the present invention, for use in transducing a cell of a subject.

By "transducing a cell" it is herein referred to delivering a nucleic acid into a cell. The transduced nucleic acid of interest may be of any type and is selected depending on the sought effect. In some embodiments, when the AAV vector according to the present invention is used for transducing a cell, it comprises a transgene.

In some embodiments, for example, an AAV vector can comprise an exogenous gene expression cassette. In some embodiments, said cassette may comprise a promoter, a gene of interest, and a terminator. In some embodiments, as an additional or alternative example, an AAV vector of the invention may comprise a DNA template for homologous recombination in cells. In some embodiments, such an AAV vector can be used in combination with gene editing tools, for promoting homologous recombination in targeted cells. In some embodiments, the gene editing tools can be of any type, and encompass, without being limited to, CRISPR and its associated systems (including without limitation a Cas protein such as a Cas9 protein, or fusion protein thereof, a crRNA and tracrRNA, the latter two being either separate or linked together in a single gRNA), TALEN, Zinc Finger Nuclease, meganuclease, as well as RNA and DNA encoding said gene editing proteins and their associated systems.

In some embodiments, the present invention also relates to use of an AAV vector according to the present invention for transducing a cell of a subject.

In some embodiments, the present invention also relates to a method for transducing a cell of a subject, comprising administering an AAV vector according to the present invention to said subject.

In some embodiments, the present invention also relates to a method of delivering a transgene to a cell, the method comprising contacting a cell with an AAV vector according to the invention, i.e. an AAV vector comprising a functional moiety covalently linked to an amino group of the AAV vector's capsid via a moiety resulting from the reaction of a compound comprising a β-lactam moiety with said amino group, and the transgene to be expressed in the contacted cell.

In some embodiments, the present invention also relates to a method for delivering a transgene into a cell of a subject, comprising administering an AAV vector according to the present invention comprising said transgene to said subject.

In some embodiments, the present invention further relates to an in vitro or ex vivo method for transducing a cell, comprising contacting said cell with an AAV vector according to the invention. In some embodiments, the cell may be from a subject (e.g., a patient). In some embodiments, after transduction, the cell may be transplanted to a subject in need thereof (e.g., the patient, and/or another subject).

In some embodiments, an AAV vector can be administered to a cell in vivo, ex vivo, or in vitro. In some embodiments, the cell may be derived from a mammal (e.g., humans, non-human primates, cows, mice, sheep, goats, pigs, rats, etc.) In some embodiments, the cell may be derived from a human. In some embodiments, the cell may be, but is not limited to, hepatocytes, cardiomyocytes, myocytes, neurons, motor neurons, retinal pigmented cells, photoreceptors, chondrocytes, hematopoietic stem cells (HSC), or induced pluripotent stem cells (iPS).

In some embodiments, AAV vectors according to the present invention specifically transduce any or several of the following cells: neurons (such as, e.g., pyramidal neurons, Purkinje neurons, spindle neurons, medium spiny neurons, and/or interneurons [e.g., Golgi cells, Lugaro cells, basket cells, stellate cells, candelabrum cells, unipolar brush cells, granule cells, Renshaw cells, 1a inhibitory neurons, 1b inhibitory neurons, parvalbumin-expressing interneurons, CCK-expressing interneurons, VIP-expressing interneurons, SOM-expressing interneurons, cholinergic interneurons, tyrosine hydroxylase-expressing interneurons, calretinin-expressing interneurons, or nitric oxide synthase-expressing interneurons]), oligodendrocytes, astrocytes, microglial cells, ependymal cells, radial glia cells and/or pituicytes.

In some embodiments, AAV vectors according to the present invention specifically transduce any or several of the following cells: neurons (such as, e.g., pyramidal neurons, Purkinje neurons, spindle neurons, medium spiny neurons, and/or interneurons [e.g., Golgi cells, Lugaro cells, basket cells, stellate cells, candelabrum cells, unipolar brush cells, granule cells, Renshaw cells, 1a inhibitory neurons, 1b inhibitory neurons, parvalbumin-expressing interneurons, CCK-expressing interneurons, VIP-expressing interneurons, SOM-expressing interneurons, cholinergic interneurons, tyrosine hydroxylase-expressing interneurons, calretinin-expressing interneurons, or nitric oxide synthase-expressing interneurons]).

In some embodiments, AV vectors according to the present invention do not specifically transduce one or more (or all) of the following cells: oligodendrocytes, astrocytes, microglial cells, ependymal cells, radial glia cells and/or pituicytes.

In some embodiments, an AAV vector according to the present invention can target a large variety of cells, tissues, and/or organs for treatment and/or prophylactic intervention. For example, in some embodiments, AAV vectors targets encompass, but are not limited to, hepatocytes; cells of the retina; i.e. photoreceptors, retinal pigmented epithelium (RPE), Müller cells; cells of the inner ear (e.g., inner and/or outer hair cells, Hensen's cells, Deiter's cells, pillar cells, inner phalangeal cells, border cells, etc.); muscle cells, i.e.

myoblasts, satellite cells; cells of the central nervous system (CNS), i.e. neurons, glial cells; cells of the heart; cells of the peripheral nervous system (PNS); osteoblasts; tumor cells; blood cells such as lymphocytes, monocytes, basophils, eosinophils, neutrophils, mast cells; hematopoietic cells including hematopoietic stem cells; induced pluripotent stem cells (iPS) and the like. Examples of tissues and organs which can be targeted by AAV include, eye, retina, ear, liver, skeletal muscle, cardiac muscle, smooth muscle, brain, spine, bone, connective tissue, heart, kidney, lung, lymph node, mammary gland, myelin, prostate, testes, thymus, thyroid, trachea, and the like. In some embodiments, preferred cell types are hepatocytes, retinal cells, muscle cells, cells of the CNS, cells of the PNS and/or hematopoietic cells. In some embodiments, preferred tissues and/or organs are liver, muscle, heart, eye, and/or brain.

In some embodiments, an AAV described herein is considered to target cells of the CNS if it targets one or more cell types that include retinal cells; in some embodiments, targeting retinal cells is not considered to represent CNS targeting.

Use in Gene Therapy

In some embodiments, an AAV vector described herein may be particularly useful in gene therapy, e.g., to deliver a therapeutic nucleic acid of interest to a subject.

Accordingly, in some embodiments, the present invention also relates to an AAV vector according to the present invention, for use in gene therapy.

In some embodiments, the present invention also relates to a method of gene therapy in a subject in need thereof, comprising administering an AAV vector according to the present invention to said subject.

In some embodiments, an AAV of the invention can be delivered by any appropriate route to the subject. In some embodiments, appropriate administration routes encompass, without being limited to, inhalational, topical, intra-tissue (e.g. intramuscular, intracardiac, intrahepatic, intrarenal), conjunctical (e.g. intraretinal, subretinal), mucosal (e.g. buccal, nasal), intra-articular, intravitreal, intracranial, intravascular (e.g. intravenous), intraventricular, intracisternal, intraperitoneal, and intralymphatic routes. In some embodiments, the route of administration is selected depending on the targeted tissue and/or organ, namely, depending on the tissue and/or organ in which transduction is sought.

In some embodiments, AAV vectors according to the present invention are to be administered by intraspinal and/or intracerebral administration.

In some embodiments, AAV vectors according to the present invention are to be administrated intraspinally. In some embodiments, intraspinal administration comprises or consists of intrathecal and epidural administration. In some embodiments, intraspinal administration comprises or consists of intrathecal administration.

In some embodiments, AAV vectors according to the present invention are to be administrated intracerebrally.

In some embodiments, AAV vectors according to the present invention are to be administered intracerebrally, wherein the intracerebral administration is at a site selected from the group comprising or consisting of: striatum (such as, e.g., putamen, caudate nucleus, nucleus accumbens, olfactory tubercle, external globus pallidus and/or internal globus pallidus), thalamus, hypothalamus, epithalamus, subthalamus, parenchyma, cerebrum, medulla, deep cerebellar nuclei (such as, e.g., substantia nigra, dentate, emboliform, globose and/or fastigii nucleus), cerebrospinal fluid (CSF), meninges, dura mater, arachnoid mater, pia mater, subarachnoid cisterns (such as, e.g., cisterna magna, pontine cistern, interpeduncular cistern, chiasmatic cistern, cistern of lateral cerebral fossa, superior cistern and/or cistern of lamina terminalis), subarachnoid space, cortex, septum, pons, and/or cerebellum.

In some embodiments, AAV vectors according to the present invention are to be administrated intrastriatally (i.e., in the striatum, such as, e.g., in the putamen, caudate nucleus, nucleus accumbens, olfactory tubercle, external globus pallidus and/or internal globus pallidus), intrathalamically (i.e., in the thalamus), intracisternally (i.e., in the subarachnoid cisterns, such as, e.g., in the cisterna magna, pontine cistern, interpeduncular cistern, chiasmatic cistern, cistern of lateral cerebral fossa, superior cistern and/or cistern of lamina terminalis; preferably in the cisterna magna).

In some embodiments, an AAV vector according to the present invention is to be administered intraparenchymally.

In some embodiments, an AAV vector according to the present invention is to be administrated intrastriatally, intrathalamically, intracisternally or intrathecally.

In some embodiments, an AAV vector according to the present invention is to be administrated intrastriatally or intrathalamically.

In some embodiments, an AAV vector according to the present invention is not administered intracerebroventricularly, for example, as described in International Application WO2021/089856, which is incorporated herein by reference in its entirety.

In some embodiments, conditions to be treated by administration of an AAV vector of the invention can be of any type. For example, in some embodiments, a condition to be treated may be selected from communicable diseases, and inherited as well as acquired genetic disorders. In some embodiments, genetic disorders of interest encompass but are not limited to genetic muscle disorders such as Duchenne Muscular Dystrophy, leukodystrophy, spinal muscular atrophy (SMA), hemophilia, sickle disease, and inherited retinal dystrophy. In some embodiments, AAV vectors of the present invention can also be used for treating disorders such as, but not limited to, cancers, arthritis, arthrosis, congenital and acquired cardiac diseases, Parkinson disease, Alzheimer's disease, and infectious diseases (e.g., such as hepatitis C).

In some preferred embodiments, AAV vectors described herein can be particularly useful for preventing and/or treating an ophthalmic disease. Accordingly, in some embodiments, the present invention also relates to AAV vectors according to the present invention, for use in the prevention and/or treatment of an ophthalmic disease. In some embodiments, the present invention further relates to the use of AAV vectors according to the present invention, for the manufacture of a medicament for prevention and/or treatment of an ophthalmic disease. In some embodiments, the present invention also relates to a method of preventing and/or treating an ophthalmic disease in a subject in need thereof, comprising administering AAV vectors according to the present invention to said subject.

In some preferred embodiments, an AAV vector described herein may also be particularly useful for preventing and/or treating a CNS disease. "Central nervous system" or "CNS" refers to both the brain and the spinal cord and contrasts with the "peripheral nervous system" or "PNS" which excludes the brain and the spinal cord. In some embodiments, the eye and in particular the retina is not considered to be part of the CNS. In some embodiments, the eye and in particular the retina can be considered to be part of the PNS. Accordingly, in some embodiments, the present invention also relates to modified AAV vectors according to the present invention, for use in the prevention or treatment of a CNS disease. In some embodiments, the present invention further relates to use of modified AAV vectors according to the present invention, for the manufacture of a medicament for the prevention or treatment of a CNS disease. In some embodiments, the present invention also relates to a method of preventing and/or treating a CNS disease in a subject in need thereof, comprising administering modified AAV vectors according to the present invention to said subject.

In some embodiments, a brain tissue may be or include the striatum, the thalamus, the substantia nigra, the parietal cortices, the hippocampus and/or the globus pallidus. In some embodiments, the CNS site may be in the striatum. In some embodiments, the CNS site may be in the thalamus. In some embodiments, the CNS site may be in the cisterna magna.

As used herein, the terms "prevent", "preventing" and "prevention" refer to prophylactic and preventative measures, wherein the object is to reduce the chances that a subject will develop a given disease over a given period of time. Such a reduction may be reflected, e.g., in a delayed onset of at least one symptom of the disease in the subject.

As used herein, the terms "treating" or "treatment" or "alleviation" refer to therapeutic treatment, excluding prophylactic or preventative measures; wherein the object is to slow down (lessen) a given disease. Those in need of treatment include those already with the disease as well those suspected to have the disease. A subject is successfully "treated" for a given disease if, after receiving a therapeutic amount of an AAV vector according to the present invention, said subject shows observable and/or measurable reduction in or absence of one or more of the following: one or more of the symptoms associated with the disease; reduced morbidity and mortality; and/or improvement in quality of life issues. The above parameters for assessing successful treatment and improvement in the targeted disease are readily measurable by routine procedures familiar to a physician.

As used herein, the term "subject" refers to a mammal, preferably a human. In some embodiments, a subject may be a "patient", i.e., a warm-blooded animal, more preferably a human, who/which is awaiting the receipt of, or is receiving medical care or was/is/will be the object of a medical procedure, or is monitored for the development of a disease. A "mammal" refers here to any mammal, including humans, non-human primates, domestic and farm animals, and zoo, sports, or pet animals, such as dogs, cats, cattle, horses, sheep, pigs, goats, rabbits, etc. Preferably, the mammal is a primate, more preferably a human.

Composition

In some embodiments, the present invention further relates to a composition comprising AAV vectors according to the invention. In some embodiments, AAV vectors in the composition according to the present invention comprises at least one transgene.

In some embodiments, the composition is a pharmaceutical composition comprising an AAV vector according to the invention and at least one pharmaceutically acceptable vehicle.

The term "pharmaceutically acceptable", when referring to vehicles, excipients, carriers, and/or preservatives, is meant to define molecular entities and compositions that do not produce an allergic or similar untoward reaction when administered to a subject, preferably a human. For human administration, pharmaceutical compositions should meet sterility, pyrogenicity, and general safety and purity standards as required by regulatory offices, such as, for example, FDA Office or EMA.

In some embodiments, pharmaceutically acceptable vehicles, excipients, carriers and preservatives that may be used in these compositions include, but are not limited to, ion exchangers, alumina, aluminum stearate, lecithin, proteins (such as, e.g., serum albumin, gelatin, immunoglobulins and the like), buffer substances (such as, e.g., phosphates, citrates or other organic acids, and the like), amino acids (such as, e.g., glycine, glutamine, asparagine, arginine, lysine and the like), antioxidants (such as, e.g., ascorbic acid and the like), chelating agents (such as, e.g., EDTA), sorbic acid, potassium sorbate, partial glyceride mixtures of saturated vegetable fatty acids, water, salts or electrolytes (such as, e.g., protamine sulfate, disodium hydrogen phosphate, potassium hydrogen phosphate, sodium chloride, zinc salts, colloidal silica, magnesium trisilicate and the like), hydrophilic polymers (such as, e.g., polyvinylpyrrolidone, polyethylene-polyoxypropylene block polymers and the like), cellulose-based substances (such as, e.g., sodium carboxymethylcellulose), polyacrylates, waxes, nonionic surfactants (such as, e.g., Tween, pluronics, polyethylene glycol and the like), wool fat, and suitable combinations thereof.

In some embodiments, a pharmaceutical composition according to the present invention comprises vehicles which are pharmaceutically acceptable for a formulation intended for injection into a subject. In some embodiments, these may be in particular isotonic, sterile, saline solutions (monosodium or disodium phosphate, sodium, potassium, calcium or magnesium chloride and the like or mixtures of such salts), or dry, especially freeze-dried compositions which upon addition, depending on the case, of sterilized water or physiological saline, permit the constitution of injectable solutions.

In some embodiments, a pharmaceutical composition according to the present invention comprise one or more agents that promote the entry of an AAV vector described herein into a mammalian cell, such as, e.g., natural and/or synthetic polymers, such as poloxamer, chitosan, cyclodextrins, dendrimers, poly(lactic-co-glycolic acid) polymers, and the like.

In some embodiments, AAV vectors comprising at least one transgene according to the present invention is comprised as part of a medicament. In some embodiments, the invention thus relates to a medicament comprising AAV vectors comprising at least one transgene according to the present invention.

Transgene/Disease Combinations

As described above, AAV vectors according to the present invention may comprise at least one transgene, selected in view of the intended use of an AAV vector. Examples of transgenes that can be useful for treatment of ophthalmic diseases or CNS diseases are provided hereafter. In some embodiments, an eye is not considered to be a "CNS" site. In some embodiments, an eye can be considered a "PNS" site.

In some embodiments, ophthalmic diseases include inherited retinal diseases. In some embodiments, inherited retinal diseases include, but are not limited to, Leber's congenital amaurosis, retinitis pigmentosa, retinitis punctata albescens, choroideremia, Stargardt disease, fundus flavimaculatus, fundus albipunctatus, retinal dystrophies, choroidal dystrophies, cone dystrophies, cone-rod dystrophies, rod-cone dystrophies, macular dystrophies, macular degeneration, basal laminar drusen, night blindness, Aland Island eye disease, Bardet-Biedl syndrome, Newfoundland rod-cone dystrophy, Ogushi disease, vitreoretinopathy, vitreoretinochoroidopathy, bestrophinopathy, Wagner syndrome, Norrie disease, and microphthalmia. In some embodiments, ophthalmic diseases include communicable diseases, such as infectious diseases (e.g., viral, bacterial, fungal, etc.). In some embodiments, an ophthalmic disease includes an injury. In some embodiments, an ophthalmic disease includes an auto-immune disease. In some embodiments, an ophthalmic disease includes a cancer.

In some embodiments, genes involved with inherited retinal diseases include, but are not limited to, ABCA4, ADAM9, AGBL5, AHR, AIPL1, APOE, ARHGEF18, ARL2BP, ARL3, ARL6, BBS2, BEST1, C20RF71, C8orf37, CACNAIF, CAPN5, CDHR1, CEP290, CEP78, CERKL, CFH, CHM, CLCC1, CLRN1, CNGA1, CNGB1, COL2A1, CRB1, CRB2, CRX, CTNNB1, CX3CR1, DHDDS, DHX38, EFEMP1, ELOVL4, EYS, FAM161A, FBN2, FSCN2, FZD4, GDF6, GUCA1A, GUCA1B, GUCY2D, HGSNAT, HK1, HMCN1, HRG4, HTRA1, IDH3A, IDH3B, IFT140, IFT172, IFT43, IMPDH1, IMPG2, KCNJ13, KIAA1549, KIF3B, KIZ, KLHL7, LCA5, LRAT, LRP5, MAK, MERTK, MYO7A, NDP, NEK2, NMNAT1, NR2E3, NRL, PDE6A, PDE6B, PDE6G, PITPNM3, POMGT1, PRCD, PROM1, PRPF3, PRPF4, PRPF6, PRPF8, PRPF31, PRPH2, RAXL1, RBP3, RBP4, RD3, RDH12, RDH5, REEP6, RGR, RHO, RIMS1, RLBP1, RP1, RP1L1, RP2, RP4, RP7, RP9, RP10, RP11, RP12, RP13, RP14, RP17, RP18, RP19, RP20, RP25, RP26, RP27, RP28, RP30, RP31, RP32, RP33, RP35, RP36, RP37, RP38, RP39, RP40, RP41, RP42, RP43, RP44, RP45, RP46, RP47, RP48, RP49, RP50, RP51, RP53, RP54, RP55, RP56, RP57, RP58, RP59, RP60, RP61, RP62, RP64, RP65, RP66, RP67, RP68, RP69, RP70, RP71, RP72, RP73, RP74, RP75, RP76, RP77, RP78, RP79, RP80, RP81, RP82, RP83, RP84, RP85, RP86, RP87, RP88, RP89, RP90, RPE65, RPE87, RPGR, RPGRIP1, SAG, SEMA4A, SLC7A14, SNRNP200, SPATA7, TFEB, TOPORS, TSPAN12, TTC8, TULP1, USH2A, VCAN, ZNF408, and ZNF513.

In some embodiments, a CNS disease is a CNS infectious disease, a CNS degenerative disease, a CNS auto-immune disease, a CNS tumor disease, a cerebrovascular disease, a CNS injury, or a CNS structural defect.

In some embodiments, a CNS disease includes, but is not limited to, Alzheimer's disease, Parkinson's disease, Huntington's disease, Friedreich's ataxia, Canavan's Disease, muscular dystrophy, spinal muscular atrophy, amyotrophic lateral sclerosis (ALS), alpha-mannosidosis, aspartylglucosaminuria, Batten disease, beta-mannosidosis, cystinosis, Danon disease, Fabry disease, Farber disease, fucosidosis, galactosialidosis, Gaucher disease, Krabbe disease, metachromic leukodystrophy, a mucopolysaccharidosis (such as any of Hurler syndrome, Hurler-Scheie syndrome, Scheie syndrome, Hunter syndrome, Sanfilippo syndrome A, B, C or D, Morquio syndrome B, Maroteaux-Lamy syndrome, Sly syndrome or Natowicz syndrome), spinocerebellar ataxia, adrenoleukodystrophy, Angelman syndrome, or epilepsy.

In some embodiments, a CNS disease is selected from the group comprising or consisting of acid lipase disease, acid maltase deficiency, acid storage disease, acquired epileptiform aphasia, acute disseminated encephalomyelitis, attention deficit hyperactivity disorder (ADHD), Adie's pupil, Adie's syndrome, adrenoleukodystrophy, agnosia, Aicardi syndrome, Aicardi-Goutieres syndrome disorder, Alexander disease, Alpers' disease, alternating hemiplegia, Alzheimer's disease, amyotrophic lateral sclerosis (ALS), anencephaly, aneurysm, Angelman syndrome, angiomatosis, anoxia, antiphospholipid syndrome, aphasia, apraxia, arachnoiditis, Arnold-Chiari malformation, aromatic L-amino acid decarboxylase deficiency (AADC deficiency), aspartylglucosaminuria, Asperger syndrome, ataxia, ataxia telangiectasia (Louis-Bar syndrome), ataxias and cerebellar or spinocerebellar degeneration, attention deficit-hyperactivity disorder, autism, autonomic dysfunction, Barth syndrome, Batten disease, Becker's myotonia, Behcet's disease, Bell's palsy, Bernhardt-Roth syndrome, Binswanger's disease, Bloch-Sulzberger syndrome, Bradbury-Eggleston syndrome, Brown-Sequard syndrome, bulbospinal muscular atrophy, CADASIL, Canavan's disease, causalgia, cavernomas, cavernous angioma, central cervical cord syndrome, central cord syndrome, central pontine myelinolysis, ceramidase deficiency, cerebellar degeneration, cerebellar hypoplasia, cerebral beriberi, cerebral gigantism, cerebral palsy, cerebro-oculo-facio-skeletal syndrome (COFS), cholesterol ester storage disease, chorea, choreoacanthocytosis, chronic inflammatory demyelinating polyneuropathy (CIDP), chronic orthostatic intolerance, chronic pain, Cockayne syndrome type II, Coffin-Lowry syndrome, colpocephaly, congenital myasthenia, corticobasal degeneration, cranial arteritis, cree encephalitis, Creutzfeldt-Jakob disease, Cushing's syndrome, cystinosis, cytomegalic inclusion body disease, dancing eyes-dancing feet syndrome, Dandy-Walker syndrome, Danon disease, Dawson disease, De Morsier's syndrome, Dejerine-Klumpke palsy, dementia, dentate cerebellar ataxia, dentatorubral atrophy, dermatomyositis, developmental dyspraxia, Devic's syndrome, diffuse sclerosis, dysautonomia, dysgraphia, dyslexia, dysphagia, dyspraxia, dyssynergia cerebellaris myoclonica, dyssynergia cerebellaris progressiva, epilepsy (such as, e.g., Amish infantile epilepsy syndrome [AIES], benign familial infantile seizures [BFIS], benign familial neonatal seizures [BFNS], childhood absence epilepsy [CAE], childhood-onset epileptic encephalopathy [COEE], Dravet syndrome [DS], early infantile epileptic encephalopathy [EIEE], familial adult myoclonic epilepsy [FAME], familial febrile seizures [FFS], familial focal epilepsy with variable foci [FFEVF], familial infantile myoclonic epilepsy [FIME], familial temporal lobe epilepsy [FTLE], focal epilepsy and speech disorder [FESD] with or without mental retardation, generalized epilepsy and paroxysmal dyskinesia [GEPD], generalized epilepsy with febrile seizures plus [GEFS+], idiopathic generalized epilepsy [IGE], juvenile absence epilepsy [JAE], juvenile myoclonic epilepsy [JME], myoclonic-atonic epilepsy [MAE], nocturnal frontal lobe epilepsy [NFLE], progressive myoclonic epilepsy [PME], pyridoxamine 5'-phosphate oxidase deficiency [PNPOD], pyridoxine-dependent epilepsy [EPD] and severe myoclonic epilepsy of infancy [SMEI]), Fabry disease, Fahr's syndrome, familial dysautonomia, familial hemangioma, familial idiopathic basal ganglia calcification, familial periodic paralyses, familial spastic paralysis, Farber's disease, fibromuscular dysplasia, Fisher syndrome, floppy infant syndrome, Friedreich's ataxia, frontotemporal dementia, fucosidosis, galactosialidosis, Gaucher disease, generalized gangliosidosis, Gerstmann's syndrome, Gerstmann-Straussler-Scheinker disease, giant axonal neuropathy, giant cell arteritis, giant cell inclusion disease, globoid cell leukodystrophy, glossopharyngeal neuralgia, glycogen storage disease, GM1 gangliosidosis, GM2 gangliosidosis (Tay-Sachs disease), Guillain-Barre syndrome, Hallervorden-Spatz disease, hemicrania continua, hemiplegia alterans, hereditary spastic paraplegia, heredopathia atactica polyneuritiformis, Holmes-Adie syndrome, holoprosencephaly, Hughes syndrome, Huntington's disease, hydranencephaly, hydromyelia, hypercortisolism, immune-mediated encephalomyelitis, inclusion body myositis, incontinentia pigmenti, infantile hypotonia, infantile neuroaxonal dystrophy, iniencephaly, Isaac's syndrome, Joubert syndrome, Kearns-Sayre syndrome, Kennedy's disease, Kinsbourne syndrome, Kleine-Levin syndrome, Klippel-Feil syndrome, Klippel-Trenaunay syndrome (KTS), Kliiver-Bucy syndrome, Korsakoffs amnesic syndrome, Krabbe disease, Kugelberg-Welander disease, Lambert-Eaton myasthenic syndrome, Landau-Kleffner syndrome, lateral femoral cutaneous nerve entrapment, lateral medullary syndrome, Leigh's disease, Lennox-Gastaut syndrome, Lesch-Nyhan syndrome, Levine-Critchley syndrome, Lewy body dementia, lipoid proteinosis, lissencephaly, locked-in syndrome, Lou Gehrig's disease, lupus, Lyme disease, Machado-Joseph disease, macrencephaly, alpha-mannosidosis, beta-mannosidosis, Melkersson-Rosenthal syndrome, Menkes disease, meralgia paresthetica, metachromatic leukodystrophy, microcephaly, Miller Fisher syndrome, Moebius syndrome, mucopolysaccharidosis type I-H (Hurler syndrome), mucopolysaccharidosis type I-H/S (Hurler-Scheie syndrome), mucopolysaccharidosis type IS (Scheie syndrome), mucopolysaccharidosis type II (Hunter syndrome), mucopolysaccharidosis type III-A (Sanfilippo syndrome A), mucopolysaccharidosis type III-B (Sanfilippo syndrome B), mucopolysaccharidosis type III-C (Sanfilippo syndrome C), mucopolysaccharidosis type III-D (Sanfilippo syndrome D), mucopolysaccharidosis type IV-B (Morquio syndrome B), mucopolysaccharidosis type VI (Maroteaux-Lamy syndrome), mucopolysaccharidosis type VII (Sly syndrome), mucopolysaccharidosis type IX (Natowicz syndrome), multiple sclerosis, muscular dystrophy, myasthenia gravis, myelinoclastic diffuse sclerosis, narcolepsy, neuroacanthocytosis, neurofibromatosis, neuroleptic malignant syndrome, neurosarcoidosis, Niemann-Pick disease, Ohtahara syndrome, olivopontocerebellar atrophy, opsoclonus myoclonus, O'Sullivan-McLeod syndrome, pantothenate kinase-associated neurodegeneration, paraneoplastic syndromes, paresthesia, Parkinson's disease, paroxysmal choreoathetosis, paroxysmal hemicrania, Parry-Romberg syndrome, Pelizaeus-Merzbacher disease, Pena Shokeir II syndrome, periventricular leukomalacia, phytanic acid storage disease, Pick's disease, piriformis syndrome, polymyositis, Pompe disease, post-polio syndrome, posterior cortical atrophy, primary dentatum atrophy, primary lateral sclerosis, primary progressive aphasia, prion diseases, progressive hemifacial atrophy, progressive locomotor ataxia, progressive multifocal leukoencephalopathy, progressive sclerosing poliodystrophy, progressive supranuclear palsy, prosopagnosia, Ramsay Hunt syndrome I, Ramsay Hunt syndrome II, Rasmussen's encephalitis, Refsum disease, Rett syndrome, Reye's syndrome, Riley-Day syndrome, Sandhoff disease, Schilder's disease, Seitelberger disease, Shy-Drager syndrome, Sjogren's syndrome, spasticity, spina bifida, spinal muscular atrophy, spinocerebellar ataxia, spinocerebellar atrophy, spinocerebellar degeneration, Steele-Richardson-Olszewski syndrome, striatonigral degeneration, Sturge-Weber syndrome, tardive dyskinesia, tauopathy, Tay-Sachs disease, thoracic outlet syndrome, thyrotoxic myopathy, tic douloureux, Todd's paralysis, trigeminal neuralgia, tropical spastic paraparesis, Troyer syndrome, vascular dementia, Von Economo's disease, Von Hippel-Lindau disease (VHL), Von Recklinghausen's disease, Wallenberg's syndrome, Werdnig-Hoffman disease, Wemicke-Korsakoff syndrome, West syndrome, Whipple's disease, Williams syndrome, Wilson disease, Wolman's disease, X-linked spinal and bulbar muscular atrophy, Zellweger syndrome, multiple sclerosis atrophy, Lewis body dementia (LBD), and Angelman syndrome.

In some particular embodiments, a CNS disease is Parkinson's disease or Gaucher disease. In some particular embodiments, a CNS disease is Parkinson's disease. In some particular embodiments, a CNS disease is Gaucher disease.

In some embodiments, genes involved in CNS diseases include, but are not limited to, 3R tau, 4R tau, AARS, ABCD1, ACOX1, ADGRV1, ADRA2B, AGA, AGER, ALDH7A1, ALG13, ALS2, ANG, ANXA11, APP, ARHGEF9, ARSA, ARSB, ARV1, ASAH1, ASPA, ATN1, ATP10A, ATP13A2, ATXN1, ATXN2, ATXN3, BAX, BCL-2, BDNF, BICD2, C9orf72, CACNA1A, CACNA1H, CACNB4, CASR, CCNF, CDKL5, CERS1, CFAP410, CHCHD10, CHD2, CHMP2B, CHRNA2, CHRNA4, CHRNA7, CHRNB2, CLCN2a, CLN1, CLN2, CLN3, CLN5, CLN6, CLN8, CNTN2, CPA6, CSTB, CTNS, CTSA, CTSD, DAO, DCTN1, DEPDC5, DMD, DNAJB2, DNM1, DOCK7, DRD2, DYNC1H1, EEF1A2, EFHC1, EGLN1, EPHA4, EPM2A, ERBB4, FGF12, FIG. 4, FRRS1L, FTL, FUCA1, FUS, FXN, GAA, GABRA1, GABRB1, GABRB3, GABRD, GABRG2, GAL, GALC, GALNS, GBA, GFAP, GLA, GLB1, GLE1, GLT8D1, GNAO1, GNS, GOSR2, GPR98, GRIA1, GRIA2, GRIK1, GRIN1, GRIN2A, GRIN2B, GRIN2D, GSTM1, GUF1, GUSB, HCN1, HGSNAT, HNRNPA1, HTT, HYAL1, IDS, IDUA, IGHMBP2, IL-1, IT15, ITPA, JPH3, KCNA2, KCNB1, KCNC1, KCNMA1, KCNQ2, KCNQ3, KCNT1, KCTD7, LAL, LAMP2, LGI1, LMNB2, LRRK2, MAN2B1, MAN2B2, MAN2C1, MANBA, MATR3, MBD5, MFSD8, NAGA, NAGLU, NECAP1, NEFH, NEK1, NEU1, NHLRC1, NPC1, NPC2, NR4A2, NTRK2, OCA2, OPTN, PARK2, PARK7, PCDH19, PEX1, PEX2, PEX3, PEX5, PEX6, PEX10, PEX1B, PEX12, PEX13, PEX14, PEX16, PEX19, PEX26, PFN1, PINK1, PLCB1, PNPO, PON1, PON2, PON3, PPARGC1A, PRDM8, PRICKLE1, PRKN, PRNP, PRPH, PRRT2, PSAP, S106β, SCARB2, SCN1A, SCN1B, SCN2A, SCN8A, SCN9A, SCN9Ab, SETX, SGSH, SIGMAR1, SIK1, SKP1, SLC1A1, SLC1A2, SLC2A1, SLC6A1, SLC9A6, SLC12A5, SLC13A5, SLC25A12, SLC25A22, SLCA17A5, SMN1, SMPD1, SNCA, SNRPN, SOD1, SPG11, SPTAN1, SQSTM1, ST3GAL3, ST3GAL5, STX1B, STXBP1, SYP, SYT1, SZT2, TAF15, TARDBP, TBC1D24, TBCE, TBK1, TBP, TFEB, TITF-1, TREM2, UBA5, UBE1, UBE3A, UBQLN2, UCH-L1, UNC13A, VAPB, VCP, VPS35, WWOX, and XBP1.

In some particular embodiments, the gene involved in CNS diseases is the GBA gene, preferably the human GBA gene.

An exemplary nucleic acid sequence of the cDNA of the human GBA gene comprises or consists of SEQ ID NO: 1, or a nucleic acid sequence having at least 70, 75, 80, 85, 90, 91, 92, 93, 94, 95, 96, 97, 98, 99% or more sequence identity with SEQ ID NO: 1.

In one embodiment, the nucleic acid sequence of the cDNA of the human GBA gene encodes an amino acid sequence comprising or consisting of SEQ ID NO: 2, or an amino acid sequence having at least 70, 75, 80, 85, 90, 91, 92, 93, 94, 95, 96, 97, 98, 99% or more sequence identity with SEQ ID NO: 2.

In some embodiments, AAV vectors of the present invention are capable of effectively transducing certain areas of the brain, including the striatum, the thalamus, the substantia nigra, the parietal cortices, the hippocampus and/or the globus pallidus. Thus, in some embodiments, AAV vectors of the present invention are of great interest for targeting the striatum, the thalamus, the substantia nigra, the parietal cortices, the hippocampus and the globus pallidus, and/or for treating diseases affecting the striatum, the thalamus, the substantia nigra, the parietal cortices, the hippocampus and the globus pallidus.

In some embodiments, AAV vectors of the present invention are particularly suited for treating diseases of the striatum, the substantia nigra, the thalamus, the substantia nigra, the globus pallidus, the parietal cortices, and/or the hippocampus, such diseases include, but are not limited to, Huntington's disease, Parkinson's disease, multiple sclerosis atrophy, Lewis Body Dementia (LBD), progressive supranuclear palsy and Angelman syndrome. In some embodiments, a CNS disease is selected from the group consisting of Huntington's disease, Parkinson's disease, multiple sclerosis atrophy, Lewis body dementia (LBD), progressive supranuclear palsy, frontotemporal dementia and Angelman syndrome.

In some embodiments, AAV vectors of the present invention are capable of effectively transducing neurons. Thus, in some embodiments, a CNS disease is a neurological disease or a disease affecting neurons.

In some embodiments, AAV vectors of the present invention are capable of effectively transducing neurons involved in the control of motor function. Thus, in some embodiments, a CNS disease is a disease affecting motor function. Non-limiting examples of diseases affecting motor function include, but are not limited to, Parkinson's disease and Huntington's disease.

In some embodiments, a CNS disease is Alzheimer's disease, and an AAV vector of the present invention has at least one transgene, wherein the transgene comprises cDNA of a gene selected from the group comprising or consisting of 3R tau, 4R tau, AGER, APP, BAX, BCL-2, CHRNA7, DRD2, GFAP, GRIA1, GRIA2, GRIK1, GRIN1, IL-1, SLC1A1, SYP and SYT1.

In some embodiments, a CNS disease is Parkinson's disease, and an AAV vector of the present invention has at least one transgene, wherein the transgene comprises cDNA of a gene selected from the group comprising or consisting of ATP13A2, BDNF, EGLN1, GBA, GSTM1, LRRK2, NR4A2, NTRK2, PARK2, PARK7, PINK1, PRKN, S106β, SKP1, SNCA, TFEB, VPS35 and UCH-LL.

In some particular embodiments, a CNS disease is Parkinson's disease, and an AAV vector of the present invention has at least one transgene comprising the cDNA from the GBA gene, preferably from the human GBA gene.

An exemplary nucleic acid sequence of the cDNA of the human GBA gene comprises or consists of SEQ ID NO: 1, or a nucleic acid sequence having at least 70, 75, 80, 85, 90, 91, 92, 93, 94, 95, 96, 97, 98, 99% or more sequence identity with SEQ ID NO: 1.

In one embodiment, the nucleic acid sequence of the cDNA of the human GBA gene encodes an amino acid sequence comprising or consisting of SEQ ID NO: 2, or an amino acid sequence having at least 70, 75, 80, 85, 90, 91, 92, 93, 94, 95, 96, 97, 98, 99% or more sequence identity with SEQ ID NO: 2.

In some embodiments, a CNS disease is Huntington's disease, and an AAV vector of the present invention has at least one transgene, wherein the transgene comprises cDNA of a gene selected from the group comprising or consisting of ATN1, ATXN1, ATXN2, ATXN3, FTL, HTT, IT15, JPH3, PRNP, SLC2A3, TBP, TITF-1 and XBP1.

In some embodiments, a CNS disease is Friedreich's ataxia, and an AAV vector of the present invention has at least one transgene, wherein the transgene comprises cDNA of the FXN gene.

In some embodiments, a CNS disease is Canavan's Disease, and an AAV vector of the present invention has at least one transgene, wherein the transgene comprises cDNA of the ASPA gene.

In some embodiments, a CNS disease is muscular dystrophy, and an AAV vector of the present invention has at least one transgene, wherein the transgene comprises cDNA of a gene selected from the group comprising or consisting of the DMD gene.

In some embodiments, a CNS disease is spinal muscular atrophy, and an AAV vector of the present invention has at least one transgene, wherein the transgene comprises cDNA of a gene selected from the group comprising or consisting of BICD2, CHCHD10, DNAJB2, DYNC1H1, IGHMBP2, SIGMAR1, SMN1, TBCE, VAPB and UBE1.

In some embodiments, a CNS disease is amyotrophic lateral sclerosis (ALS), and an AAV vector of the present invention has at least one transgene, wherein the transgene comprises cDNA of a gene selected from the group comprising or consisting of ALS2, ANG, ANXA11, ATXN2, C9orf72, CHMP2B, CFAP410, CHCHD10, CCNF, DAO, DCTN1, EPHA4, ERBB4, FIG. 4, FUS, GLE1, GLT8D1, HNRNPA1, MATR3, NEFH, NEK1, OPTN, PFN1, PON1, PON2, PON3, PPARGC1A, PRPH, SETX, SIGMAR1, SMN1, SOD1, SPG11, SQSTM1, TAF15, TARDBP, TBK1, TREM2, UBQLN2, UNC13A, VAPB and VCP.

In some embodiments, a CNS disease is alpha-mannosidosis, and an AAV vector of the present invention has at least one transgene, wherein the transgene comprises cDNA of a gene selected from the group comprising or consisting of MAN2B1, MAN2B2 and MAN2CL.

In some embodiments, a CNS disease is aspartylglucosaminuria, and an AAV vector of the present invention has at least one transgene, wherein the transgene comprises cDNA of the AGA gene.

In some embodiments, a CNS disease is Batten disease, and an AAV vector of the present invention has at least one transgene, wherein the transgene comprises cDNA of a gene selected from the group comprising or consisting of CLN1, CLN2, CLN3, CLN5, CLN6, CLN8, CTSD and MFSD8.

In some embodiments, a CNS disease is beta-mannosidosis, and an AAV vector of the present invention has at least one transgene, wherein the transgene comprises cDNA of the MANBA gene.

In some embodiments, a CNS disease is cystinosis, and an AAV vector of the present invention has at least one transgene, wherein the transgene comprises cDNA of the CTNS gene.

In some embodiments, a CNS disease is Danon disease, and an AAV vector of the present invention has at least one transgene, wherein the transgene comprises cDNA of the LAMP2 gene.

In some embodiments, a CNS disease is Fabry disease, and an AAV vector of the present invention has at least one transgene, wherein the transgene comprises cDNA of the GLA gene.

In some embodiments, a CNS disease is Farber disease, and an AAV vector of the present invention has at least one transgene, wherein the transgene comprises cDNA of the ASAH1 gene.

In some embodiments, a CNS disease is fucosidosis, and an AAV vector of the present invention has at least one transgene, wherein the transgene comprises cDNA of the FUCA1 gene.

In some embodiments, a CNS disease is galactosialidosis, and an AAV vector of the present invention has at least one transgene, wherein the transgene comprises cDNA of the CTSA gene.

In some embodiments, a CNS disease is Gaucher disease, and an AAV vector of the present invention has at least one transgene, wherein the transgene comprises cDNA of the GBA gene.

In some particular embodiments, a CNS disease is Gaucher disease, and an AAV vector of the present invention has at least one transgene comprising the cDNA from the GBA gene, preferably from the human GBA gene.

An exemplary nucleic acid sequence of the cDNA of the human GBA gene comprises or consists of SEQ ID NO: 1, or a nucleic acid sequence having at least 70, 75, 80, 85, 90, 91, 92, 93, 94, 95, 96, 97, 98, 99% or more sequence identity with SEQ ID NO: 1.

In one embodiment, the nucleic acid sequence of the cDNA of the human GBA gene encodes an amino acid sequence comprising or consisting of SEQ ID NO: 2, or an amino acid sequence having at least 70, 75, 80, 85, 90, 91, 92, 93, 94, 95, 96, 97, 98, 99% or more sequence identity with SEQ ID NO: 2.

In some embodiments, a CNS disease is Krabbe disease, and an AAV vector of the present invention has at least one transgene, wherein the transgene comprises cDNA of a gene selected from the group comprising or consisting of GALC and PSAP.

In some embodiments, a CNS disease is metachromic leukodystrophy, and an AAV vector of the present invention has at least one transgene, wherein the transgene comprises cDNA of the ARSA gene.

In some embodiments, a CNS disease is a mucopolysaccharidosis (such as any of Hurler syndrome, Hurler-Scheie syndrome, Scheie syndrome, Hunter syndrome, Sanfilippo syndrome A, B, C or D, Morquio syndrome B, Maroteaux-Lamy syndrome, Sly syndrome or Natowicz syndrome), and an AAV vector of the present invention has at least one transgene, wherein the transgene comprises cDNA of a gene selected from the group comprising or consisting of ARSB, GAA, GALNS, GLB1, GNS, GUSB, HGSNAT, HYAL1, IDS, IDUA, LAL, NAGA, NAGLU, NEU1, NPC1, NPC2, SGSH, SLCA17A5 and SMPD1.

In some embodiments, a CNS disease is spinocerebellar ataxia, and an AAV vector of the present invention has at least one transgene, wherein the transgene comprises cDNA of a gene selected from the group comprising or consisting of ATXN1, ATXN2 and ATXN3.

In some embodiments, a CNS disease is adrenoleukodystrophy, and an AAV vector of the present invention has at least one transgene, wherein the transgene comprises cDNA of a gene selected from the group comprising or consisting of ABCD1, ACOX1, PEX, PEX2, PEX3, PEX5, PEX6, PEX10, PEX11B, PEX12, PEX13, PEX14, PEX16, PEX19 and PEX26.

In some embodiments, a CNS disease is Angelman syndrome, and an AAV vector of the present invention has at least one transgene, wherein the transgene comprises cDNA of a gene selected from the group comprising or consisting of ATP10A, MBD5, OCA2, SLC9A6, SNRPN and UBE3A.

In some embodiments, a CNS disease is epilepsy, and an AAV vector of the present invention has at least one transgene, wherein the transgene comprises cDNA of a gene selected from the group comprising or consisting of AARS, ADGRV1, ADRA2B, ALDH7A1, ALG13, ARHGEF9, ARV1, CACNA1A, CACNA1H, CACNB4, CASR, CDKL5, CERS1, CHD2, CHRNA2, CHRNA4, CHRNB2, CLCN2a, CNTN2, CPA6, CSTB, DEPDC5, DNM1, DOCK7, EEF1A2, EFHC1, EPM2A, FGF12, FRRS1L, GABRA1, GABRB1, GABRB3, GABRD, GABRG2, GAL, GNAO1, GOSR2, GPR98, GRIN2A, GRIN2B, GRIN2D, GUF1, HCN1, ITPA, KCNA2, KCNB1, KCNC1, KCNMA1, KCNQ2, KCNQ3, KCNT1, KCTD7, LGI1, LMNB2, NECAP1, NHLRC1, PCDH19, PLCB1, PNPO, PRDM8, PRICKLE1, PRRT2, SCARB2, SCN1A, SCN1B, SCN2A, SCN8A, SCN9A, SCN9Ab, SIK1, SLC12A5, SLC13A5, SLC1A2, SLC25A12, SLC25A22, SLC2A1, SLC6A1, SPTAN1, ST3GAL3, ST3GAL5, STX1B, STXBP1, SZT2, TBCID24, UBA5, and WWOX.

One skilled in the art will recognize that a gene may have multiple transcriptional and/or translational isoforms, and that a transgene comprising a cDNA of a gene described herein encompasses the potential use of transcriptional variants and/or splice variants of a target gene.

Regimen

In some embodiments, modified AAV vectors according to the present invention are to be administered to a subject in need thereof in a therapeutically effective amount.

In some embodiments, modified AAV vectors according to the present invention are to be administrated at a dose ranging from about $10^8$ viral genomes (vg) to about $10^{15}$ vg, such as from about $10^8$ vg to about $10^{14}$ vg, from about $10^8$ vg to about $10^{13}$ vg, from about $10^8$ vg to about $10^{12}$ vg, from about $10^8$ vg to about $10^{11}$ vg, from about $10^8$ vg to about $10^{10}$ vg, from about $10^8$ vg to about $10^9$ vg, from about $10^9$ vg to about $10^{15}$ vg, from about $10^9$ vg to about $10^{14}$ vg, from about $10^9$ vg to about $10^{13}$ vg, from about $10^9$ vg to about $10^{12}$ vg, from about $10^9$ vg to about $10^{11}$ vg, from about $10^9$ vg to about $10^{10}$ vg, from about $10^{10}$ vg to about $10^{15}$ vg, from about $10^{10}$ vg to about $10^{14}$ vg, from about $10^{10}$ vg to about $10^{13}$ vg, from about $10^{10}$ vg to about $10^{12}$ vg, from about $10^{10}$ vg to about $10^{11}$ vg, from about $10^{11}$ vg to about $10^{15}$ vg, from about $10^{11}$ vg to about $10^{14}$ vg, from about $10^{11}$ vg to about $10^{13}$ vg, from about $10^{11}$ vg to about $10^{12}$ vg, from about $10^{12}$ vg to about $10^{15}$ vg, from about $10^{12}$ vg to about $10^{14}$ vg, from about $10^{12}$ vg to about $10^{13}$ vg, or from about $10^{13}$ vg to about $10^{15}$ vg.

The term "vector genome", abbreviated as "vg", refers to one or more polynucleotides comprising a set of the polynucleotide sequences of a vector, e.g., a viral vector. A vector genome may be encapsidated in a viral particle. Depending on the particular viral vector, a vector genome may comprise single-stranded DNA, double-stranded DNA, or single-stranded RNA, or double-stranded RNA. A vector genome may include endogenous sequences associated with a particular viral vector and/or any heterologous sequences inserted into a particular viral vector through recombinant techniques (e.g., a transgene). In some embodiments, the nucleic acid titer of a viral vector may be measured in terms of vg/mL. Methods suitable for measuring this titer are known in the art, and include, e.g., quantitative PCR.

As used herein, the term "about", when set in front of a numerical value, means that said numerical value is approximate and small variations would not significantly affect the practice of the disclosed embodiments. Such small variations are, e.g., of ±1%, ±2%, ±3%, ±4%, ±5%, ±6%, ±7%, ±8%, ±9%, ±10% or more.

In some embodiments, modified AAV vectors according to the present invention are to be administrated at a dose of about $1 \times 10^8$ vg±$0.5 \times 10^8$, about $2 \times 10^8$ vg±$0.5 \times 10^8$, about $2.75 \times 10^8$ vg±$0.5 \times 10^8$, about $3 \times 10^8$ vg±$0.5 \times 10^8$, about $4 \times 10^8$ vg±$0.5 \times 10^8$, about $5 \times 10^8$ vg±$0.5 \times 10^8$, about $6 \times 10^8$ vg±$0.5 \times 10^8$, about $7 \times 10^8$ vg±$0.5 \times 10^8$, about $8 \times 10^8$ vg±$0.5 \times 10^8$, about $9 \times 10^8$ vg±$0.5 \times 10^8$, about $1 \times 10^9$ vg±$0.5 \times 10^9$, about $2 \times 10^9$ vg±$0.5 \times 10^9$, about $3 \times 10^9$ vg±$0.5 \times 10^9$, about $4 \times 10^9$ vg±$0.5 \times 10^9$, about $5 \times 10^9$ vg±$0.5 \times 10^9$, about $6 \times 10^9$ vg±$0.5 \times 10^9$, about $7 \times 10^9$ vg±$0.5 \times 10^9$, about $8 \times 10^9$ vg±$0.5 \times 10^9$, about $9 \times 10^9$ vg±$0.5 \times 10^9$, about $1 \times 10^{10}$ vg±$0.5 \times 10^{10}$, about $2 \times 10^{10}$ vg±$0.5 \times 10^{10}$, about $3 \times 10^{10}$ vg±$0.5 \times 10^{10}$, about $4 \times 10^{10}$ vg±$0.5 \times 10^{10}$, about $5 \times 10^{10}$ vg±$0.5 \times 10^{10}$, about $6 \times 10^{10}$ vg±$0.5 \times 10^{10}$, about $7 \times 10^{10}$ vg±$0.5 \times 10^{10}$, about $8 \times 10^{10}$ vg±$0.5 \times 10^{10}$, about $9 \times 10^{10}$ vg±$0.5 \times 10^{10}$, about $1 \times 10^1$ vg±$0.5 \times 10^{11}$, about $2 \times 10^{11}$ vg±$0.5 \times 10^{11}$, about $3 \times 10^{11}$ vg±$0.5 \times 10^{11}$, about $4 \times 10^{11}$ vg±$0.5 \times 10^{11}$, about $5 \times 10^{11}$ vg±$0.5 \times 10^{11}$, about $6 \times 10^{11}$ vg±$0.5 \times 10^{11}$, about $7 \times 10^{11}$ vg±$0.5 \times 10^{11}$, about $8 \times 10^{11}$ vg±$0.5 \times 10^{11}$, about $9 \times 10^{11}$ vg±$0.5 \times 10^{11}$, about $1 \times 10^{12}$ vg±$0.5 \times 10^{12}$, about $2 \times 10^{12}$ vg±$0.5 \times 10^{12}$, about $3 \times 10^{12}$ vg±$0.5 \times 10^{12}$, about $4 \times 10^{12}$ vg±$0.5 \times 10^{12}$, about $5 \times 10^{12}$ vg±$0.5 \times 10^{12}$, about $6 \times 10^{12}$ vg±$0.5 \times 10^{12}$, about $7 \times 10^{12}$ vg±$0.5 \times 10^{12}$, about $8 \times 10^{12}$ vg±$0.5 \times 10^{12}$, about $9 \times 10^{12}$ vg±$0.5 \times 10^{12}$, about $1 \times 10^{13}$ vg±$0.5 \times 10^{13}$, about $2 \times 10^{13}$ vg±$0.5 \times 10^{13}$, about $3 \times 10^{13}$ vg±$0.5 \times 10^{13}$, about $4 \times 10^{13}$ vg±$0.5 \times 10^{13}$, about $5 \times 10^{13}$ vg±$0.5 \times 10^{13}$, about $6 \times 10^{13}$ vg±$0.5 \times 10^{13}$, about $7 \times 10^{13}$ vg±$0.5 \times 10^{13}$, about $8 \times 10^{13}$ vg±$0.5 \times 10^{13}$, about $9 \times 10^{13}$ vg±$0.5 \times 10^{13}$, about $1 \times 10^{14}$ vg±$0.5 \times 10^{14}$, about $2 \times 10^{14}$ vg±$0.5 \times 10^{14}$, about $3 \times 10^{14}$ vg±$0.5 \times 10^{14}$, about $4 \times 10^{14}$ vg±$0.5 \times 10^{14}$, about $5 \times 10^{14}$ vg±$0.5 \times 10^{14}$, about $6 \times 10^{14}$ vg±$0.5 \times 10^{14}$, about $7 \times 10^{14}$ vg±$0.5 \times 10^{14}$, about $8 \times 10^{14}$ vg±$0.5 \times 10^{14}$, about $9 \times 10^{14}$ vg±$0.5 \times 10^{14}$, about $1 \times 10^1$ vg±$0.5 \times 10^{15}$, about $2 \times 10^{15}$ vg±$0.5 \times 10^{15}$, about $3 \times 10^{15}$ vg±$0.5 \times 10^{15}$, about $4 \times 10^{15}$ vg±$0.5 \times 10^{15}$, about $5 \times 10^{15}$ vg±$0.5 \times 10^{15}$, about $6 \times 10^1$ vg±$0.5 \times 10^{15}$, about $7 \times 10^1$ vg±$0.5 \times 10^{15}$, about $8 \times 10^{15}$ vg±$0.5 \times 10^5$, or about $9 \times 10^{15}$ vg±$0.5 \times 10^{15}$.

In some embodiments, modified AAV vectors according to the present invention are to be administrated at a dose of about $1 \times 10^6$ vg/kg±$0.5 \times 10^6$, about $2 \times 10^6$ vg/kg $0.5 \times 10^6$, about $3 \times 10^6$ vg/kg $0.5 \times 10^6$, about $4 \times 10^6$ vg/kg $0.5 \times 10^6$, about $5 \times 10^6$ vg/kg±$0.5 \times 10^6$, about $6 \times 10^6$ vg/kg±$0.5 \times 10^6$, about $7 \times 10^6$ vg/kg $0.5 \times 10^6$, about $8 \times 10^6$ vg/kg $0.5 \times 10^6$, about $9 \times 10^6$ vg/kg $0.5 \times 10^6$, about $1 \times 10^7$ vg/kg±$0.5 \times 10^7$, about $2 \times 10^7$ vg/kg±$0.5 \times 10^7$, about $3 \times 10^7$ vg/kg $0.5 \times 10^7$, about $4 \times 10^7$ vg/kg $0.5 \times 10^7$, about $5 \times 10^7$ vg/kg $0.5 \times 10^7$, about $6 \times 10^7$ vg/kg±$0.5 \times 10^7$, about $7 \times 10^7$ vg/kg±$0.5 \times 10^7$, about $8 \times 10^7$ vg/kg $0.5 \times 10^7$, about $9 \times 10^7$ vg/kg $0.5 \times 10^7$, about $1 \times 10^8$ vg/kg $0.5 \times 10^8$, about $2 \times 10^8$ vg/kg±$0.5 \times 10^8$, about $3 \times 10^8$ vg/kg±$0.5 \times 10^8$, about $4 \times 10^8$ vg/kg $0.5 \times 10^8$, about $5 \times 10^8$ vg/kg $0.5 \times 10^8$, about $6 \times 10^8$ vg/kg $0.5 \times 10^8$, about $7 \times 10^8$ vg/kg±$0.5 \times 10^8$, about $8 \times 10^8$ vg/kg $0.5 \times 10^8$, about $9 \times 10^8$ vg/kg $0.5 \times 10^8$, about $1 \times 10^9$ vg/kg $0.5 \times 10^9$, about $2 \times 10^9$ vg/kg $0.5 \times 10^9$, about $3 \times 10^9$ vg/kg±$0.5 \times 10^9$, about $4 \times 10^9$ vg/kg±$0.5 \times 10^9$, about $5 \times 10^9$ vg/kg $0.5 \times 10^9$, about $6 \times 10^9$ vg/kg $0.5 \times 10^9$, about $7 \times 10^9$ vg/kg $0.5 \times 10^9$, about $8 \times 10^9$ vg/kg $0.5 \times 10^9$, about $9 \times 10^9$ vg/kg $0.5 \times 10^9$, about $1 \times 10^{10}$ vg/kg±$0.5 \times 10^{10}$, about $2 \times 10^{10}$ vg/kg±$0.5 \times 10^{10}$, about $3 \times 10^{10}$ vg/kg±$0.5 \times 10^{10}$, about $4 \times 10^{10}$ vg/kg±$0.5 \times 10^{10}$, about $5 \times 10^{10}$ vg/kg±$0.5 \times 10^{10}$, about $6 \times 10^{10}$ vg/kg±$0.5 \times 10^{10}$ about $7 \times 10^{10}$ vg/kg $0.5 \times 10^{10}$, about $8 \times 10^{10}$ vg/kg±$0.5 \times 10^{10}$, about $9 \times 10^{10}$ vg/kg±$0.5 \times 10^{10}$, about $1 \times 10^{11}$ vg/kg±$0.5 \times 10^{11}$, about $2 \times 10^{11}$ vg/kg±$0.5 \times 10^{11}$, about $3 \times 10^{11}$ vg/kg±$0.5 \times 10^{11}$, about $4 \times 10^{11}$ vg/kg±$0.5 \times 10^{11}$, about $5 \times 10^{11}$ vg/kg $0.5 \times 10^{11}$, about $6 \times 10^{11}$ vg/kg $0.5 \times 10^{11}$, about $7 \times 10^{11}$ vg/kg $0.5 \times 10^{11}$, about $8 \times 10^{11}$ vg/kg $0.5 \times 10^{11}$, about $9 \times 10^{11}$ vg/kg $0.5 \times 10^{11}$, about $1 \times 10^{12}$ vg/kg $0.5 \times 10^{12}$, about $2 \times 10^{12}$ vg/kg $0.5 \times 10^{12}$, about $3 \times 10^{12}$ vg/kg±$0.5 \times 10^{12}$, about $4 \times 10^{12}$ vg/kg±$0.5 \times 10^{12}$, about $5 \times 10^{12}$ vg/kg±$0.5 \times 10^{12}$, about $6 \times 10^{12}$ vg/kg±$0.5 \times 10^{12}$, about $7 \times 10^{12}$ vg/kg±$0.5 \times 10^{12}$, about $8 \times 10^{12}$ vg/kg±$0.5 \times 10^{12}$, about $9 \times 10^{12}$ vg/kg±$0.5 \times 10^{12}$, about $1 \times 10^{13}$ vg/kg±$0.5 \times 10^{13}$, about $2 \times 10^{13}$ vg/kg±$0.5 \times 10^{13}$, about $3 \times 10^{13}$ vg/kg±$0.5 \times 10^{13}$, about $4 \times 10^{13}$ vg/kg±$0.5 \times 10^{13}$, about $5 \times 10^{13}$ vg/kg±$0.5 \times 10^{13}$, about $6 \times 10^{13}$ vg/kg±$0.5 \times 10^{13}$, about $7 \times 10^{13}$ vg/kg $0.5 \times 10^{13}$, about $8 \times 10^{13}$ vg/kg $0.5 \times 10^{13}$, about $9 \times 10^{13}$ vg/kg $0.5 \times 10^{13}$, or about $1 \times 10^{14}$ vg/kg $0.5 \times 10^{14}$.

In some embodiments, the dose of modified AAV vectors required to achieve a desired effect or a therapeutic effect will vary based on several factors including, but not limited to, the specific route of administration, the level of gene, RNA or protein expression required to achieve a therapeutic effect, the specific disease being treated, and the stability of the gene, RNA, and/or protein product. A person skilled in the art can adjust dosing and/or determine a dose range to treat a particular subject and/or a particular disease based on the aforementioned factors, as well as other factors that are well known in the art.

In some embodiments, the volume of modified AAV vectors administered to a subject will also depend, among other things, on the size of the subject, the dose of the AAV vector required to obtain therapeutic effect, the concentration of the AAV vector, and the proposed route of administration.

In some embodiments, the rate of administration of AAV vectors delivered to a subject will also depend, among other things, on the size of the subject, the dose of the AAV vector required to obtain therapeutic effect, the concentration of the AAV vector, the volume of the AAV vector solution, and the proposed route of administration. For example, in some embodiments, for intracerebral administration, a rate of administration ranging from about 0.1 μL/min to about 1 μL/min or from about 1 μL/min to about 5 μL/min or from about 5 μL/min to about 10 μL/min can be used.

In some embodiments, the rate of administration of AAV vectors administered to a subject is of about 0.1 μL/min±0.05 μL/min, about 0.2 μL/min±0.05 μL/min, about 0.3 μL/min±0.05 μL/min, about 0.4 μL/min±0.05 μL/min, about 0.5 μL/min±0.05 μL/min, about 0.6 μL/min±0.05 μL/min, about 0.7 μL/min±0.05 μL/min, about 0.8 μL/min±0.05 μL/min, about 0.9 μL/min±0.05 μL/min, 1 μL/min±0.5 μL/min, about 2 μL/min±0.5 μL/min, about 3 μL/min±0.5 μL/min, about 4 μL/min±0.5 μL/min, about 5 μL/min±0.5 μL/min, about 6 μL/min±0.5 μL/min, about 7 μL/min±0.5 μL/min, about 8 μL/min±0.5 μL/min, about 9 μL/min±0.5 μL/min, or about 10 μL/min±0.5 μL/min.

In some embodiments, the total dose or total volume of AAV vectors may be administered continuously (i.e., wherein the total dose or total volume of modified AAV vectors is injected in a single shot or infusion); or discontinuously (i.e., wherein fractions of the total dose or total volume of AAV vectors are injected with intermittent periods between each shot, preferably with short intermittent periods such as periods of time of 15 seconds, 30 seconds, 45 seconds, 1 minute, 2 minutes, 3 minutes, 4 minutes, or 5 minutes between each shot or infusion).

Kits

The present invention also relates to kits and kits-of-parts, for:

transducing a cell of a subject; and/or
delivering a transgene to a subject; and/or
preventing and/or treating a disease in a subject.

In some embodiments, the kits or kits-of-parts comprise one or more AAV vectors and/or compositions according to the present invention.

In some embodiments, the kits or kits-of-parts further comprise a device for delivery of one or more AAV vectors and/or compositions according to the present invention.

In some embodiments, the kits further include instructions for delivery of one or more AAV vectors and/or compositions according to the present invention. In some embodiments, kits comprise instructions for preventing and/or treating a targeted disease, using the compositions, and/or methods described herein.

In some embodiments, kits described herein may further include other materials desirable from a commercial and user standpoint, including buffers, diluents, filters, needles, syringes, and/or package inserts with instructions for performing any methods described herein.

BRIEF DESCRIPTION OF THE DRAWINGS

FIG. 2A: AAV2 incubated with linker (1); FIG. 3A: AAV2 incubated with linker (2); FIG. 4A: AAV2 incubated with linker (3); FIG. 5: AAV2 incubated with linker (4); FIG. 6A: AAV8 incubated with linker (1); FIG. 7: AAV8 incubated with linker (3); FIG. 8: AAV2 incubated with linker (5); FIG. 9A: AAV5 incubated with linker (1); and FIG. 10A: AAV9 incubated with linker (1). FIG. 11: AAV2 incubated with linker (7). FIG. 12 AAV2 incubated with linker (8). FIG. 13: AAV2 incubated with linker (9).

FIG. 2B: AAV2 incubated with linker (1), ConA staining; FIG. 3B: AAV2 incubated with linker (2), RCA1 staining; FIG. 4B: AAV2 incubated with linker (3), UEA1 staining; FIG. 6B: AAV8 incubated with linker (1), ConA staining; FIG. 9B: AAV5 incubated with linker (1), ConA staining; FIG. 10B: AAV9 incubated with linker (1), ConA staining.

FIG. 14A: Percent volume of striatum expressing GFP. FIG. 14B: Percent volume of substantia nigra expressing GFP.

FIG. 15A: immunohistochemistry photograph of mouse brain slices at the striatal level. FIG. 15B: immunohistochemistry photograph of mouse brain slices at the thalamic level. FIG. 15C: immunohistochemistry photograph of mouse brain slices at the nigral level.

EXAMPLES

Figure 1:
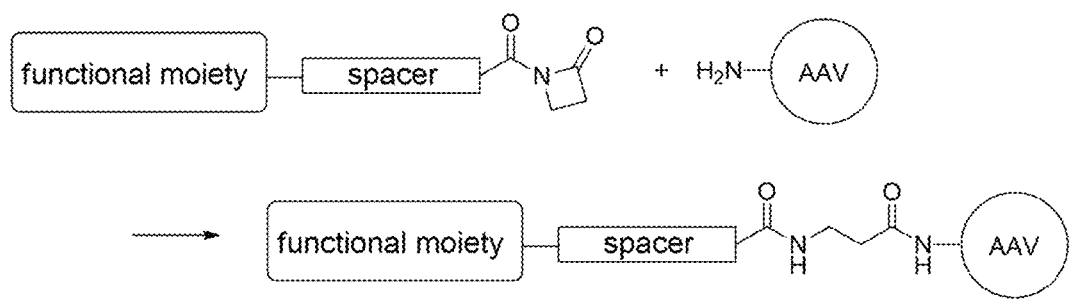
FIG. 1 is a schematic representation illustrating the coupling between a compound comprising a lactam (e.g., β-lactam) according to the invention and a AAV surface-exposed primary amine.
Figure 2A:
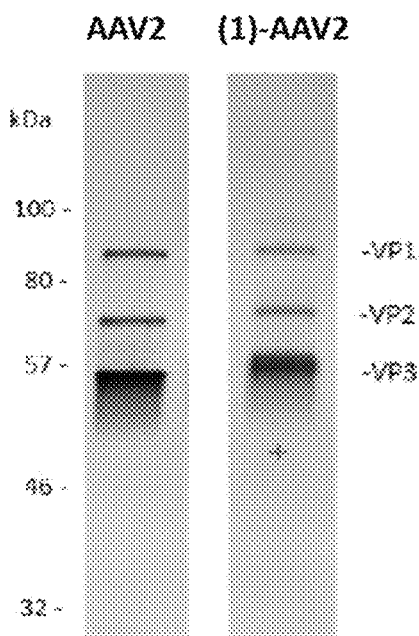
FIG. 2A, FIG. 3A, FIG. 4A, FIG. 5, FIG. 6A, FIG. 7, FIG. 8, FIG. 9A, FIG. 10A, FIG. 11, FIG. 12 and FIG. 13 are SDS-PAGE gels with silver staining evidencing AAV capsid integrity. $10^{12}$ vg of AAV2-eGFP, AAV5-eGFP, AAV8-eGFP, or AAV9-eGFP were added to a solution of lactam linkers (1), (2), (3), (4), (5), (7), (8) or (9) (3E6 eq) in TBS buffer (pH 9.3) and incubated for 4 h at 20° C. $10^{10}$ vg of each coupling was analyzed by SDS-PAGE and silver staining. VP1, VP2 and VP3 are the three proteins constituting the AAV capsid. Capsid protein molecular weight is indicated at the right of the images according to a protein ladder.
Figure 2B:
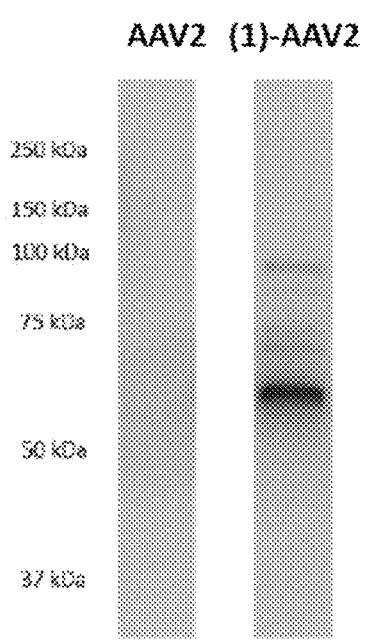
FIG. 2B, FIG. 3B, FIG. 4B, FIG. 6B, FIG. 9B, and FIG. 10B are western blot analysis. $10^{12}$ vg of AAV2-eGFP, AAV5-eGFP, AAV8-eGFP, or AAV9-eGFP were added to a solution of lactam linkers (1), (2) or (3) (3E6 eq) in TBS buffer (pH 9.3) and incubated for 4 h at 20° C. $10^{10}$ vg of each coupling was analyzed by Western blot using Concanavalin-HRP (ConA) or biotinylated lectins RCA1 and UEA1 to detect VP proteins coupled to their linker.
Figure 3A:
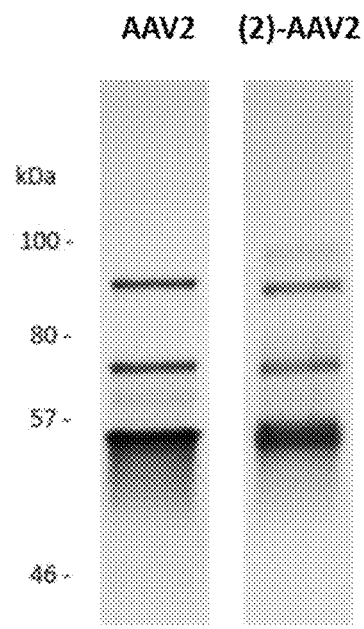
Figure 3B:
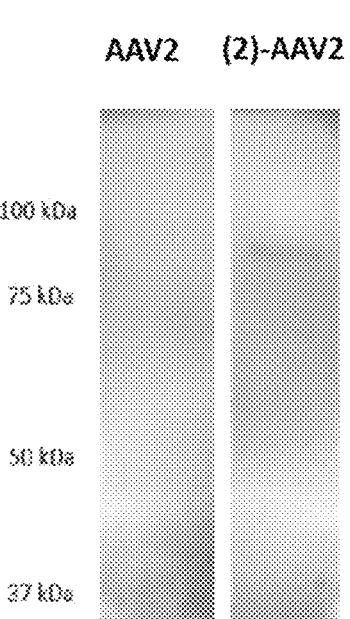
Figure 4A:
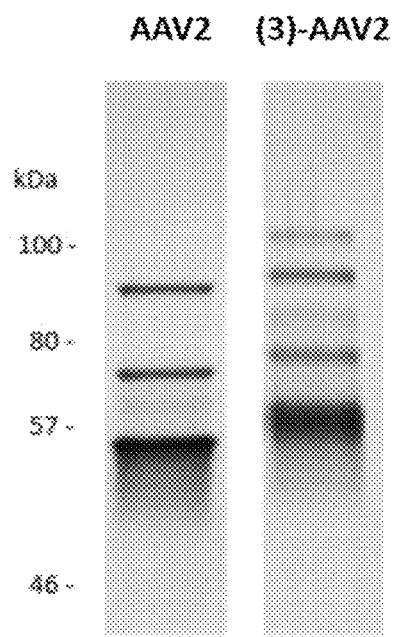
Figure 4B:
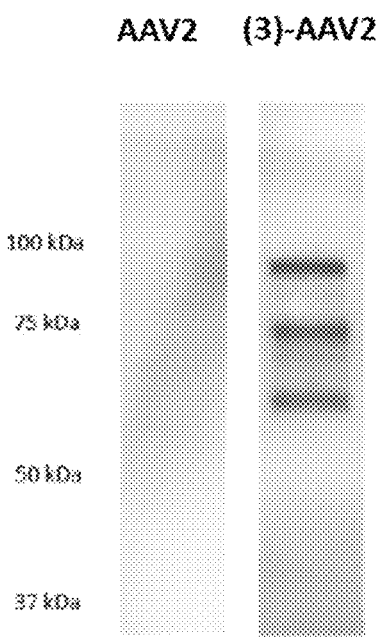
Figure 5:
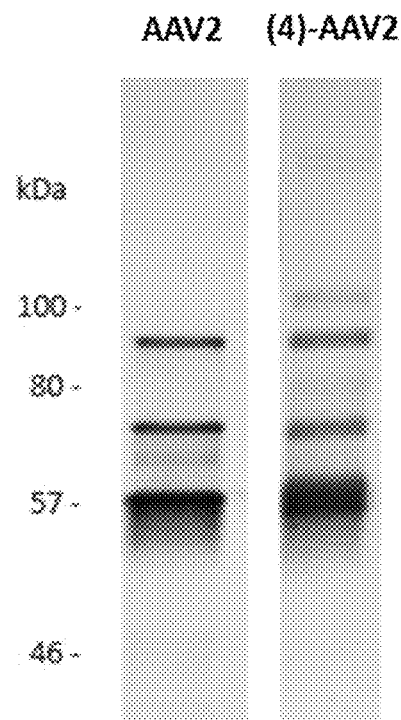
Figure 6A:
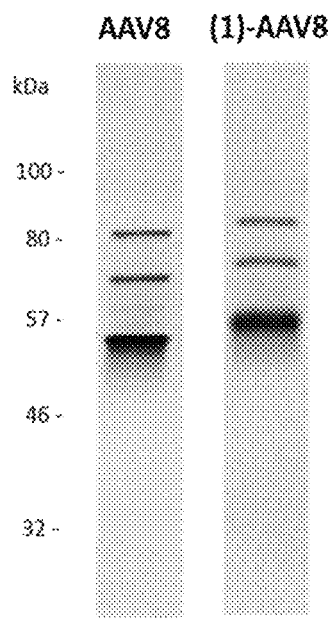
Figure 6B:
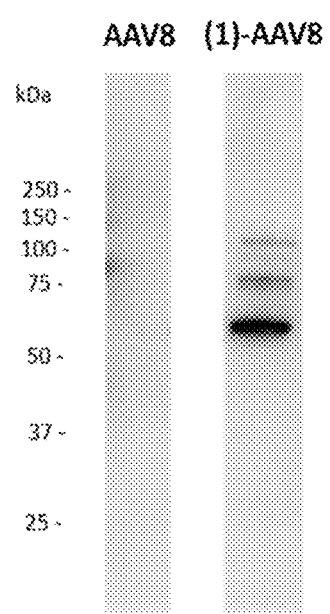
Figure 7:
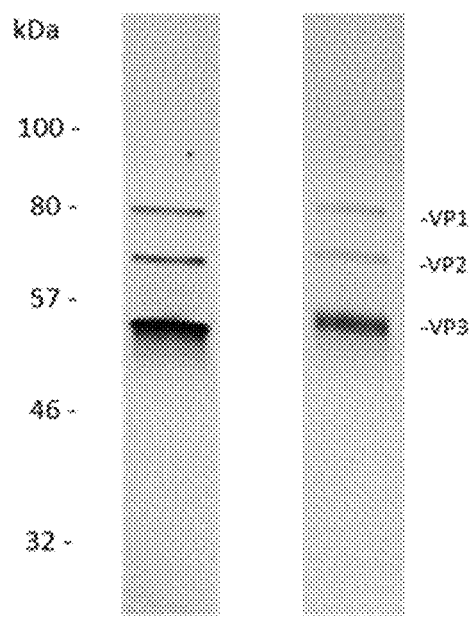
Figure 8:
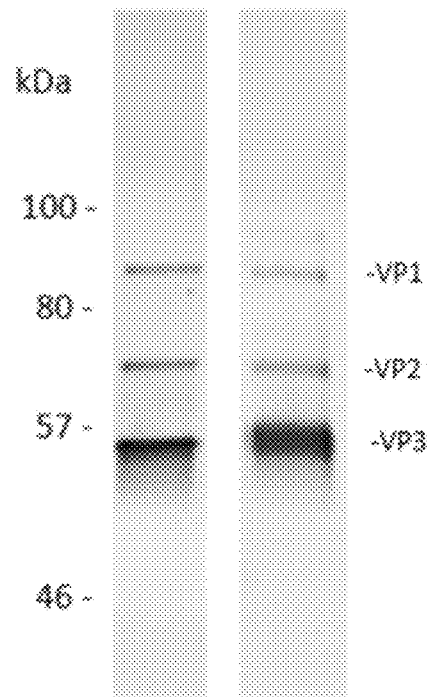
Figure 9A:
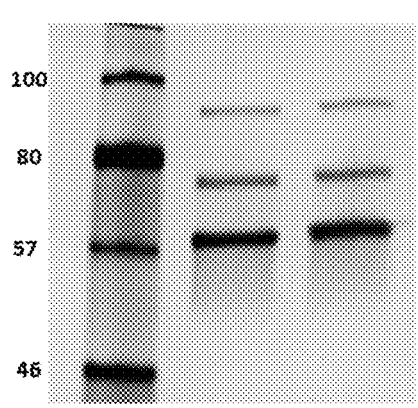
Figure 9B:
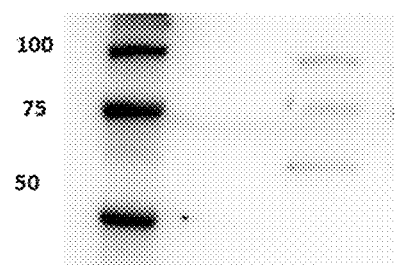
Figure 10A:
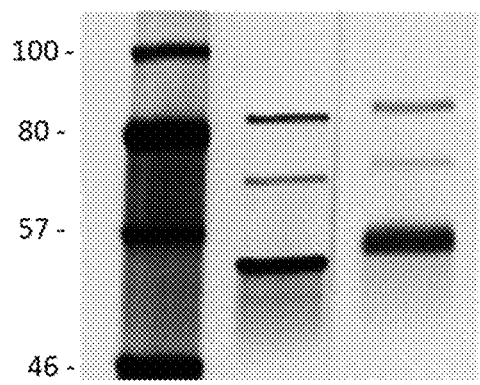
Figure 10B:
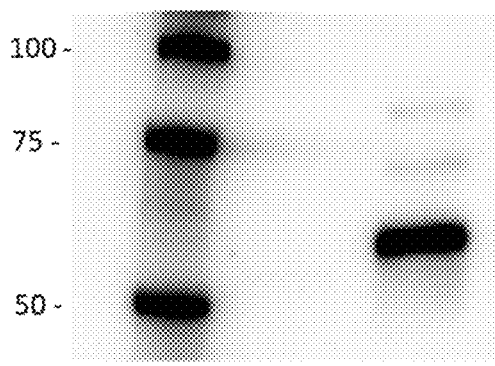
Figure 11:
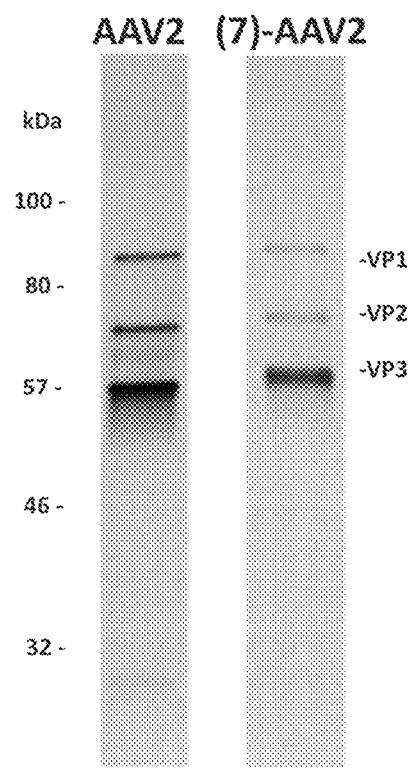
Figure 12:
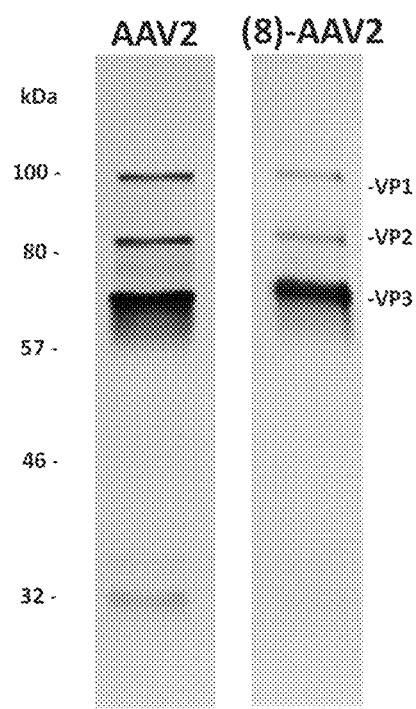
Figure 13:
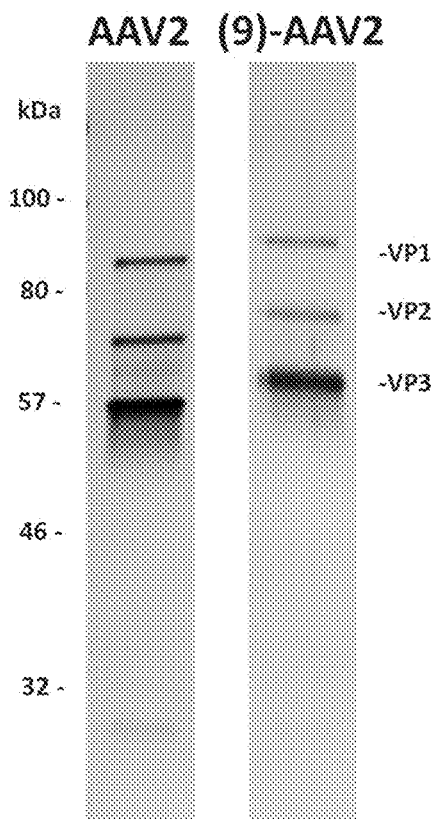

The present invention is further illustrated by the following examples.

The following abbreviations are used:
ACN: Acetonitrile;
AgOTf: Silver (I) trifluoromethanesulfonate;
DBU: 1,8-Diazabicyclo[5.4.0]undec-7-ene;
DCM: Dichloromethane;
DIAD: Diisopropyl azodicarboxylate;
DMF: Dimethylformamide;
DPBS: Dulbecco's phosphate buffered saline;
EtOAc: Ethyl acetate;
EtOH: Ethanol;
MeOH: Methanol;
n-BuLi: n-Butyllithium;
TBS: Tris buffered saline;
THF: Tetrahydrofuran;
TMSOTf: Trimethylsilyl trifluoromethanesulfonate.

I. Synthesis of Compounds of Formula (I)

I.1. Material and Analytical Methods

Materials

Solvents, reagents and starting material were purchased and used as received from commercial sources, unless otherwise specified.

The intermediates and compounds described below were named using ChemBioDraw® Ultra version 12.0 (Perkin Elmer).

Analytical Methods
 HPLC
  Apparatus: HPLC—Shimadzu Nexera-i LC-2040C 3D with DAD detector;
  Column: Gemini-NX 3µ C18 (4.6×50 mm), 110 Å, column no. OOB-4453-EO;
HPLC-1 conditions:
  Wavelength: 200.0 nm±4.0 nm; 283.0 nm±4.0 nm; Flow: 0.5 ml/min; Column temperature: 30° C.; Injection volume: 1.0 µl;
  Elution: gradient with mobile phase A, water, and mobile phase B, acetonitrile.

TABLE 3

| HPLC-1 conditions | | |
|---|---|---|
| Time [min] | Mobile phase A [%] | Mobile phase B [%] |
| 0.0 | 95 | 5 |
| 2.0 | 95 | 5 |
| 9.5 | 20 | 80 |
| 10.5 | 20 | 80 |
| 12.0 | 95 | 5 |
| 14.0 | 95 | 5 |

Sample preparation: Dissolve sample in ACN to obtain final concentration 0.5 mg/ml.

HPLC-2 conditions:
Wavelength: 200.0 nm±4.0 nm; 283.0 nm±4.0 nm; Flow: 0.5 ml/min; Column temperature: 45° C.; Injection volume: 1.5 μl;
Elution: gradient with mobile phase A, water with 0.1% formic acid, and mobile phase B, acetonitrile with 0.1% formic acid.

TABLE 4

| HPLC-2 conditions | | |
| --- | --- | --- |
| Time [min] | Mobile phase A [%] | Mobile phase B [%] |
| 0.0 | 90 | 10 |
| 9.5 | 20 | 80 |
| 10.5 | 20 | 80 |
| 12.0 | 90 | 10 |
| 14.0 | 90 | 10 |

Sample preparation: Dissolve sample in ACN to obtain final concentration 0.5 mg/ml.

HPLC-3 conditions:
Wavelength: 205.0 nm±4.0 nm; 283.0 nm±4.0 nm; Flow: 0.5 ml/min; Column temperature: 30° C.; Injection volume: 1.0 μl;
Elution: gradient with mobile phase A, water, and mobile phase B, acetonitrile.

TABLE 4a

| HPLC-3 conditions | | |
| --- | --- | --- |
| Time [min] | Mobile phase A [%] | Mobile phase B [%] |
| 0.0 | 95 | 5 |
| 4.0 | 95 | 5 |
| 19.0 | 20 | 80 |
| 21.0 | 20 | 80 |
| 24.0 | 95 | 5 |
| 28.0 | 95 | 5 |

Sample preparation: Dissolve sample in $H_2O$/ACN (1:1) to obtain final concentration 0.25 mg/ml.

LC/MS
Apparatus: Shimadzu LCMS-2020 Single Quadrupole Liquid Chromatograph Mass Spectrometer;
Column: Acquity UPLC 1.8 μm C18 (2.1×50 mm), 100 Å, column no. 186003532;
UHPLC conditions: Wavelength: 220.0 nm±4.0 nm; 254.0 nm±4.0 nm;
Flow: 0.5 ml/min; Column temperature: 25° C.; Autosampler temperature: 20° C.;
Injection volume: 1 μl;
Elution: gradient with mobile phase A, water with 0.10% formic acid, and mobile phase B, acetonitrile with 0.1% formic acid.

TABLE 5

| LC/MS conditions | | | |
| --- | --- | --- | --- |
| Time [min] (6 min) | Time [min] (12 min) | Mobile phase A [%] | Mobile phase B [%] |
| 0.00 | 0.00 | 95 | 5 |
| 4.00 | 10.00 | 5 | 95 |
| 5.00 | 10.50 | 5 | 95 |
| 5.20 | 11.00 | 95 | 5 |
| 6.00 | 12.00 | 95 | 5 |

MS conditions: Mass range: 100-1500 m/z; Ionization: alternate; Scan speed: 15 000 u/sec.
Sample preparation: Dissolve sample in ACN to obtain final concentration 0.25 mg/ml.

Flash Chromatography
Conditions-1:
Apparatus: Pure C-850 FlashPrep, BUCHI;
Column: PF-15-C18-F0080, Puriflash, 15 μm;
Conditions: Wavelength: 200 nm; 254 nm and ELSD detector; Flow: 30 ml/min;
Elution: gradient with mobile phase A, water, and mobile phase B, acetonitrile.

TABLE 6

| Chromatography conditions-1 | | |
| --- | --- | --- |
| Time [min] | Mobile phase A [%] | Mobile phase B [%] |
| 00.00 | 100 | 0 |
| 7.60 | 95 | 5 |
| 21.20 | 89 | 11 |
| 30.00 | 81 | 19 |
| 34.90 | 79 | 21 |
| 52.00 | 79 | 21 |
| 74.90 | 0 | 100 |

Sample preparation: The crude material was dissolved in $H_2O$/ACN.

Conditions-2:
Apparatus: Puriflash XS 420, Interchim;
Column: PF-RP-HP-F0040, Puriflash, 15 μm;
Conditions: Wavelength: 220 nm; 254 nm; Flow: 30 ml/min;
Elution: gradient with mobile phase A, water, and mobile phase B, acetonitrile.

TABLE 6a

| Chromatography conditions-2 | | |
| --- | --- | --- |
| Time [min] | Mobile phase A [%] | Mobile phase B [%] |
| 00.00 | 95 | 5 |
| 45.00 | 60 | 40 |
| 55.00 | 0 | 100 |
| 70.00 | 0 | 100 |

Sample preparation: The crude material was dissolved in $H_2O$/ACN (1:1).

I.2. Synthesis of Building Blocks

Building Block 1 (BB1): 2-[2-(2-azidoethoxy)ethoxy]ethan-1-ol

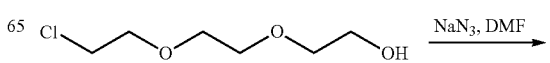

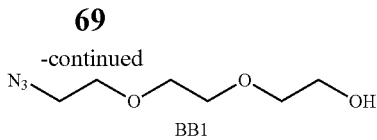
BB1

A mixture of 2-[2-(2-chloroethoxy)ethoxy]ethanol (1 eq., 5.0 g) and sodium azide (1 eq., 1.9 g) in dry DMF (30 mL) was stirred at 90° C. overnight. The reaction mixture was cooled down to room temperature, diluted with THF (10 mL) and stirred for 15 min. The resulting suspension was filtered, the cake was washed with THF, and the filtrate was concentrated under reduced pressure to deliver the product as a yellow oil (5.1 g, yield 98%). LC/MS (6 min): RT=1.79 min, found [M+H]$^+$ 176.00; $^1$H NMR (300 MHz, Chloroform-d) δ 3.73-3.60 (m, 8H), 3.57 (dd, J=5.5, 3.7 Hz, 2H), 3.36 (t, J=5.0 Hz, 2H), 2.78 (s, 1H).

Building Block 3 (BB3):
1-(4-ethynylbenzoyl)azetidin-2-one

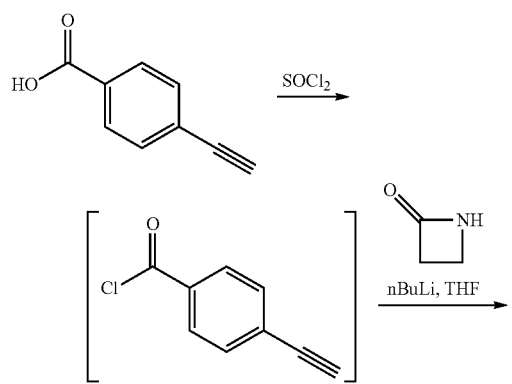

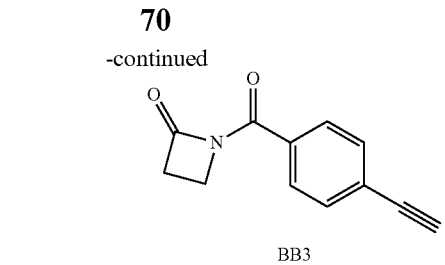
BB3

A mixture of 4-ethynylbenzoic acid (1 eq., 1.0 g) and SOCl$_2$ (3 eq., 12.2 g/7.4 mL) was kept under reflux overnight, next was concentrated under vacuum to give an orange solid. 2-Azetidinone (1 eq., 0.43 g) was dissolved in THF (20 mL), the solution was cooled down to −78° C., and 2M solution of nBuLi in hexane (1 eq., 3.04 mL) was dropwise added. The resulting suspension was stirred at −78° C. for 15 minutes, and next treated dropwise with a solution of 4-ethynylbenzoyl chloride in THF (5 mL). The reaction mixture was allowed to stir at room temperature overnight, and was quenched with an aqueous NH$_4$Cl solution. The product was extracted with DCM (2×50 mL), the organic layers were combined, dried over MgSO$_4$, filtered, and evaporated under reduced pressure to dryness. The crude material was purified by silica gel column chromatography using hexane/EtOAc as an eluent (100:0->80:20->50:50) to deliver 0.45 g (yield: 37%) of the product as a yellow solid. LC/MS (6 min): RT=2.76 min, found [M+H]$^+$ 199.70; $^1$H NMR (300 MHz, DMSO-d6) δ 7.85 (d, 2H), 7.60 (d, 2H), 4.46 (s, 1H), 3.66 (t, J=5.5 Hz, 2H), 3.11 (t, J=5.5 Hz, 2H).

I.3. Preparation of Compounds of Formula (I)

Compound (1): 1-(4-(1-(2-(2-(2-(((3S,4S,5S,6R)-3,4,5-trihydroxy-6-(hydroxymethyl)tetrahydro-2H-pyran-2-yl)oxy)ethoxy)ethoxy)ethyl)-1H-1,2,3-triazol-4-yl)benzoyl)azetidin-2-one

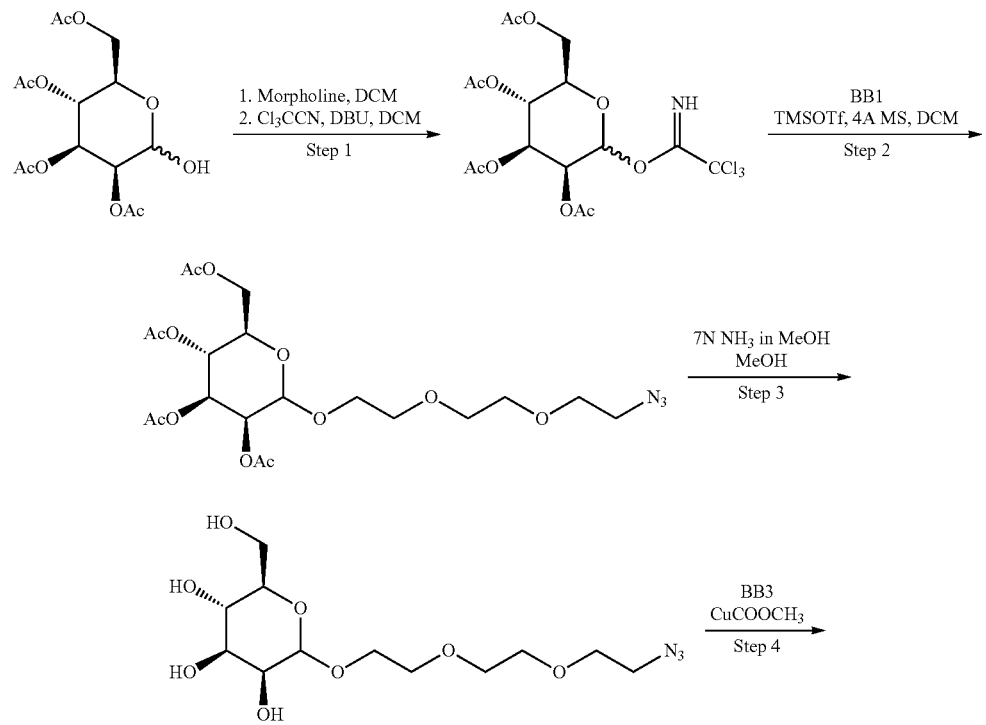

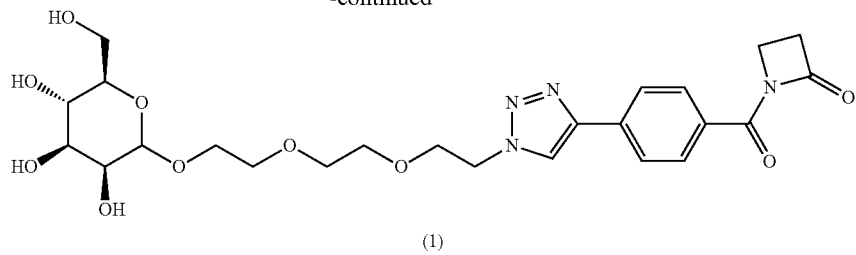

(1)

Step 1: [3,4,5,6-tetrakis(acetyloxy)oxan-2-yl]methyl acetate (1 eq., 5.0 g) was dissolved in dry DCM (50 mL) under argon atmosphere, morpholine (4 eq., 1.6 g) was added, and the solution was stirred at room temperature overnight. The reaction mixture was then washed twice with 2M HCl (2×50 mL), water (50 mL), dried over $MgSO_4$, filtered, and concentrated under reduced pressure. The resulting yellow oil was dissolved in dry DCM (50 mL) under argon atmosphere, the solution was cooled down to 0° C., and treated with trichloroacetonitrile (10 eq., 16.7 g/11.6 mL). After being stirred for 1h at 0° C., DBU (0.2 eq., 0.35 g/0.35/mL) was added, the reaction mixture was stirred at 0° C. for 1h, and next at room temperature for 1h. The solvents were removed under reduced pressure, and the brown oily residue was purified by silica gel column chromatography using hexane/EtOAc (1:1) as eluent to yield the product (4.3 g, yield 68.8%) as an yellowish oil. $^1$H NMR (300 MHz, DMSO-$d_6$) δ 10.15 (s, 1H), 6.22 (s, 1H), 5.33-5.16 (m, 3H), 4.26-3.96 (m, 3H), 2.15 (s, 3H), 2.12-1.86 (m, 9H).

Step 2: To a suspension of [3,4,5-tris(acetyloxy)-6-[(2,2,2-trichloroethanimidoyl)oxy]oxan-2-yl]methyl acetate (1 eq., 4.34 g) and molecular sieves 4 Å (to keep the reaction mixture anhydrous) in dry DCM (40 mL) under argon atmosphere was added BB1 (1.5 eq., 0.53 g) at room temperature. The mixture was cooled down to −25° C., and TMSOTf (1.1 eq., 2.15 h/1.75 mL) was added. The reaction mixture was stirred at −25° C. for 1 h, and then was allowed to stir at room temperature overnight. The reaction was quenched with saturated $NaHCO_3$ solution (60 mL), DCM (100 mL) was added, the phases were separated, and the organic phase was washed with water (100 mL), brine (50 mL), and dried over $MgSO_4$. The resulting suspension was filtered, the filtrate was concentrated under reduced pressure, and the residue was purified by silica gel column chromatography using hexane/EtOAc (1:1) as eluent to deliver 1.8 g of the product (yield 59%) as an colorless oil. $^1$H NMR (300 MHz, Chloroform-d) δ 5.82-5.64 (m, 3H), 5.28 (d, J=1.8 Hz, 1H), 4.78-4.64 (m, 1H), 4.55-4.42 (m, 2H), 4.25-4.16 (m, 1H), 4.08 (dd, J=5.1, 2.2 Hz, 9H), 3.85-3.75 (m, 2H), 2.48 (ddd, J=34.4, 15.5, 1.6 Hz, 12H).

Step 3: [3,4,5-Tris(acetyloxy)-6-{2-[2-(2-azidoethoxy)ethoxy]ethoxy}oxan-2-yl]methyl acetate (1 eq., 0.3 g) was dissolved in 7N $NH_3$ in MeOH (5 mL) and stirred at room temperature overnight. The solvent was removed under reduced pressure to dryness, and the crude product was used for the next step without further purification (200 mg, yield quantitative).

Step 4: To a solution of 2-{2-[2-(2-azidoethoxy)ethoxy]ethoxy}-6-(hydroxymethyl)oxane-3,4,5-triol (1 eq., 0.2 g) in THF/MeOH (3 mL/1 mL) were added BB3 (1.1 eq., 0.130 g), copper (I) acetate (0.25 eq., 0.018 g), and L-ascorbic acid (1.1 eq., 0.126 g). The reaction mixture was stirred at 60° C. for 1h. Then, the solvents were removed under reduced pressure, and the residue was purified by reversed phase flash column chromatography (Column FP-ID-C18, $H_2O$:ACN, starting from $H_2O$ 100% to ACN 100%) to deliver 94.2 mg (yield: 27.8%) of the product (1) as a white solid foam. LC/MS (6 min): RT=2.11 min, found [M+H]$^+$ 537.15; LC/MS (12 min): RT=4.59 min, found [M+H]$^+$ 537.3; HPLC-1 purity: 99.14% (200 nm), 99.25% (283 nm); $^1$H NMR (300 MHz, DMSO-d6) δ 8.70 (s, 1H), 8.05-7.91 (m, 4H), 4.74 (dd, J=8.9, 4.5 Hz, 2H), 4.60 (dd, J=6.6, 3.4 Hz, 4H), 4.45 (t, J=6.0 Hz, 1H), 3.88 (t, J=5.1 Hz, 2H), 3.73-3.38 (m, 15H), 3.12 (t, J=5.4 Hz, 2H).

Compound (2): 1-(4-(1-(2-(2-(2-(((3R,4S,5R,6R)-3,4,5-trihydroxy-6-(hydroxymethyl)tetrahydro-2H-pyran-2-yl)oxy)ethoxy)ethoxy)ethyl)-1H-1,2,3-triazol-4-yl)benzoyl)azetidin-2-one

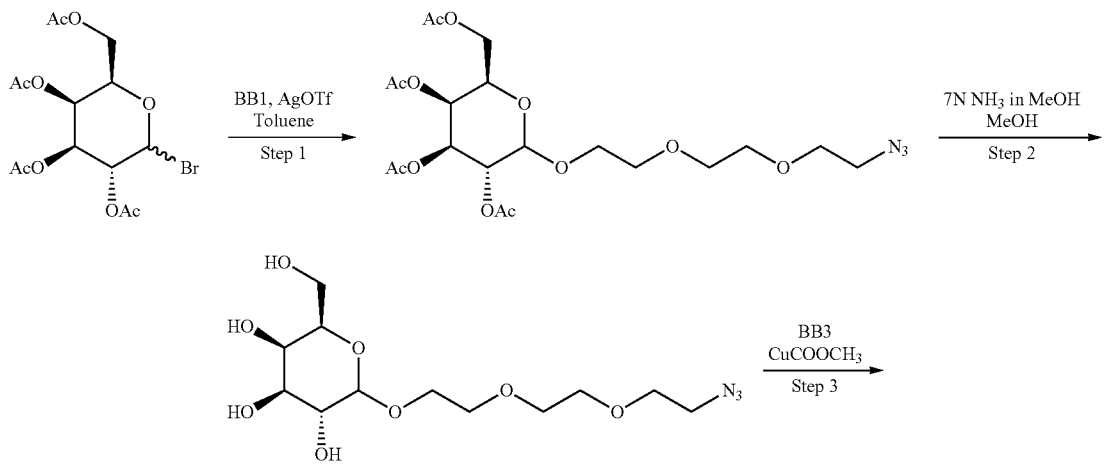

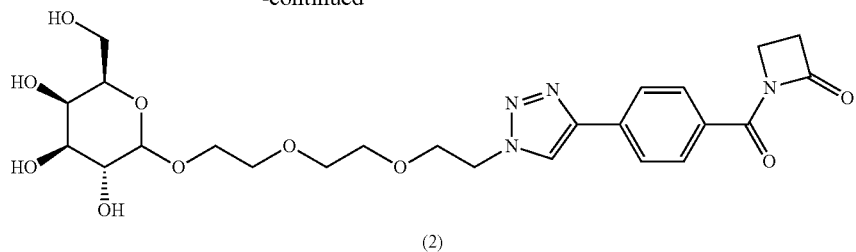

(2)

Step 1: To a suspension of [3,4,5-tris(acetyloxy)-6-bromooxan-2-yl]methyl acetate (1 eq., 5.0 g) and molecular sieves 4A (to keep the reaction mixture anhydrous) in dry DCM (100 mL) under argon atmosphere was added BB1 (1.5 eq., 3.1 g) and AgOTf (1.4 eq., 1.75 g) at room temperature. The reaction mixture was stirred at room temperature overnight. The resulting suspension was filtered through a pad of Celite, the filtrate was concentrated under reduced pressure, and the residue was purified by silica gel column chromatography using hexane/EtOAc (1:1) as eluent to deliver 2.5 g of the product (yield 40%) as a yellow oil. $^1$H NMR (300 MHz, DMSO-d6) δ 5.25 (dd, J=3.5, 1.1 Hz, 1H), 5.14 (dd, J=10.4, 3.5 Hz, 1H), 4.93 (dd, J=10.4, 7.9 Hz, 1H), 4.72 (d, J=8.0 Hz, 1H), 4.22-4.13 (m, 1H), 4.04 (dd, J=6.3, 1.6 Hz, 2H), 3.86-3.74 (m, 1H), 3.67-3.47 (m, 9H), 3.39 (dd, J=5.6, 4.2 Hz, 2H), 2.11 (s, 3H), 2.00 (d, J=3.9 Hz, 6H), 1.91 (s, 3H).

Step 2: [3,4,5-tris(acetyloxy)-6-{2-[2-(2-azidoethoxy)ethoxy]ethoxy}oxan-2-yl]methyl acetate (1 eq., 2.0 g) was dissolved in 7N $NH_3$ in MeOH (15 mL) and stirred at room temperature for 72h. The solvent was removed under reduced pressure to dryness, and the crude product was used for the next step without further purification (1.33 g, yield quantitative).

Step 3: To a solution of 2-{2-[2-(2-azidoethoxy)ethoxy]ethoxy}-6-(hydroxymethyl)oxane-3,4,5-triol (1 eq., 0.344 g) in THF/MeOH (3 mL/1 mL) were added BB3 (1.1 eq., 0.217 g), copper (I) acetate (0.05 eq., 0.006 g), and L-ascorbic acid (1.1 eq., 0.192 g). The reaction mixture was stirred at 60° C. for 1h. Then, the solvents were removed under reduced pressure, and the residue was purified by reversed phase flash column chromatography (Column FP-ID-C18, $H_2O$:ACN, starting from $H_2O$ 100% to ACN 100%) to deliver 29 mg (Y: 5.5%) of the product as a white solid foam. LC/MS (6 min): RT=2.06 min, found [M+H]$^+$ 537.25; LC/MS (12 min): RT=3.123 min, found [M+H]$^+$ 537.3; HPLC-1 purity: 98.51% (200 nm), 98.80% (283 nm); $^1$H NMR (300 MHz, DMSO-d6) δ 8.71 (s, 1H), 8.01-7.93 (m, 4H), 4.85 (d, J=4.2 Hz, 1H), 4.72 (d, J=4.7 Hz, 1H), 4.58 (dt, J=11.1, 5.4 Hz, 3H), 4.37 (d, J=4.5 Hz, 1H), 4.07 (d, J=6.7 Hz, 1H), 3.88 (t, J=5.1 Hz, 2H), 3.68 (t, J=5.4 Hz, 2H), 3.61 (t, J=3.5 Hz, 1H), 3.50 (pd, J=7.8, 6.5, 4.2 Hz, 9H), 3.27 (d, J=4.7 Hz, 2H), 3.12 (t, J=5.4 Hz, 2H).

Compound (3): 1-(4-(1-(2-(2-(2-(((3S,4R,5S,6S)-3,4,5-trihydroxy-6-methyltetrahydro-2H-pyran-2-yl)oxy)ethoxy)ethoxy)ethyl)-1H-1,2,3-triazol-4-yl)benzoyl)azetidin-2-one

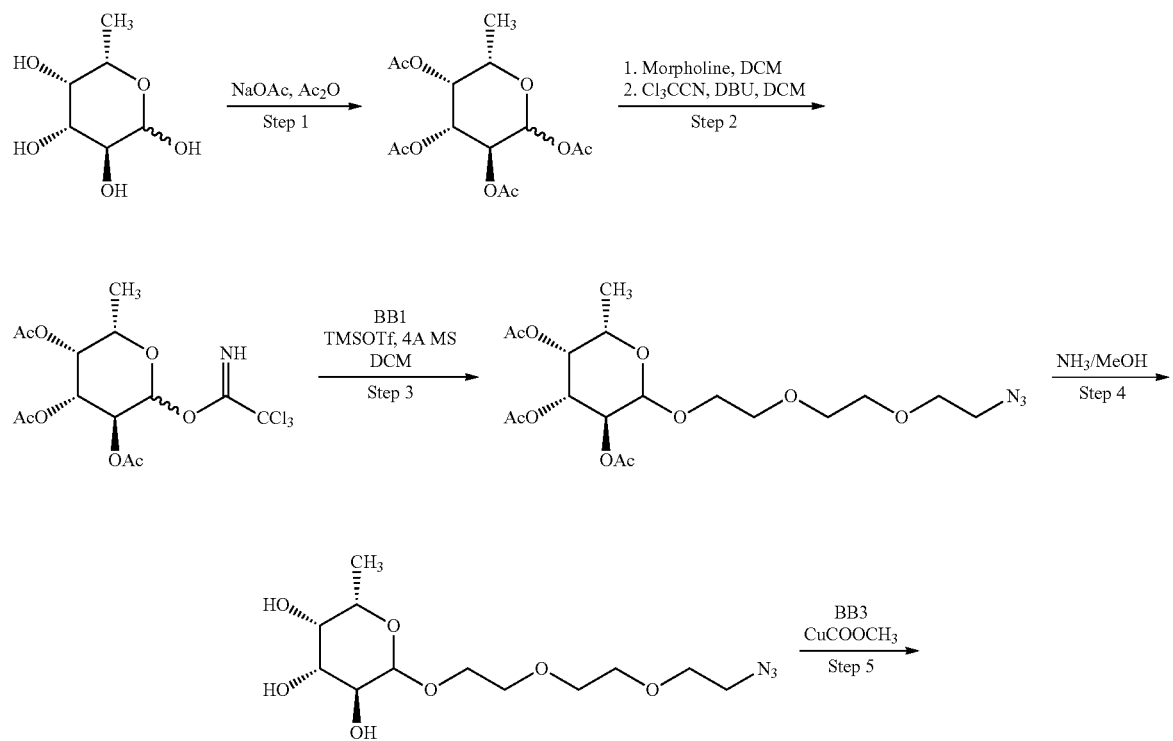

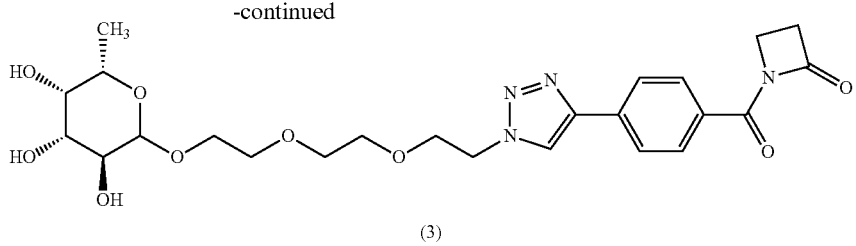

(3)

Step 1: A suspension of anhydrous sodium acetate (1 eq., 2.5 g) and acetic anhydride (60 mL) was refluxed for 5 min, next L-(−)-fucose (1 eq., 5.0 g) was added and the reaction mixture was refluxed overnight. The hot solution was poured on an ice water, and the mixture was extracted with DCM (200 mL). The organic phase was washed with water (300 mL), dried over MgSO$_4$, filtered, and concentrated under reduced pressure to deliver the product as a brown oil (8.5 g, yield 83.7%). $^1$H NMR (300 MHz, Chloroform-d) δ 5.62 (d, J=8.3 Hz, 1H), 5.27 (dd, J=2.8, 1.4 Hz, 1H), 5.23-5.19 (m, 1H), 5.01 (dd, J=10.4, 3.4 Hz, 1H), 3.90 (dd, J=6.4, 1.2 Hz, 1H), 2.15-1.91 (m, 20H), 1.16 (d, J=6.4 Hz, 3H).

Step 2: 2,3,5-tris(acetyloxy)-6-methyloxan-4-yl acetate (1 eq., 8.5 g) was dissolved in dry DCM (90 mL) under argon atmosphere, morpholine (4 eq., 8.9 g) was added, and the solution was stirred at room temperature overnight. The reaction mixture was then washed with 2M HCl (2×90 ml), water (100 mL), dried over MgSO$_4$, filtered, and concentrated under reduced pressure. The resulting yellow oil was dissolved in dry DCM (60 mL) under argon atmosphere, the solution was cooled down to 0° C., and treated with trichloroacetonitrile (10 eq., 24.4 g/16.9 mL). After being stirred for 1h at 0° C., DBU (0.2 eq., 0.51 g/0.51 mL) was added, the reaction mixture was stirred at 0° C. for 1h, and next at room temperature for 1 hour. The solvents were removed under reduced pressure, and the brown oily residue was purified by silica gel column chromatography using hexane/EtOAc (1:1) as eluent to yield the product (5.42 g, yield 65.2%) as a yellowish oil.

Step 3: To a suspension of 3,5-bis(acetyloxy)-2-methyl-6-[(2,2,2-trichloroethanimidoyl)oxy]oxan-4-yl acetate (1 eq., 5.42 g) and molecular sieves 4A (to keep the reaction mixture anhydrous) in dry DCM (60 mL) under argon atmosphere was added BB1 (1.5 eq., 3.28 g) at room temperature. The mixture was cooled down to −25° C., and TMSOTf (1.1 eq., 3.05 g/2.48 mL) was added. The reaction mixture was stirred at −25° C. for 1h, and then was allowed to stir at room temperature overnight. The reaction was quenched with saturated NaHCO$_3$ solution (80 mL), next DCM (100 mL) was added, the phases were separated, and the organic phase was washed with water (100 mL), brine (50 mL), and dried over MgSO$_4$. The solution was filtered, the filtrate was concentrated under reduced pressure, and the residue was purified by silica gel column chromatography using hexane/EtOAc (1:1) as eluent to deliver 0.87 g of the product (yield 15.0%) as a colorless oil. $^1$H NMR (300 MHz, Chloroform-d) δ 5.27-5.15 (m, 2H), 5.09-4.98 (m, 1H), 4.53 (d, J=7.9 Hz, 1H), 4.03-3.94 (m, 1H), 3.82-3.74 (m, 1H), 3.74-3.62 (m, 9H), 3.41 (t, J=5.0 Hz, 2H), 2.18 (s, 3H), 2.06 (s, 3H), 1.99 (s, 3H), 1.23 (d, J=6.4 Hz, 3H).

Step 4: 3,5-bis(acetyloxy)-2-{2-[2-(2-azidoethoxy)ethoxy]ethoxy}-6-methyloxan-4-yl acetate (1 eq., 0.87 g) was dissolved in 7N NH$_3$ in MeOH (12 mL) and stirred at room temperature overnight. The solvent was removed under reduced pressure to dryness, and the crude product was used for the next step without further purification (700 mg, yield quantitative).

Step 5: To a solution of 2-{2-[2-(2-azidoethoxy)ethoxy]ethoxy}-6-methyloxane-3,4,5-triol (1 eq., 0.200 g) in THF/MeOH (3 mL/1 mL) were added BB3 (1.1 eq., 0.136 g), copper (I) acetate (0.05 eq., 0.004 g), and L-ascorbic acid (1.1 eq., 0.121 g). The reaction mixture was stirred at 60° C. for 1h. Then, the solvents were removed under reduced pressure, and the residue was purified by reversed phase flash column chromatography (Column FP-ID-C18, H$_2$O: ACN, starting from H$_2$O 100% to ACN 100%) to deliver 51 mg (Y: 15.7%) of the product as a white solid foam. LC/MS (6 min): RT=2.16 min, found [M+H]$^+$ 521.25; LC/MS (12 min): RT 3.271 min, found [M+H]$^+$ 521.4; HPLC-1 purity: 99.08% (200 nm), 99.01% (283 nm); $^1$H NMR (300 MHz, DMSO-d6) δ 8.71 (s, 1H), 8.01-7.92 (m, 4H), 4.63-4.56 (m, 3H), 4.52-4.48 (m, 1H), 4.42-4.38 (m, 1H), 3.88 (t, J=5.1 Hz, 2H), 3.77 (q, J=6.5 Hz, 1H), 3.68 (t, J=5.4 Hz, 2H), 3.64-3.38 (m, 12H), 3.13 (t, J=5.4 Hz, 2H), 1.04 (d, J=6.5 Hz, 3H).

Compound (4): 1-(4-(1-(2-(2-(2-(((3R,4S,6R)-4-(dimethylamino)-3-hydroxy-6-methyltetrahydro-2H-pyran-2-yl)oxy)ethoxy)ethoxy)ethyl)-1H-1,2,3-triazol-4-yl)benzoyl)azetidin-2-one

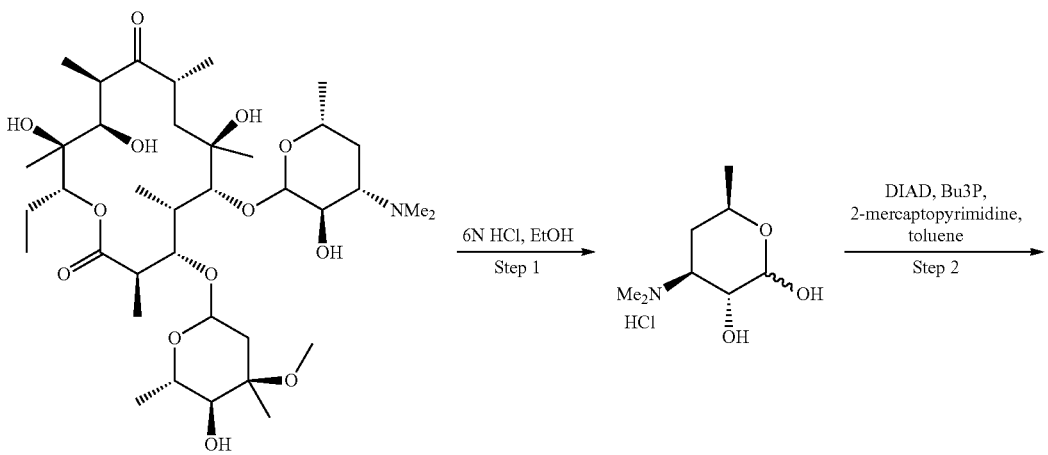

-continued

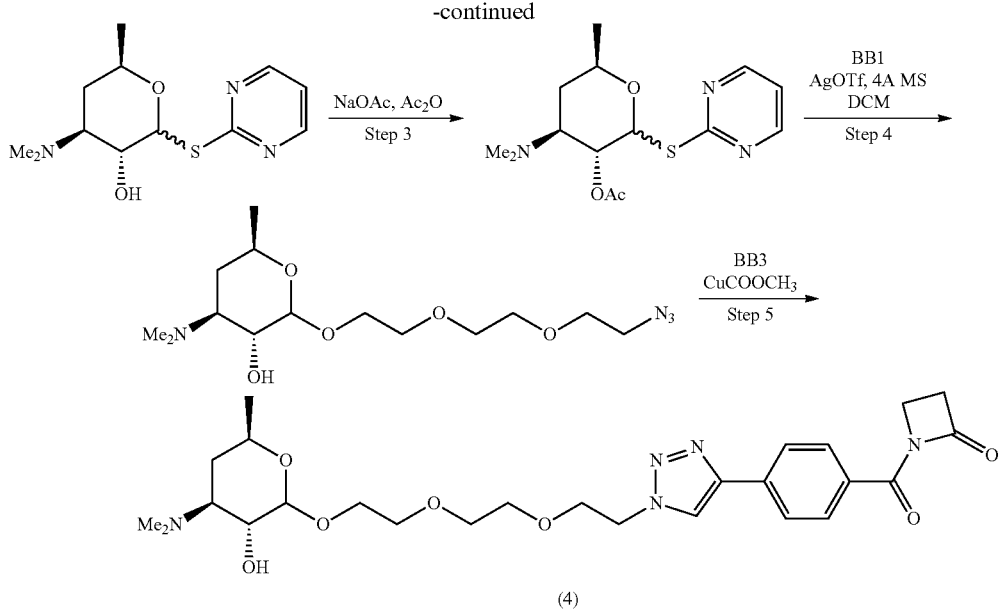

(4)

Step 1: A solution of erythromycin (1 eq., 46 g) in EtOH (2500 mL)-6N HCl (16 vol, 740 mL) was refluxed for 4 hours. The reaction mixture was cooled to room temperature, and the liquid was decanted from a dark insoluble material. The solution was washed with chloroform (6×2000 mL). The aqueous ethanolic layer was concentrated under reduced pressure to remove ethyl alcohol. 1-Butanol (1000 mL) was added followed by water (500 mL). The phases were separated, the aqueous layer was washed with 1-butanol (4×1000 mL), and the combined organic layers were washed with water (1000 mL). All aqueous layers were combined, and concentrated under reduced pressure to dryness. The oily residue was dissolved in EtOH (10 mL), and diethyl ether was added (200 mL) to form a precipitate. The solid was filtered, washed with diethyl ether, and dried to give desosamine hydrochloride (6.6 g, Y=60%) as a white solid. LC/MS (6 min): No UV absorbance detected (lack of chromophore), the mass detected on the positive ionization, RT=0.45 min, found [M+H]$^+$ 175.75 (a free base); $^1$H NMR (300 MHz, DMSO-d6) δ 9.73 (d, J=41.8 Hz, 1H), 7.01 (s, 0.5H), 6.70 (d, J=4.5 Hz, 0.5H), 6.01 (s, 0.5H), 5.62 (s, 0.5H), 5.00 (d, J=3.4 Hz, 0.5H), 4.38 (dd, J=7.3, 3.0 Hz, 0.5H), 4.04 (ddd, J=11.4, 6.2, 2.2 Hz, 0.5H), 3.60 (qd, J=6.0, 1.9 Hz, 1H), 3.23 (d, J=10.2 Hz, 0.5H), 2.77-2.64 (m, 6H), 2.05-1.93 (m, 1H), 1.40 (qd, J=11.9, 8.0 Hz, 1H), 1.15 (dd, J=17.0, 6.2 Hz, 3H).

Step 2: To a solution of Bu$_3$P (1 eq., 8.2 mL) in toluene (20 vol., 150 mL) at −30° C. was dropwise added DIAD (1 eq., 6.7 g) under argon atmosphere The resulting solution was stirred for 20 min., and desosamine hydrochloride (1 eq., 7.0 g) was added. The mixture was stirred at −30° C. for 45 min, next 2-mercaptopyridine (1 eq., 3.7 g) was added, and the reaction mixture was allowed to stir at room temperature for 16h. The reaction was filtered through a pad of Celite, the pad was washed with DCM, and the filtrate was concentrated under reduced pressure to dryness. The residue was treated with toluene (100 mL), the mixture was stirred for 20 min at room temperature, and the solid was filtered off, washed with toluene (3×100 mL), and dried to deliver the product (4.29 g, yield=48%) as an orange solid. LC/MS (6 min): RT=1.48 min, found [M+H]$^+$ 269.65; $^1$H NMR (300 MHz, Methanol-d4) δ 8.61 (d, J=4.9 Hz, 2H), 7.20 (t, J=4.9 Hz, 1H), 5.61 (d, J=9.8 Hz, 1H), 3.87-3.75 (m, 1H), 3.66 (t, J=9.8 Hz, 1H), 3.15 (d, J=13.3 Hz, 1H), 2.61 (s, 6H), 2.00 (d, J=10.5 Hz, 1H), 1.51 (q, J=12.4 Hz, 2H), 1.25 (d, J=6.2 Hz, 3H).

Step 3: A suspension of anhydrous sodium acetate (1 eq., 0.82 g) in acetic anhydride (12 vol., 32 mL) was refluxed for 5 min. To this suspension was added 4-(dimethylamino)-6-methyl-2-(pyrimidin-2-ylsulfanyl)oxan-3-ol (1 eq., 2.69 g) and the reaction was kept under reflux for 1 h. The hot solution was poured on ice water (100 mL), basified with solid NaHCO$_3$, and the product was extracted with DCM (3×100 mL). The organic layers were combined, dried over MgSO$_4$, filtered, and concentrated under reduced pressure to dryness. The residue was purified by silica gel column chromatography (DCM: MeOH, 0-10% MeOH) to give the product (1.21 g, yield=39%) as a yellow solid. LC/MS (6 min): RT=1.84 min, found [M+H]$^+$ 312.00; $^1$H NMR (300 MHz, DMSO-d6) δ 8.66 (dd, J=8.1, 4.9 Hz, 2H), 7.27 (dt, J=6.3, 4.9 Hz, 1H), 6.55 (d, J=5.1 Hz, 0.35H), 5.62 (d, J=10.1 Hz, 0.65H), 5.06 (dd, J=11.2, 5.2 Hz, 0.35H), 4.83 (t, J=10.1 Hz, 0.65H), 4.00 (d, J=4.0 Hz, 0.35H), 3.77-3.65 (m, 0.65H), 3.01-2.84 (m, 1H), 2.20 (d, J=5.5 Hz, 6H), 1.92 (d, J=10.8 Hz, 3H), 1.82 (dd, J=13.5, 4.1 Hz, 1H), 1.36 (q, J=12.3 Hz, 1H), 1.13 (dd, J=6.1, 4.7 Hz, 3H).

Step 4: A suspension of silver trifluoromethanesulfonate (3 eq., 2.60 g) and molecular sieves (4A, 0.16 g) in dry DCM was cooled to at 0° C. in darkness (wrapping with aluminum foil). A solution of 4-(dimethylamino)-6-methyl-2-(pyrimidin-2-ylsulfanyl)oxan-3-yl acetate (1 eq., 1.05 g) and BB1 (2 eq., 1.18 g) in dry DCM was next added (total DCM: 40 vol., 42 mL). The reaction mixture was stirred for 2h at 0° C., and then was allowed to stir at room temperature overnight. The reaction was quenched with saturated NaHCO$_3$ solution (50 mL) till pH 8, the mixture was filtered through a pad of Celite, and the phases were separated. The aqueous layer was extracted with DCM (3×50 mL). The organic layers were combined, dried over MgSO$_4$, filtered, and concentrated under reduced pressure to dryness. The residue was purified by silica gel column chromatography (DCM: MeOH, 0-5% MeOH) to give the product as a yellow solid (498 mg, yield=33%). LC/MS (6 min): No UV absorbance detected (lack of chromophore), the mass detected on the positive ionization, RT=1.74 min, found [M+H]+ 333.10; ¹H NMR (300 MHz, DMSO-d6) δ 4.24 (d, J=7.2 Hz, 1H), 3.90-3.79 (m, 1H), 3.69-3.50 (m, 10H), 3.40 (dd, J=5.6, 4.1 Hz, 2H), 3.16 (d, J=5.2 Hz, 2H), 2.58 (s, 6H), 1.86 (d, J=13.0 Hz, 1H), 1.36 (q, J=11.8 Hz, 1H), 1.19 (d, J=6.1 Hz, 3H).

Step 5: To a solution of 2-{2-[2-(2-azidoethoxy)ethoxy]ethoxy}-4-(dimethylamino)-6-methyloxan-3-ol (1 eq., 0.170 g) in THF/DMF (6 mL/1 mL) were added BB3 (1.1 eq., 0.112 g), L-ascorbic acid (1.1 eq., 0.109 g), and copper (I) acetate (0.25 eq., 0.016 g). The reaction mixture was stirred at 60° C. for 1 h. Then, the solvents were evaporated under reduced pressure, and the residue was purified by reversed phase column chromatography (Column FP-ID-C18, H₂O:ACN, starting from H₂O 100% to ACN 100%) to give the product (53 mg, yield=19.5%) as a white solid foam. LC/MS (6 min): RT=1.89 and 2.08 min (two peaks), found [M+H]+ 532.40; LC/MS (12 min): RT=3.15 min, found [M+H]+ 532.4; HPLC-2 purity: 89.52% (200 nm), 93.02% (283 nm); ¹H NMR (300 MHz, Acetonitrile-d3) δ 8.31 (s, 1H), 7.99 (s, 4H), 4.63-4.58 (m, 2H), 4.23 (d, J=7.1 Hz, 1H), 3.93 (t, J=5.0 Hz, 2H), 3.89-3.83 (m, 1H), 3.71 (t, J=5.5 Hz, 2H), 3.58 (ddt, J=11.8, 6.1, 2.9 Hz, 8H), 3.41-3.34 (m, 1H), 3.32-3.23 (m, 1H), 3.09 (t, J=5.5 Hz, 2H), 2.77 (s, 6H), 1.46 (q, J=12.0 Hz, 2H), 1.23 (d, J=6.2 Hz, 3H).

Compound (5): 1-(4-(1-(2-(2-(2-hydroxyethoxy)ethoxy)ethyl)-1H-1,2,3-triazol-4-yl)benzoyl)azetidin-2-one

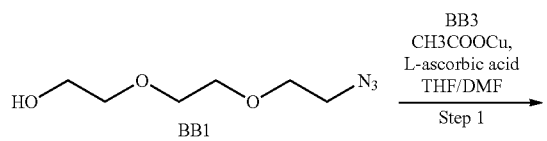

BB1

BB3
CH3COOCu,
L-ascorbic acid
THF/DMF
Step 1

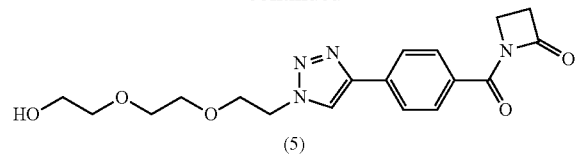

(5)

Step 1: To a solution of BB1 (1 eq., 0.125 g) in THF/DMF (4.4 ml/0.6 ml) were added BB3 (1.1 eq., 0.156 g), L-ascorbic acid (1.1 eq., 0.152 g), and copper (I) acetate (0.25 eq., 0.022 g). The reaction mixture was stirred at 60° C. for 2h. Then, the solvents were evaporated under reduced pressure, and the residue was purified by reversed phase column chromatography (Column PF-RP-HP-F0040, H2O:ACN, starting from ACN 5% to 100%) to give the product (141 mg, Y: 53%) as a white solid foam. LC/MS (6 min): RT=2.25, found [M+H]+ 374.75; LC/MS (12 min): RT=3.33 min, found [M+H]+ 375.2; HPLC-3 purity: 97.93% (205 nm), 98.91% (283 nm); ¹H NMR (300 MHz, Acetonitrile-d3) δ 8.31 (s, 1H), 7.99 (s, 4H), 4.59 (dd, J=5.6, 4.6 Hz, 2H), 3.92 (dd, J=5.6, 4.6 Hz, 2H), 3.71 (t, J=5.5 Hz, 2H), 3.64-3.53 (m, 6H), 3.50-3.44 (m, 2H), 3.09 (t, J=5.5 Hz, 2H), 2.63 (s, 1H).

Compound (6): N-[4,5-dihydroxy-6-(hydroxymethyl)-2-{2-[2-(2-{4-[4-(2-oxoazetidine-1-carbonyl)phenyl]-1H-1,2,3-triazol-1-yl}ethoxy)ethoxy]ethoxy}oxan-3-yl]acetamide

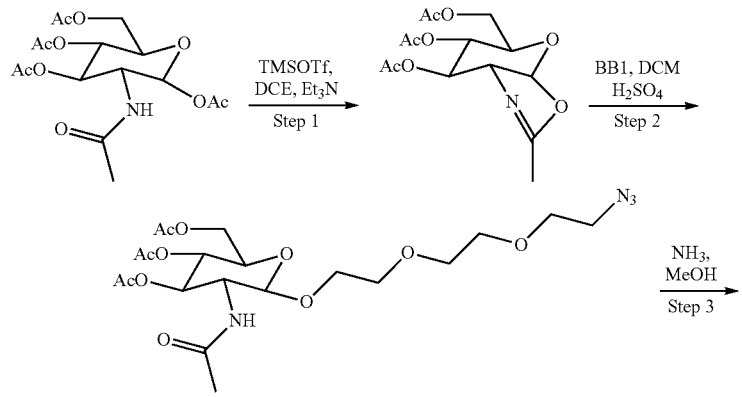

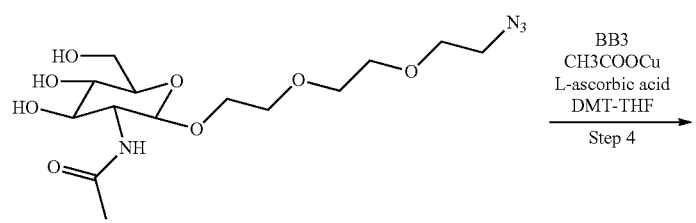

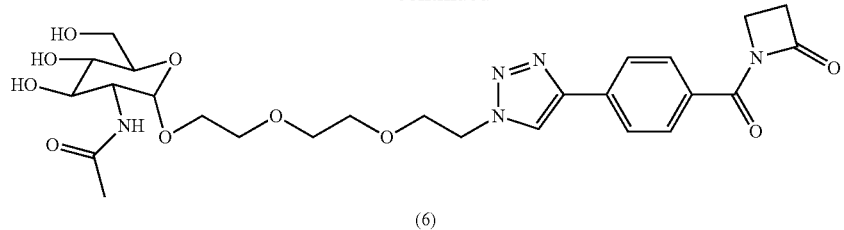

(6)

Step 1: β-D-Glucosamine pentaacetate (10 g, 1.0 eq.) was dissolved in DCE (75 vol, 750 mL) at room temperature. TMSOTf (4.6 mL, 1.0 eq.) was added, the mixture was stirred at 50° C. for 30 min, cooled down and treated with triethylamine (2.7eq., 9.7 mL). The resulting solution was stirred at room temperature for 15 min, then filtered through a short plug of silica gel, and washed with ethyl acetate. The crude material was purified by silica gel column chromatography using DCM/MeOH as an eluent (100:0->90:10) to deliver 5 g of product as a colorless oil (Yield: 59%). $^1$H NMR (300 MHz, Chloroform-d) δ 5.94 (d, J=7.4 Hz, 1H), 5.22 (t, J=2.5 Hz, 1H), 4.89 (ddd, J=9.2, 2.1, 1.3 Hz, 1H), 4.20-4.08 (m, 3H), 3.57 (dt, J=8.9, 4.3 Hz, 1H), 2.08 (s, 3H), 2.07-2.02 (m, 9H).

Step 2: To a suspension of [6,7-bis(acetyloxy)-2-methyl-3aH,5H,6H,7H,7aH-pyrano[3,2-d][1,3]oxazol-5-yl]methyl acetate (4.0 g, 1.0 eq.) and molecular sieves 4A (to keep the reaction mixture anhydrous) in dry DCM under argon atmosphere was added BB1 (6.4 g, 1.5 eq.) at room temperature. The reaction mixture was stirred for 30 min, then H$_2$SO$_4$ (4 drops, 1.0 eq.) was added dropwise and the solution was stirred at room temperature overnight. The reaction was quenched with saturated NaHCO$_3$ solution, DCM (50 mL) was added, the phases were separated, and the organic phase was washed with water (100 mL), brine (100 mL), and dried over MgSO$_4$. The solution was filtered, the filtrate was concentrated under reduced pressure, and the residue was purified by silica gel column chromatography using Hex/EtOAc as an eluent (1:1) to deliver 3 g of the product as a yellow solid (yield: 62%). LC/MS (6 min) RT=2.55 min, found [M+H]+ 505.15; $^1$H NMR (300 MHz, DMSO-d6) δ 7.91 (d, J=9.1 Hz, 1H), 5.08 (dd, J=10.5, 9.4 Hz, 1H), 4.82 (t, J=9.7 Hz, 1H), 4.65 (d, J=8.5 Hz, 1H), 4.18 (dd, J=12.3, 4.8 Hz, 1H), 4.09-3.98 (m, 1H), 3.88-3.62 (m, 3H), 3.53 (dt, J=4.3, 2.2 Hz, 8H), 3.39 (dd, J=5.6, 4.2 Hz, 2H), 2.02 (s, 3H), 1.97 (s, 3H), 1.91 (s, 3H), 1.76 (s, 3H).

Step 3: [3,4-Bis(acetyloxy)-6-{2-[2-(2-azidoethoxy)ethoxy]ethoxy}-5-acetamidooxan-2-yl]methyl acetate (2.5 g, 1.0 eq.) was dissolved in 7N NH$_3$ in MeOH (33 mL, 15 vol.) and stirred at room temperature overnight. The solvent was removed under reduced pressure to dryness, and the crude product was used for the next step without further purification (1.6 g, yield: 95%). $^1$H NMR (300 MHz, DMSO-d6) δ 7.65 (d, J=8.8 Hz, 1H), 4.31 (d, J=8.3 Hz, 1H), 3.85-3.75 (m, 1H), 3.67 (d, J=11.6 Hz, 1H), 3.59 (dd, J=5.7, 4.3 Hz, 2H), 3.56-3.45 (m, 8H), 3.44-3.35 (m, 4H), 3.09-3.03 (m, 2H), 1.75 (s, 3H).

Step 4: To a solution of N-(2-{2-[2-(2-azidoethoxy)ethoxy]ethoxy}-4,5-dihydroxy-6-(hydroxymethyl)oxan-3-yl)acetamide (0.592 g, 1.0 eq.) in MeOH (2 mL)/THF (6 mL) were added BB3 (0.343 g, 1.0 eq.), L-ascorbic acid (0.333 g, 1.1 g), and copper (I) acetate (0.024 g, 0.25 eq). The reaction mixture was stirred at 60° C. for 3 h. Then, the solvents were evaporated under reduced pressure and the residue was purified by reversed phase column chromatography (Column PF-15-C18-F0080, H2O:ACN, starting from H$_2$O 100% to ACN 100%) to give 450 mg of the product as a white solid foam (yield: 44%). LC/MS (6 min) RT=2.04 min, found [M+H]$^+$ 578.30; RT=2.04 min, found [M+H]$^+$ 578.30; HPLC-1 purity: 98.76% (200 nm), 98.71% (284 nm). RT=6.37 min, found [M+H]$^+$ 578.2; $^1$H NMR (300 MHz, DMSO-d6) δ 8.69 (s, 1H), 7.97 (d, J=2.7 Hz, 4H), 7.65 (d, J=8.9 Hz, 1H), 4.98 (d, J=4.7 Hz, 1H), 4.90 (d, J=5.2 Hz, 1H), 4.60 (t, J=5.1 Hz, 2H), 4.53 (s, 1H), 4.30 (d, J=8.3 Hz, 1H), 3.88 (t, J=5.2 Hz, 2H), 3.77 (dt, J=9.6, 3.6 Hz, 1H), 3.67 (q, J=5.5 Hz, 3H), 3.56-3.40 (m, 9H), 3.27 (ddd, J=10.1, 8.1, 5.3 Hz, 1H), 3.12 (t, J=5.4 Hz, 2H), 3.06 (q, J=4.8, 3.5 Hz, 2H), 1.77 (s, 3H).

Compound (7): sodium (3,4,5-trihydroxy-6-{2-[2-(2-{4-[4-(2-oxoazetidine-1-carbonyl)phenyl]-1H-1,2,3-triazol-1-yl}ethoxy)ethoxy]ethoxy}oxan-2-yl)methyl sulfate

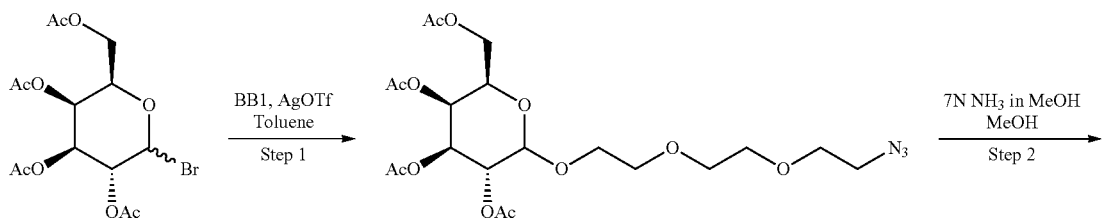

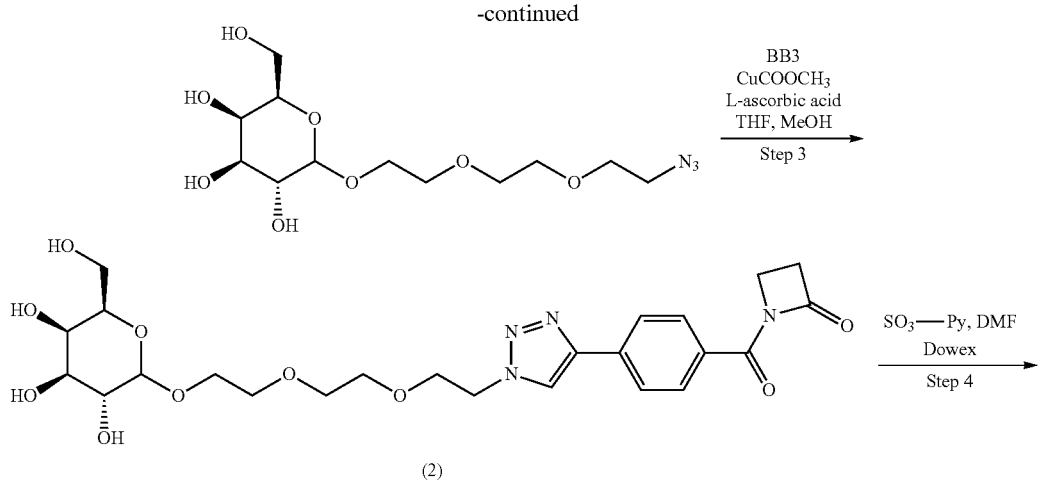

(2)

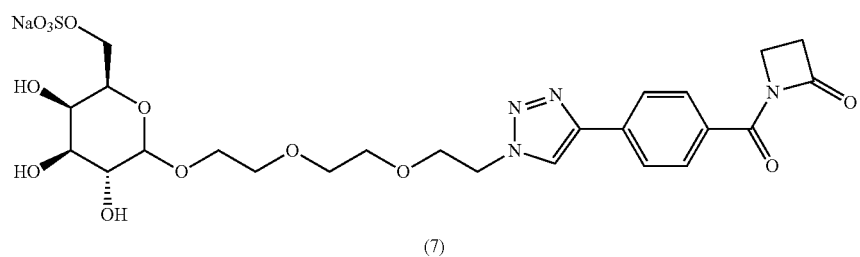

(7)

Step 1 & 2: as described for compound (2)

Step 3: To a solution of 2-{2-[2-(2-azidoethoxy)ethoxy]ethoxy}-6-(hydroxymethyl)oxane-3,4,5-triol (1 eq., 0.309 g) in THF/MeOH (3 mL/1 mL) were added BB3 (1.1 eq., 0.182 g), copper (I) acetate (0.05 eq., 0.006 g), and L-ascorbic acid (1.1 eq., 0.161 g). The reaction mixture was stirred at 60° C. for 1h. Then, the solvents were removed under reduced pressure, and the residue was purified by reversed phase flash column chromatography (Column FP-ID-C18, $H_2O$:ACN, starting from $H_2O$ 100% to ACN 100%) to deliver 283 mg (Y: 57.5%) of the product as a white solid foam. LC/MS (6 min) RT=1.99 min, found [M+H]+ 537.35.

Step 4: To a solution of 1-[4-(1-{2-[2-(2-{[3,4,5-trihydroxy-6-(hydroxymethyl)oxan-2-yl]oxy}ethoxy)-ethoxy]ethyl}-1H-1,2,3-triazol-4-yl)benzoyl]azetidin-2-one (1 eq., 0.283 g) in dry DMF was added SO3Py (0.097 g). The reaction mixture was stirred at room temperature overnight. Then, the solvent was removed under reduced pressure, and the residue was purified by prep-HPLC (Gemini-NX 5 μm C18, H2O:ACN:TFA, starting from $H_2O$ 85% to ACN 95%). The appropriate fractions were combined, neutralized by TEA, evaporated under reduced pressure, dissolved in water, and passed through Dowex 50WX4 Na+-form to deliver 50 mg (Y: 14%) of the product as a white solid foam; LC/MS (6 min) RT=1.94 min, found [M−Na]− 615.30; LC/MS (12 min) RT=2.803 min, found [M−Na]− 615.3; HPLC purity: 93.54% (200 nm), 94.56% (283 nm); 1H NMR (300 MHz, DMSO-d6) δ 8.72 (s, 1H), 8.04-7.90 (m, 4H), 4.83 (d, J=4.3 Hz, 1H), 4.69 (d, J=5.0 Hz, 1H), 4.60 (t, J=5.2 Hz, 2H), 4.52 (d, J=4.8 Hz, 1H), 4.08 (d, J=7.1 Hz, 1H), 3.89 (t, J=5.2 Hz, 2H), 3.85-3.73 (m, 3H), 3.68 (t, J=5.4 Hz, 2H), 3.62-3.46 (m, 9H), 3.25 (d, J=4.1 Hz, 2H), 3.12 (t, J=5.4 Hz, 2H).

Compound (8): [(5-acetamido-3,4-dihydroxy-6-{2-[2-(2-{4-[4-(2-oxoazetidine-1-carbonyl)phenyl]-1H-1,2,3-triazol-1-yl}ethoxy)ethoxy]ethoxy}oxan-2-yl)methoxy]sulfonic acid

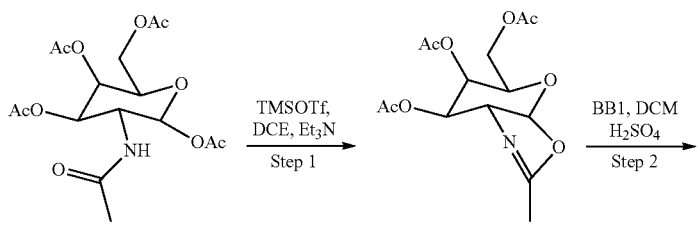

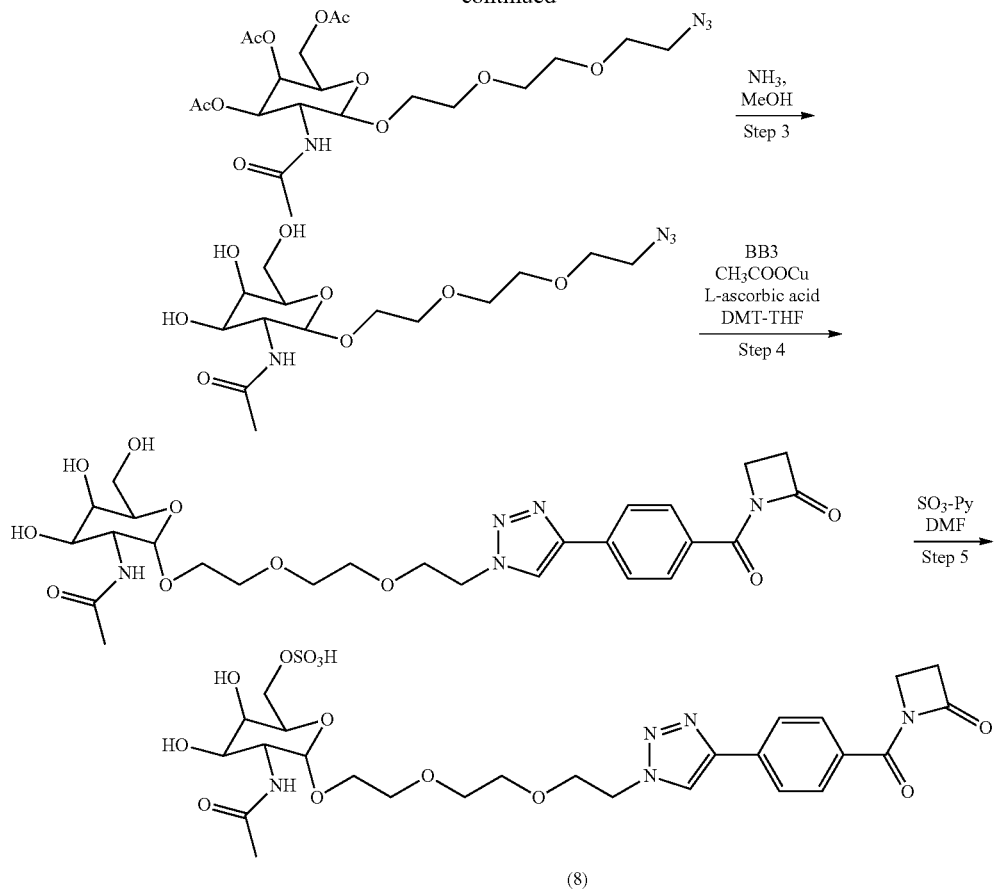

Step 1: [3,4,6-Tris(acetyloxy)-5-acetamidooxan-2-yl]methyl acetate (1 eq., 10 g) was dissolved in DCE (75 vol., 750 mL) at room temperature. Then, TMSOTf (1 eq., 4.6 mL) was added, the mixture was stirred at 50° C. for 30 min, cooled down, and treated with triethylamine (2.7 eq., 9.7 mL). The resulting solution was stirred at room temperature for 15 min, then filtered through a short plug of silica gel, and washed with ethyl acetate. The crude material was purified by silica gel column chromatography using DCM/MeOH as an eluent (100:0->90:10) to deliver 2.6 g of the product as a colorless oil (yield 31%). 1H NMR (300 MHz, Chloroform-d) δ 5.99 (d, J=6.8 Hz, 1H), 5.46 (t, J=2.9 Hz, 1H), 4.90 (dd, J=7.5, 3.3 Hz, 1H), 4.28-4.15 (m, 2H), 4.10 (dd, J=10.7, 5.6 Hz, 1H), 4.03-3.96 (m, 1H), 2.12 (s, 3H), 2.06 (dd, J=5.5, 1.1 Hz, 9H).

Step 2: To a suspension of [6,7-bis(acetyloxy)-2-methyl-3aH,5H,6H,7H,7aH-pyrano[3,2-d][1,3]oxazol-5-yl]methyl acetate (1 eq., 2.6 g) and molecular sieves 4A (to keep the reaction mixture anhydrous) in dry DCM under argon atmosphere was added BB1 (1.5 eq., 2.1 g) at room temperature. The reaction mixture was stirred for 30 min, then H$_2$SO$_4$ was added dropwise and the solution was stirred at room temperature overnight. The reaction was quenched with saturated NaHCO$_3$ solution, DCM (50 mL) was added, the phases were separated, and the organic phase was washed with water (50 mL), brine (50 mL), and dried over MgSO$_4$. The solution was filtered, the filtrate was concentrated under reduced pressure, and the residue was purified by silica gel column chromatography using DCM/MeOH as an eluent (100:0->95:5) to deliver 2.2 g of the product as a yellow solid (yield 55%). LC/MS (6 min) The mass detected on the positive ionization, RT=2.5 min, found [M+H]$^+$ 505.25; 1H NMR (300 MHz, DMSO-d6) δ 7.79 (d, J=9.2 Hz, 1H), 5.21 (d, J=3.4 Hz, 1H), 4.97 (dd, J=11.2, 3.5 Hz, 1H), 4.55 (d, J=8.5 Hz, 1H), 4.03 (s, 3H), 3.94-3.74 (m, 2H), 3.63-3.50 (m, 8H), 3.40 (dd, J=5.6, 4.2 Hz, 2H), 2.10 (s, 3H), 2.00 (s, 3H), 1.89 (s, 3H), 1.77 (s, 3H).

Step 3: [3,4-Bis(acetyloxy)-6-{2-[2-(2-azidoethoxy)ethoxy]ethoxy}-5-acetamidooxan-2-yl]methyl acetate (1 eq., 2.2 g) was dissolved in 7N NH$_3$ in MeOH (15 vol., 33 ml) and stirred at room temperature overnight. The solvent was removed under reduced pressure to dryness, and 1.62 g of the crude product was used for the next step without further purification (yield: 98%). LC/MS 6 min) The mass detected on the positive ionization, RT=1.54 min, found [M+H]$^+$ 378.70, [M−H]− 376.50. 1H NMR (300 MHz, DMSO-d6) δ 7.60 (d, J=8.9 Hz, 1H), 4.60-4.53 (m, 2H), 4.48 (d, J=4.3 Hz, 1H), 4.28 (d, J=8.4 Hz, 1H), 3.83-3.67 (m, 2H), 3.65-3.55 (m, 4H), 3.51-3.36 (m, 6H), 3.31 (d, J=10.0 Hz, 3H), 1.80 (s, 3H).

Step 4: To a solution of N-(2-{2-[2-(2-azidoethoxy)ethoxy]ethoxy}-4,5-dihydroxy-6-(hydroxymethyl)oxan-3-yl)acetamide (1 eq., 0.300 g) in THF (35 vol., 0.5 mL)/DMF (5 vol., 1.5 mL) were added BB3 (1 Eq., 0.174 g), L-ascorbic acid (1.1 Eq., 0.169 g), and copper (I) acetate (0.25 Eq., 0.024 g). The reaction mixture was stirred at 60° C. for 2h. Then, the solvents were evaporated under reduced pressure, and the residue was purified by reversed phase column chromatography (Column FP-ID-C18, H$_2$O:ACN, starting from H$_2$O 100% to ACN 100%) to give 342 mg of the product as a white solid foam (yield: 74%). LC/MS (6 min) RT=2.0 min, found [M+H]$^+$ 578.35. 1H NMR (300 MHz, DMSO-d6) δ 8.71 (s, 1H), 8.03-7.88 (m, 4H), 7.61 (d, J=9.0 Hz, 1H), 4.60 (dd, J=5.9, 3.8 Hz, 4H), 4.51 (d, J=4.3 Hz, 1H), 4.25 (d, J=8.4 Hz, 1H), 3.88 (t, J=5.2 Hz, 2H), 3.80-3.61 (m, 5H), 3.57-3.37 (m, 10H), 3.28 (t, J=6.2 Hz, 1H), 3.12 (t, J=5.4 Hz, 2H), 1.76 (s, 3H).

Step 5: To a solution of N-[4,5-dihydroxy-6-(hydroxymethyl)-2-{2-[2-(2-{4-[4-(2-oxoazetidine-1-carbonyl)phenyl]-1H-1,2,3-triazol-1yl}ethoxy)ethoxy]ethoxy} oxan-3-yl]acetamide (1 eq., 0.340 g) in dry DMF was added SO3Py (1.15 Eq, 0.108 g) at room temperature. The reaction mixture was stirred at room temperature overnight, the solvents were removed under reduced pressure, and the residue was purified by prep-HPLC (PF-RP-AQ-F0120, H$_2$O:ACN, starting from H$_2$O 95% to ACN 100%). The appropriate fractions were combined, evaporated under reduced pressure, dissolved in water, and passed through Dowex 50WX4 Na+-form to deliver 23 mg of the product as a white solid foam (Yield 6%). LC/MS (6 min) RT=1.88, found [M+H]$^+$ 657.50, [M−H]− 655.45. LC/MS (12 min) RT=2.85 min, found [M−H]− 656.5. HPLC purity-1: 96.91% (200 nm), 97.46% (283 nm). 1H NMR (300 MHz, DMSO-d6) δ 8.72 (d, J=1.4 Hz, 1H), 8.06-7.87 (m, 4H), 7.59 (d, J=9.0 Hz, 1H), 4.69-4.46 (m, 4H), 4.25 (d, J=8.5 Hz, 1H), 3.94-3.65 (m, 8H), 3.64-3.40 (m, 10H), 3.12 (t, J=5.6 Hz, 2H), 1.76 (d, J=1.3 Hz, 3H).

Compound (9): Sodium 3,4,5-trihydroxy-6-{2-[2-(2-{4-[4-(2-oxoazetidine-1-carbonyl)phenyl]-1H-1,2,3-triazol-1-yl}ethoxy)ethoxy]ethoxy} oxane-2-carboxylate The resulting suspension was filtered through a pad of Celite, the filtrate was concentrated under reduced pressure and the residue was purified by silica gel column chromatography using hexane/EtOAc (1/1) as eluent to deliver 2.0 g of the product as a yellow oil (yield 40.4%). 1H NMR (300 MHz, DMSO-d6) δ 5.34 (t, J=9.6 Hz, 1H), 5.01-4.86 (m, 2H), 4.79 (dd, J=9.6, 8.0 Hz, 1H), 4.44 (d, J=9.9 Hz, 1H), 3.86-3.74 (m, 1H), 3.64-3.48 (m, 12H), 3.39 (dd, J=5.6, 4.2 Hz, 2H), 2.00-1.95 (m, 9H).

Step 2: To a solution of 3,4,5-Tris(acetyloxy)-6-{2-[2-(2-azidoethoxy) ethoxy]ethoxy}oxan-2-yl]methyl acetate (1 eq., 1.0 g) in MeOH (15 ml) was added about 2M NaOH solution (10 mL). The reaction mixture was stirred at room temperature overnight. The solvents were removed under reduced pressure to dryness, the residue was dissolved in H2O and acidified with 1N HCl solution to pH=4. Water was removed under reduced pressure, and the crude product was used for the next step without further purification (calculated on the azide: 700 mg, yield quantitative).

Step 3: To a solution of 6-{2-[2-(2-Azidoethoxy)ethoxy]ethoxy}-3,4,5 trihydroxyoxane-2-carboxylic acid (1 eq., 0.921 g) in THF (9 mL)/MeOH (3 mL) were added BB3, copper (I) acetate (0.8 eq., 0.262 g), and L-ascorbic acid (1.7 eq., 0.804 g). The reaction mixture was stirred at 60° C. for overnight. The solvents were removed under reduced pressure, and the residue was purified by prep-HPLC (Gemini-NX 5 μm C18, H2O:ACN:TFA, starting from ACN 15% to ACN 95%). The appropriate fractions were combined, neutralized with TEA, evaporated under reduced pressure, dissolved in water, and passed through Dowex 50WX4 Na+-form to deliver 45 mg of the product as a white solid foam

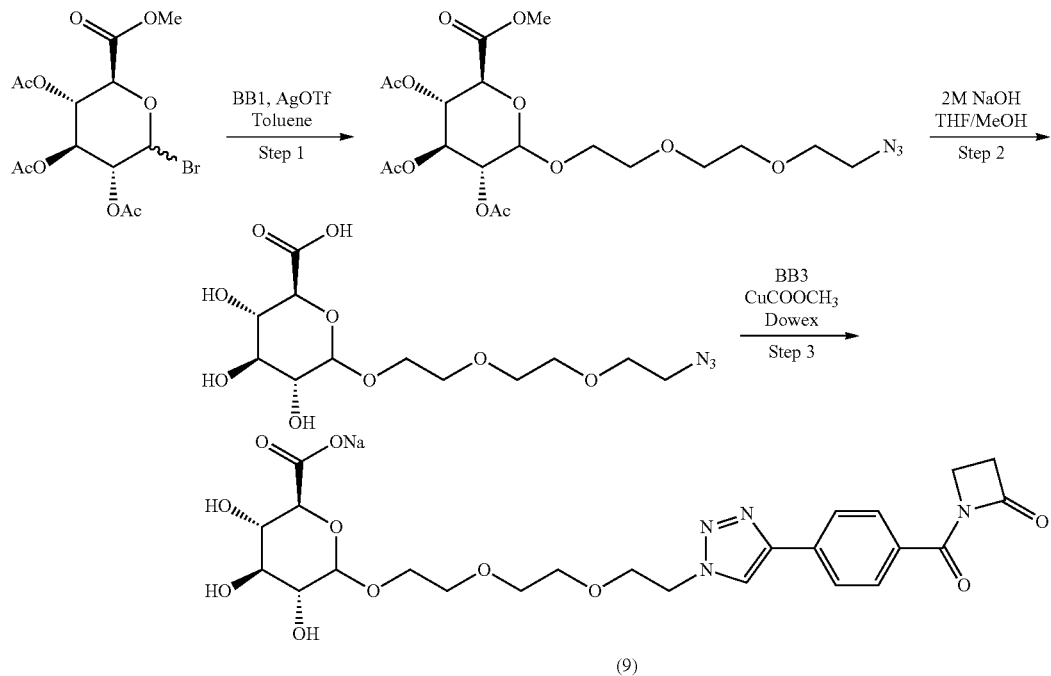

(9)

Step 1: To a suspension of methyl 3,4,5-tris(acetyloxy)-6-bromooxane-2-carboxylate (1 eq., 4.0 g) and molecular sieves 4A (to keep the reaction mixture anhydrous) in dry DCM under argon atmosphere was added BB1 (1.5 eq., 2.65 g) and AgOTf (1.4 Eq, 3.62 g) at room temperature. The reaction mixture was stirred at room temperature overnight.

(yield 3.1%). LC/MS (6 min) RT=1.78 min, found [M+H]$^+$ 551.30 (a free acid). LC/MS (12 min) RT=3.123 min, found [M+H]$^+$ 551.4 (a free acid). HPLC purity: 96.51% (200 nm), 97.32% (283 nm). 1H NMR (300 MHz, DMSO-d6) δ 8.73 (s, 1H), 8.04-7.88 (m, 4H), 4.98-4.87 (m, 2H), 4.61 (t, J=5.2 Hz, 2H), 4.14 (d, J=7.7 Hz, 1H), 3.85 (dt, J=25.8, 5.2 Hz, 4H), 3.68 (t, J=5.5 Hz, 2H), 3.54 (dt, J=9.1, 5.3 Hz, 9H), 3.13 (t, J=5.7 Hz, 3H), 2.95 (s, 1H).

II. Synthesis of AAVs

AAVs were generated by coupling the lactam linkers of the invention to at least one AAV surface-exposed primary amine, as schematically represented on FIG. 1.

II.1. Production and Purification of AAVs

Production and Purification

AAVs were produced and purified according to well-known techniques in the art.

Quality Control

Quality of the AAV2, AAV5, AAV8, and AAV9 batches was assessed by titration (qPCR using the LightCycler 480 from Roche, ddPCR using the QX200 from Bio-Rad, and ELISA).

A purity check was performed on a 10% SDS PAGE gel using silver staining: only VP1, VP2 and VP3 proteins in the correct stoichiometry of 1:1:10 were detectable, indicating a purity of the AAV preparation of over 95%.

Integrity of the packaged vector genome was also assessed on a 0.8% agarose gel stained with gel red: only a single sharp band about 3.2 kb was found, which corresponds to the size of the packaged vector genome, hence demonstrating its integrity in the AAV particles.

Endotoxin levels in the final products were determined using the Endosafe®-nexgen-PTS™ spectrometer (Charles River Laboratories). All samples passed the test with a detection threshold of 0.5 EU/mL.

Finally, functional tests were carried out in U87-MG cells, transduced with the AAV vectors (AAV2-eGFP; AAV5-eGFP; AAV8-eGFP; AAV9-eGFP) with MOI 1 000, 10 000 and 100 000. Total gDNA was isolated from each well and Cp values as direct measure of the vector copies (vg)/cell were determined by qPCR using eGFP-specific PCR primers.

II.2. Coupling of Compounds Comprising β-Lactam to AAVs

Materials

Compounds (1)-(5), (7)-(9) were obtained as detailed above in example 1.3.

The following AAVs, obtained as detailed in example II.1, were used:

AAV2-eGFP: $1.0 \times 10^{13}$ vg/mL in DPBS+$Ca^{2+}$, $Mg^{2+}$, 0.001% Pluronic F68 at pH 7.4;

AAV5-eGFP: $1.0 \times 10^{13}$ vg/mL in DPBS+$Ca^{2+}$, $Mg^{2+}$, 0.001% Pluronic F68 at pH 7.4;

AAV8-eGFP: $1.0 \times 10^{13}$ vg/mL in DPBS+$Ca^{2+}$, $Mg^{2+}$, 0.001% Pluronic F68 at pH 7.4;

AAV9-eGFP: $1.0 \times 10^{13}$ vg/mL in DPBS+$Ca^{2+}$, $Mg^{2+}$, at pH 7.4.

TABLE 7

Other material and reagents:

| Description | Specification |
|---|---|
| TBS, pH 9.3 | 50 mM Tris, 150 mM NaCl, pH: 9.3 |
| Formulation buffer | DPBS + $Ca^{2+}$, $Mg^{2+}$, 0.001% Pluronic F68 |
| Concanavalin A-HRP | SIGMA (L6397) |
| Biotin-RCA1 | Vector Lab (ZG1009) |
| Biotin-UEA1 | Vector Lab (ZG0901) |

Methods

The coupling of the lactam linkers on AAVs capsids was carried out with a 3.0E6 fold molar excess of the linker in a total reaction volume of 1 mL. The final concentration of AAVs was 1.0E12 vg/mL.

The Lactam Compounds were brought to room temperature before being weighed into 1.5 mL reaction tube and dissolved in the suitable volume of buffer TBS, pH 9.3.

The AAVs were thawed at 20° C. 1 h before the coupling reactions are set up.

The coupling reactions were set up in 2.0 ml polypropylene reaction tubes The reaction tubes were gently shaken on an orbital shaker in horizontal position for 4h at 20° C.

Formulation/filtration: removal of free linkers. For each coupling mixture one PD MidiTrap G-25 column is required. The columns are equilibrated 5 times with 4 ml of formulation buffer (DPBS, Ca2+, Mg2+, 0.001% F68). The coupling reactions mixtures are loaded onto the columns and the samples are allowed to enter the bed. Elution of the rAAVs occurs with 1.5 ml formulation buffer. 5 fractions at 0.3 ml are collected dropwise in 1.5 ml PP-tubes. Fractions 2-5 are pooled and qPCR titer is determined for each pooled fraction. Pooled fractions are then sterile filtrated using Acrodisc PP, PES, 0.2 µM 1 $cm^2$. The filtrated fractions were frozen at −80° C. in aliquots of 50 µL.

II.3. Characterization of AAVs

II.3.a. Titration of Vector Genones (vg)

For all coupling reactions quantitative real time PCT (qPCR) titers were determined using a LightCycler 480 (Roche) for samples taken after the formulation/filtration step, see Table 8. The high values of % input in the last column of Table 8 show that very few losses were sustained during the coupling.

TABLE 8 qPCR titers

| | Coupling | VG/ml | Vol (ml) | Total VG | % Input |
|---|---|---|---|---|---|
| 1 | (1) + AAV2 | $8.64 \times 10^{11}$ | 1.2 | $1.04 \times 10^{12}$ | 104% |
| 2 | (2) + AAV2 | $9.47 \times 10^{11}$ | 1.2 | $1.14 \times 10^{12}$ | 114% |
| 3 | (3) + AAV2 | $8.69 \times 10^{12}$ | 1.2 | $1.04 \times 10^{12}$ | 104% |
| 4 | (4) + AAV2 | $8.05 \times 10^{11}$ | 1.2 | $9.66 \times 10^{12}$ | 97% |
| 5 | (1) + AAV8 | $9.34 \times 10^{11}$ | 1.2 | $1.12 \times 10^{12}$ | 112% |
| 6 | (3) + AAV8 | $1.04 \times 10^{11}$ | 1.2 | $1.25 \times 10^{12}$ | 125% |
| 7 | (3) + AAV5 | $6.62 \times 10^{11}$ | 1.2 | $7.95 \times 10^{12}$ | 80% |
| 8 | (5) + AAV2 | $7.23 \times 10^{11}$ | 1.2 | $8.68 \times 10^{11}$ | 87% |
| 9 | (1) + AAV5 | $6.91 \times 10^{11}$ | 1.2 | $8.29 \times 10^{11}$ | 83% |
| 10 | (1) + AAV9 | $8.45 \times 10^{11}$ | 1.2 | $1.014 \times 10^{12}$ | 101% |
| 11 | (7) + AAV2 | $9.25 \times 10^{11}$ | 1.2 | $1.11 \times 10^{12}$ | 111% |
| 12 | (8) + AAV2 | $8.49 \times 10^{11}$ | 1.2 | $1.02 \times 10^{12}$ | 102% |
| 13 | (9) + AAV2 | $7.91 \times 10^{11}$ | 1.2 | $9.50 \times 10^{11}$ | 95% |

II.3.b. Analysis of coupling by SDS-PAGE and Lectin WB

Purpose

The purity and integrity of the obtained AAV vectors was evaluated by silver staining of SDS-PAGE gels. The efficacy of the coupling of the saccharide moieties on the AAVs was further studied by western blot analysis using various lectin stainings which bind selectively to the respective coupled saccharides.

Method

VP proteins corresponding to $1.0 \times 10^{10}$ vg of rAAV after coupling were compared to VP proteins of the original AAV as negative control by SDS-PAGE (10% PAA gel) and subsequent silver staining. Gel was migrated up to MW 32 kDa.

Additional identical gels were used for Western Blotting (WB) and subsequent detection of linkers coupled to VP proteins using lectin staining: Concanavalin-HRP (ConA) or biotinylated lectins RCA1 and UEA1.

The analysis of the couplings by silver stain and WB was performed on frozen samples.

Successful coupling should result in a shift of the VP proteins towards higher molecular mass, and specific lectin staining (when applicable).

Results

Results are presented on FIGS. 2-13 and summarized in Table 9 below.

TABLE 9

| Coupling | | Mobility shift on silver gel | Lectin staining |
|---|---|---|---|
| 1 | (1) + AAV2 | yes | yes (ConA) |
| 2 | (2) + AAV2 | yes | yes (RCA1) |
| 3 | (3) + AAV2 | yes | yes (UEA1) |
| 4 | (4) + AAV2 | yes | ND |
| 5 | (1) + AAV8 | yes | yes (ConA) |
| 6 | (3) + AAV8 | yes | yes (UEA1) |
| 7 | (3) + AAV5 | inconclusive | yes (UEA1) |
| 8 | (5) + AAV2 | yes | ND |
| 9 | (1) + AAV5 | yes | yes (ConA) |
| 10 | (1) + AAV9 | yes | yes (ConA) |
| 11 | (7) + AAV2 | yes | ND |
| 12 | (8) + AAV2 | yes | ND |
| 13 | (9) + AAV2 | yes | ND |

ND: not determined

Conclusion

Mobility shifts and/or specific lectin staining were observed for all modified AAVs, evidencing effective coupling of Lactam compounds on AAVs.

II.3.c. Infectivity Assay (U87-MG Glioblastoma Cells)

In case SDS-PAGE show the expected mobility shift of the VP proteins, it was tested if infectivity of the AAVs can be observed. For this purpose U87-MG cells were transduced at MOIs 10.000 and 100.000. Transduced cells were analyzed 72h after transduction via monitoring of transduced (eGFP-positive) and non-transduced cell population by fluorescence microscopy.

Representative bright field and fluorescence pictures were taken from the transduced cells, showing that U87-MG cells were efficiently transduced by all the AAVs (data not shown).

III. In Vivo Evaluation of AAVs

III.1 Evaluation of the Transduction Properties of Three AAV Vectors in the Mouse Brain The objective of the study was to investigate the transduction properties of three recombinant AAV2 vectors expressing GFP (AAV2, (1)-AAV2, and (7)-AAV2) in the mouse brain following a single, unilateral intrastriatal injection.

Materials

Animals

Eight (8) adult male $C_{57}BL/6$ mice (*Mus musculus*), purchased from Janvier Labs.

Test Items

"AAV2" is a recombinant AAV2 vector comprising an unmodified capsid and carrying a CAG-eGFP expression cassette.

"(1)-AAV2" is a recombinant AAV2 vector comprising a modified capsid with surface-bound mannose linkers and carrying a CAG-eGFP expression cassette.

"(7)-AAV2" is a recombinant AAV2 vector comprising a modified capsid with surface-bound 6-O-sulfated galactose linkers and carrying a CAG-eGFP expression cassette.

Methods

Test Items (1)- and (7)-AAV2 were produced as described in section II above. Briefly, mannose and 6-O-sulfated galactose linkers were covalently attached to the primary amines of lysine residues exposed at the surface of the AAV2 capsid after a 4-hour co-incubation of the linkers with the AAV2 vectors in Tris buffer pH 9.3 at 20° C., and a dialysis of the mix against buffered saline sterile solution (BSSS)+0.001% Pluronic® F68 to remove free molecules that did not bind to the AAV capsid.

Study Design

Eight (8) mice underwent stereotactic surgery and were randomly injected with the test items into the right striatum, according to Table 10 below.

TABLE 10

Treatment schedule.

| Group | n | Test item | Target |
|---|---|---|---|
| G1 | 2 | AAV2 | Right striatum |
| G2 | 3 | (1)-AAV2 | Right striatum |
| G3 | 3 | (7)-AAV2 | Right striatum |

Surgical Procedures

Buprenorphine (0.1 mg/kg; 10 mL/kg, s.c.) was given as an analgesic before and after surgery. The animals were placed individually in an anesthetic chamber supplied with a continuous flow of oxygen (1.5 µL/min) and 3% isoflurane, and upon loss of consciousness, were stabilized in a stereotactic frame (Kopf) with the head fixed into position with ear bars. The skin of the skull was incised to allow for the unilateral injection of one of the test items using a glass pipette, at the coordinates described in Table 11. For an atlas of the mouse brain, see Paxinos & Franklin, 2019. The mouse brain in stereotaxic coordinates (5th ed.). San Diego, CA: Elsevier Science Publishing Co Inc.

TABLE 11

| Target | Injection coordinates. | | | | |
| | AP (mm) | ML (mm) | DV (mm) | Volume/target (µL) | Titer/target (vg/mL) |
|---|---|---|---|---|---|
| Right striatum | +1.0 | 2.1 | −2.6 | 0.5 | $5.5 \times 10^{11}$ |
| | +0.3 | 2.3 | −2.6 | 0.5 | $5.5 \times 10^{11}$ |

AP: anterior-posterior; ML: medial-lateral; DV: dorsal-ventral.

Animals were allowed to recover for 48 days before euthanasia was carried out.

Ex Vivo Analysis

Euthanasia and Tissue Processing

At the end of the in vivo phase, animals were euthanized, and tissue were collected. Euthanasia was performed in accordance with European Veterinary Medical Association guidelines.

At termination, the brain of each animal was quickly removed and fixed in paraformaldehyde (PFA; 4%). After 3 days, the tissues were cryoprotected in 20% sucrose solution (in 0.1 M PBS) at 4° C. overnight, then frozen for sectioning into 50 µm thick coronal sections using a cryostat. Free-floating sections were placed in PBS azide and stored at 4° C.

GFP Immunohistochemistry

Definition of the percentage of transduced brain volume in the regions of interest was made based upon GFP immunohistochemistry. One in every four sections was used for immunohistochemistry.

Tissue sections were taken from the refrigerator and left to adjust to room temperature. After thorough rinsing with PBS, endogenous peroxidase activity and antigenic sites were blocked by a 10-min incubation in peroxidase-blocking solution (Dako, S2023) followed by a 30-min incubation in PBS, 2% BSA, 0.3% Triton X-100 and 0.01% thimerosal, respectively.

Sections were then exposed first to a polyclonal anti-GFP antibody (Ab3080, Merck), diluted 1:1000 in PBS containing 0.2% BSA, 0.3% Triton X-100 and 0.01% thimerosal, and next to the Envision+anti-rabbit HRP-tagged secondary antibody (Dako, K4011) diluted in the same buffer. After thorough rinsing with PBS, HRP was reacted with the DAB+ substrate (Dako) for approximately 30 seconds. The chromogenic reaction was stopped by several washes with PBS.

Sections were then mounted onto slides and counterstained with a Nissl stain. The slides were digitized using a PannoramicScan II (3DHISTECH, Hungary) at a ×20 magnification with an extended mode in which 5-layer focus is automatically acquired and then flatten.

The regions of the right hemisphere corresponding to the striatum and the substantia nigra were digitally drawn using the MERCATOR software (Mercator, Explora Nova, La Rochelle, France) on 10 and 6 sections, respectively.

The total and GFP-positive volumes of these 2 brain structures were determined based on a threshold detection method, using the formula $$V = \Sigma S t d$$

where "$\Sigma S$" is the sum of surface areas; "t" is the average section thickness; and "d" is the number of slices between two consecutives analyzed sections measured.

The percentage of transduced brain volume in each region of interest was then calculated.

Results

Figure 14A:
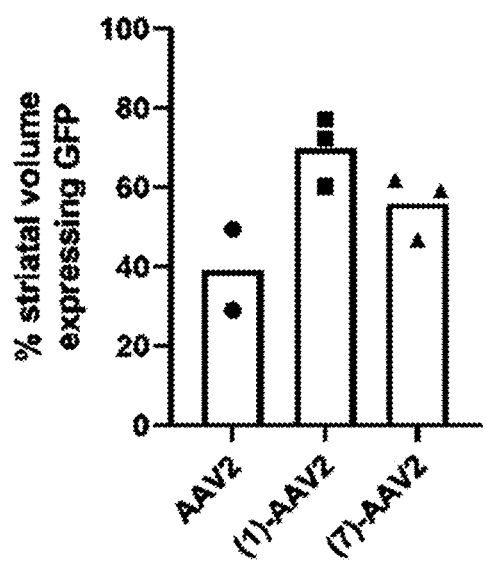
FIG. 14A and FIG. 14B are graphs showing quantitative analyses of the striatal and nigral volumes in the mouse right brain hemisphere that are positive for GFP 48 days after a single, unilateral intrastriatal injection of 5.5E8 vg of either AAV2, (1)-AAV2, or (7)-AAV2 vectors. Bars represent the group mean; circles, triangle, and square dots represent the individual animal values.
Figure 14B:
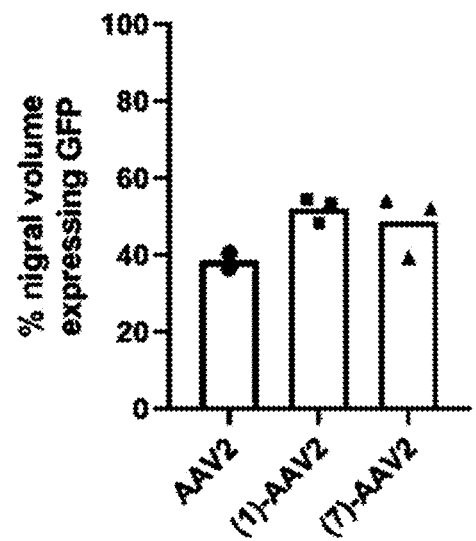

Immunohistochemically-stained brain slices of G1 and G2 groups are shown in FIG. 14. The percentages of right striatum and right substantia nigra volumes with a positive GFP-staining are provided for each vector in Table 12 below and in FIGS. 14A and 14B.

TABLE 12

Mean percentages of GFP-positive striatal and nigral volumes (right hemisphere only) 48 days post intrastriatal injection.

| Brain structure | AAV2 | (1)-AAV2 | (7)-AAV2 |
|---|---|---|---|
| Striatum | 39% | 70% | 56% |
| Substantia nigra | 39% | 52% | 48% |

Conclusions

The objective of the study was to investigate the transduction properties of three recombinant AAV2 vectors expressing GFP (AAV2, (1)-AAV2, and (7)-AAV2) in the mouse brain following a single, unilateral intrastriatal injection in the right hemisphere.

All three AAV vectors drove the expression of GFP and the extent of GFP staining in specific brain structures (volumes) was used as an indicator of the ability of each vector to transduce brain cells.

Both (1)-AAV2 and (7)-AAV2 vectors outperformed the AAV2 vector in the striatum and the substantia nigra of the right hemisphere when delivered in the parenchyma (striatum), covering 70% and 56% of the right striatum and 52% and 48% of the right substantia nigra, respectively, when AAV2 only transduced 39% of the same regions. (1)-AAV2 achieved the largest coverage of both the striatal and nigral structures (striatum: 70% for (1)-AAV2 vs 56% for (7)-AAV2 vs 39% for AAV2; substantia nigra: 52% for (1)-AAV2 vs 48% for (7)-AAV2 vs 39% for AAV2).

Figure 15A:
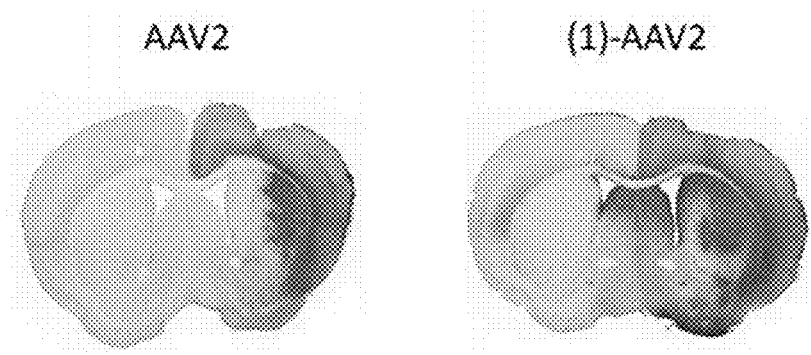
FIG. 15A, FIG. 15B, and FIG. 15C are two immunohistochemistry photographs, showing the GFP staining of mouse brain slices at the striatal, thalamic, and nigral levels, 48 days after a single injection of AAV2 or (1)-AAV2 in the right striatum.
Figure 15B:
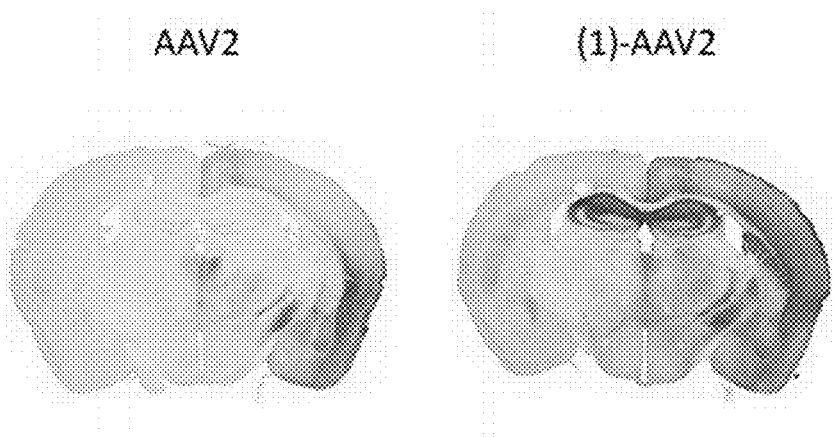
Figure 15C:
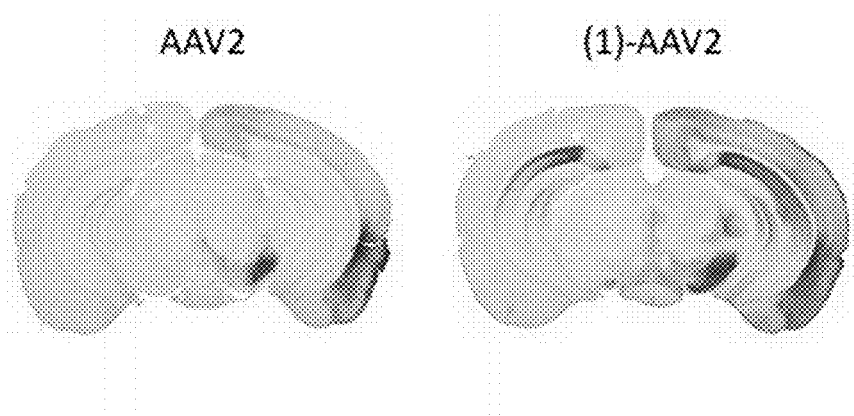

Besides the measurements in striatal and nigral regions, the (1)-AAV2 vector showed the best transduction properties, both in terms of distribution and transgene expression levels, considering the whole brain. After a single administration in the right striatum, many brain structures of both the right and left hemisphere, which were not or poorly transduced by the AAV2 vector, showed a positive signal for (1)-AAV2-driven GFP expression. In particular, large portions of the cortex and the hippocampus were intensely stained (FIG. 15).

IV. In Vitro Evaluation of a Test Candidate: AAV2-GBA1

The objective of the study was to determine the glucocerebrosidase (GCase) activity in HEK293 cells transduced with recombinant AAV2 vectors expressing the GBA1 gene (AAV2.GBA1, (1)-AAV2.GBA1 or Man-NCS-AAV2.GBA1).

GBA1 codes for GCase, a lysosomal enzyme that converts glucosylceramide into glucose and ceramide. Mutations in the GBA1 gene are the most common genetic risk factor for Parkinson's disease and Gaucher disease.

Materials
Test Items

"AAV2.GBA1" (also referred to as "AAV2" in FIG. 16) is a recombinant AAV2 vector comprising an unmodified capsid and carrying a CAG-GBA expression cassette.

Figure 16:
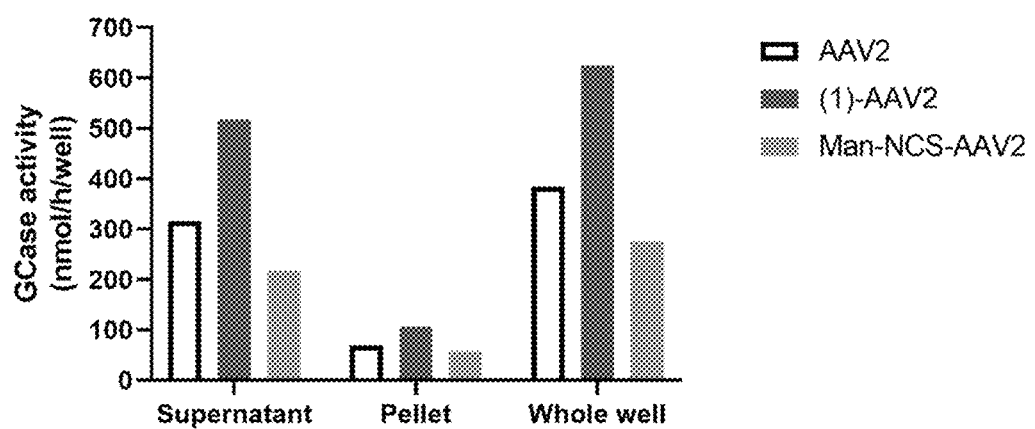
FIG. 16 is a graph showing fluorimetric determination of glucocerebrosidase (GCase) enzymatic activity following transduction of HEK293 cells with either AAV2.GBA1, (1)-AAV2.GBA1, or Man-NCS-AAV2.GBA1.

"(1)-AAV2.GBA1" (also referred to as "(1)-AAV2" in FIG. 16) is a recombinant AAV2 vector comprising a modified capsid with surface-bound mannose beta-lactam linkers (more particularly with the compound (1) as described in Table 1 or 2) and carrying a CAG-GBA expression cassette.

"Man-NCS-AAV2.GBA1" (also referred to as "Man-NCS-AAV2" in FIG. 16) is a recombinant AAV2 vector comprising a modified capsid with mannose isothiocyanate linkers and carrying a CAG-GBA expression cassette.

Methods
Test Items

AAV2.GBA1, (1)-AAV2.GBA1 and Man-NCS-AAV2.GBA1 were produced as described above in section "II. SYNTHESIS OF AAVs" or in WO2017/212019.

Briefly, mannose with either beta-lactam or isothiocyanate linkers were covalently attached to the primary amines of lysine residues exposed at the surface of the AAV2.GBA1 capsids after a 4-hour co-incubation of the linkers with the AAV2.GBA1 vectors in Tris buffer pH 9.3 at 20° C. Coupled vectors (1)-AAV2.GBA1 and Man-NCS-AAV2.GBA1 were formulated in buffered saline sterile solution (BSSS)+ 0.001% Pluronic® F68 using a PD MidiTrap G-25 desalting column to remove free molecules that did not bind to the AAV capsid. AAV2.GBA1 was formulated in D-PBS+$Ca^{2+}$+ $Mg^2$++0.001% Pluronic® F68.

Gcase Activity Assay

HEK293 cells were seeded. On day 2, they were transduced with vectors carrying the GBA1 gene (AAV2.GBA1, (1)-AAV2.GBA1 or Man-NCS-AAV2.GBA1) at a MOI of $10^6$ (one well/condition). 96 hours post-transduction, for each well, supernatant was collected (1 mL) and dry cell pellet were prepared. Both were stored at −80° C. until GCase activity assay was performed.

Dry cell pellets were homogenized in NaCl 0.9% and sonicated. Then, protein concentration was determined using a Pierce BCA Protein Assay in cell pellets and supernatants. 4-methylumbelliferyl (4-MU) served as a calibrator and a dilution range was prepared in stop solution (glycine buffer, pH 10.5). GCase activity was measured in samples using 4-methylumbelliferyl β-D-glucopyranoside substrate in sodium phosphate buffer (pH 5.5) supplemented with sodium taurocholate hydrate at 37° C. for 30 minutes. The reaction was stopped by adding stop solution, and substrate fluorescence was measured (excitation wavelength=355 nm; emission wavelength=460 nm) with a fluorimeter (Mithras LB 940 BERTHOLD Technologies). All samples and calibrators were run in triplicates.

Results

For each well, GCase activity was measured in the supernatant (secreted GCase) and in the cellular pellet (non-secreted GCase). The total GCase activity per condition, being the sum of activities in both the supernatant and the pellet, is also reported. The total GCase activity was 624.3 nmol/h/well vs 384.6 nmol/h/well vs 276.1 nmol/h/well for (1)-AAV2.GBA1, AAV2.GBA1 and Man-NCS-AAV2.GBA1 vectors respectively. In the supernatant, enzymatic activity was 517.4 nmol/h/well vs 315.5 nmol/h/well vs 218.1 nmol/h/well; in the pellet enzymatic activity was 106.9 nmol/h/well vs 69.1 nmol/h/well vs 58.0 nmol/h/well for the three vectors respectively.

Conclusion (1)-AAV2.GBA1 outperformed AAV2.GBA1 and Man-NCS-AAV2.GBA1 vectors with higher GCase activities measured in both the supernatant and the pellet.

These results are promising and demonstrate the unexpected superiority of AAV vectors comprising a lactam-linked moiety.

The invention claimed is:

1. An adeno-associated virus (AAV) vector comprising a moiety according to formula (II):

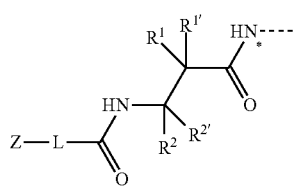

(II)

or a pharmaceutically acceptable salt thereof, wherein

N* is a nitrogen atom of an amino group of an amino acid residue of the AAV vector's capsid;

----- represents the point of attachment to the AAV vector's capsid;

Z is a functional moiety comprising a cell-type specific ligand, a labelling agent, a steric shielding agent, a drug moiety or combinations thereof;

L is a linker;

$R^1$, $R^{1'}$, $R^2$ and $R^{2'}$ are each independently hydrogen, halogen, or an optionally substituted $C_{1-6}$ alkyl; or $R^1$ and $R^{1'}$ or $R^2$ and $R^{2'}$, together with their intervening atoms, may come together of form an optionally substituted spiro-fused ring; or $R^1$ and $R^2$, together with their intervening atoms, may form an optionally substituted 3- to 7-membered saturated, partially unsaturated, or aryl or heteroaryl ring having 0-2 heteroatoms independently selected from nitrogen, oxygen, or sulfur.

2. The AAV vector according to claim 1, wherein at least one N* is a nitrogen atom of an amino group of a lysine residue of the AAV vector's capsid.

3. The AAV vector according to claim 1, wherein Z comprises or consists of a cell-type specific ligand selected from the group consisting of saccharides, hormones, peptides, proteins or functionally active fragments thereof, membrane receptors or functionally active fragments thereof, antibodies or functionally active fragments thereof, spiegelmers, nucleic acid or peptide aptamers, vitamins, and drugs.

4. The AAV vector according to claim 3, wherein Z is selected from the group consisting of mannose, galactose, fucose, desosamine, N-acetylglucosamine, N-acetylgalactosamine, S6-galactose, S6-N-acetylgalactosamine, glucuronic acid, P6-galactose and P1-galactose.

5. The AAV vector according to claim 1, wherein Z comprises or consists of a steric shielding agent selected from the group consisting of polyethylene glycol, pHPMA, and polysaccharides.

6. The AAV vector according to claim 1, wherein L comprises an optionally substituted group comprising saturated or unsaturated, linear or branched $C_2$-$C_{40}$ hydrocarbon chains, polyethylene glycol, polypropylene glycol, pHPMA, PLGA, polymers of alkylene diamines, and combinations thereof.

7. The AAV vector according to claim 6, wherein L comprises a polyethylene glycol (PEG), comprising 2 to 40 ethylene glycol monomers.

8. The AAV vector according to claim 1, comprising a moiety according to formula (IIa)

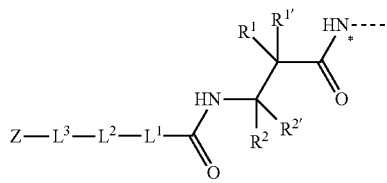

or a pharmaceutically acceptable salt thereof, wherein
L¹ is an optionally substituted aryl or heteroaryl group;
L² is an optionally substituted heteroaryl group; and
L³ is a linker.

9. The AAV vector according to claim 1, comprising a moiety according to formula (IIc):

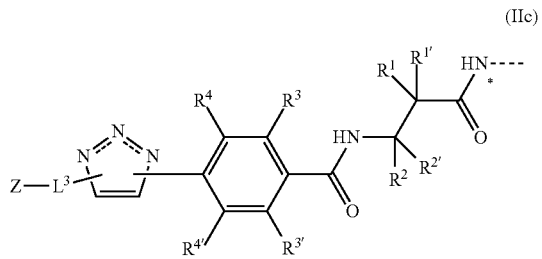

or a pharmaceutically acceptable salt thereof, wherein
L³ is a linker;
$R^3$, $R^{3'}$, $R^4$ and $R^{4'}$ are each independently hydrogen, halogen, —OR, —NR$_2$, —CN, —SR or an optionally substituted group selected from $C_{1-6}$ alkyl or a 3- to 7-membered saturated, partially unsaturated, aryl, or heteroaryl ring having 0-3 heteroatoms independently selected form nitrogen, oxygen, or sulfur; or
$R^3$ and $R^4$, or $R^{3'}$ and $R^{4'}$, together with their intervening atoms, may form an optionally substituted 3- to 7-membered saturated, partially unsaturated, aryl or heteroaryl ring having 0-2 heteroatoms independently selected from nitrogen, oxygen, or sulfur;
each R is independently selected from hydrogen or $C_{1-6}$ alkyl; and
each **** is independently a single or double bond.

10. The AAV vector according to claim 9, wherein L³ is an optionally substituted group selected from the group consisting of saturated or unsaturated, linear or branched $C_2$-$C_{40}$ hydrocarbon chains, polyethylene glycol, polypropylene glycol, pHPMA, PLGA, polymers of alkyl diamines and combinations thereof; preferably L³ is polyethylene glycol.

11. The AAV vector according to claim 1, comprising a moiety according to formula (IIe)

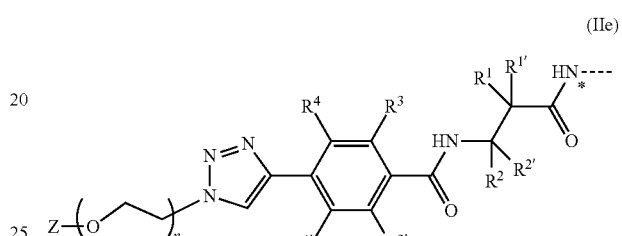

or a pharmaceutically acceptable salt thereof, wherein
$R^3$, $R^{3'}$, $R^4$ and $R^{4'}$ are each independently hydrogen, halogen, —OR, —NR$_2$, —CN, —SR or an optionally substituted group selected from $C_{1-6}$ alkyl or a 3- to 7-membered saturated, partially unsaturated, aryl, or heteroaryl ring having 0-3 heteroatoms independently selected from nitrogen, oxygen, or sulfur; or
$R^3$ and $R^4$, or $R^{3'}$ and $R^{4'}$, together with their intervening atoms, may form an optionally substituted 3- to 7-membered saturated, partially unsaturated, aryl or heteroaryl ring having 0-2 heteroatoms independently selected from nitrogen, oxygen, or sulfur;
each R is independently selected from hydrogen or $C_{1-6}$ alkyl; and
n is an integer ranging from 1 to 20.

12. The AAV vector according to claim 1, comprising:

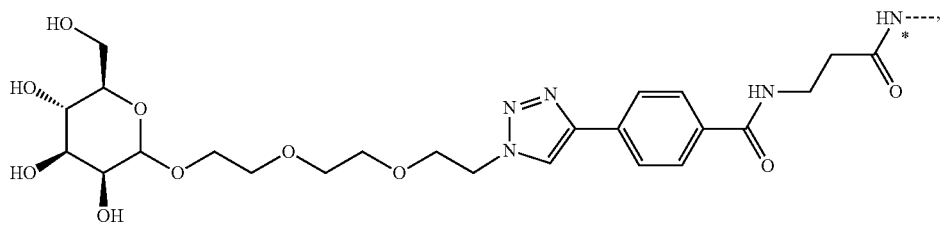

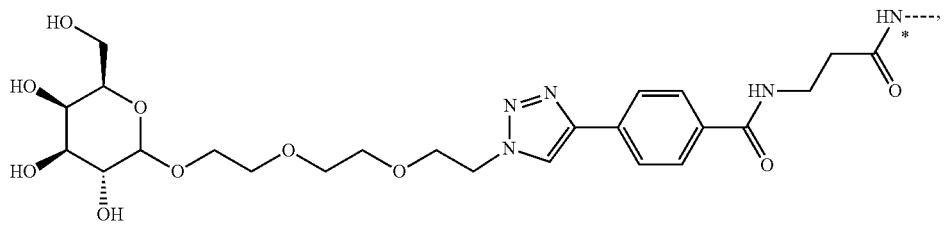

-continued
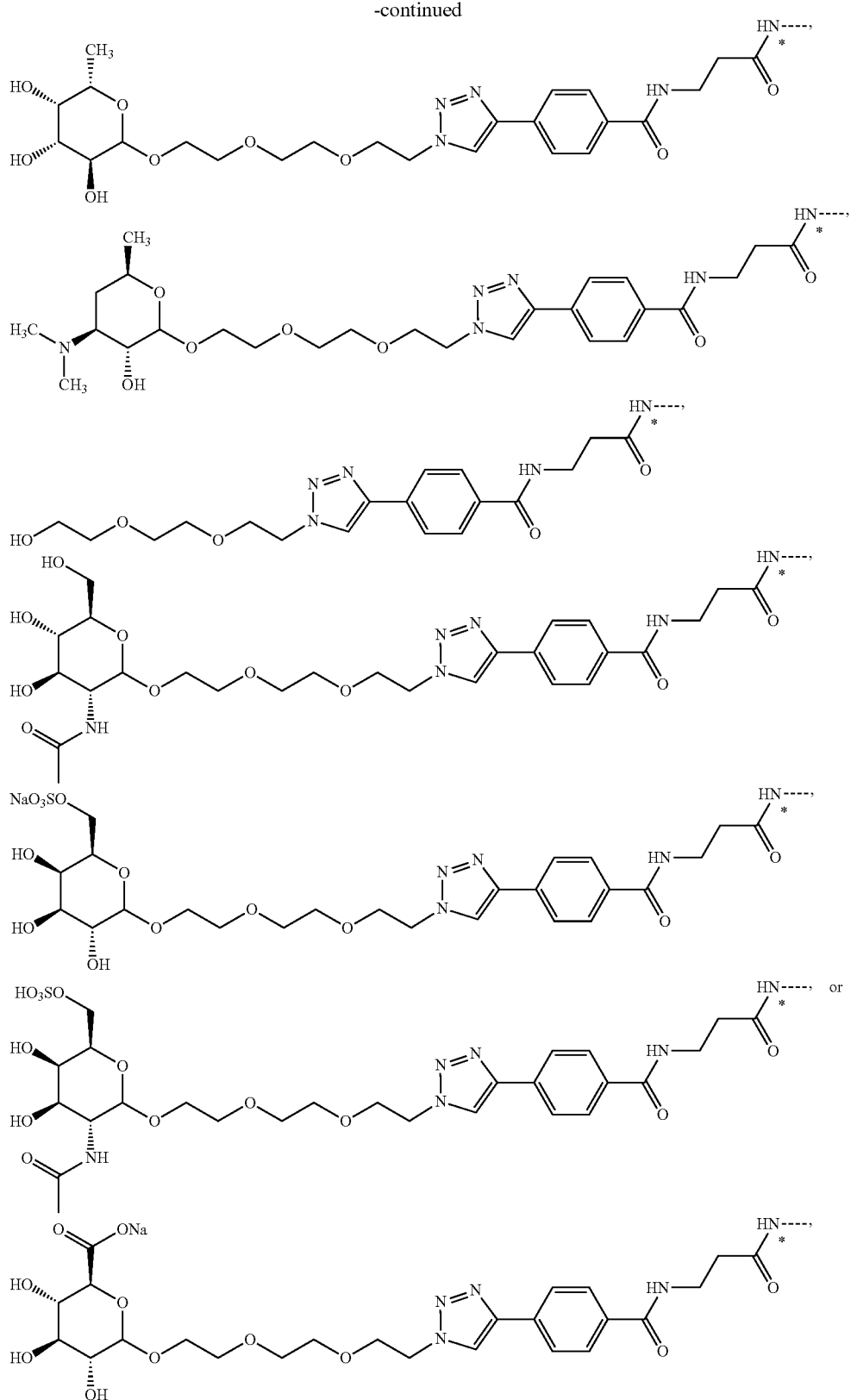
or a pharmaceutically acceptable salt thereof.
13. The AAV vector according to claim 1, wherein said AAV vector is selected from the group consisting of AAV1, AAV2, AAV3, AAV4, AAV5, AAV6, AAV7, AAV8, AAV9, AAV10, AAV11, AAV12, pseudotypes, chimeras, and variants thereof.

14. The AAV vector according to claim 1, wherein said AAV vector comprises at least one transgene, and wherein the transgene is optionally under control of a promoter.

15. The AAV vector according to claim 14, wherein said AAV vector comprises at least one transgene comprising the cDNA from a GBA gene.

16. A pharmaceutical composition comprising an AAV vector according to claim 1 and at least one pharmaceutically acceptable vehicle.

17. The AAV vector according to claim 1, wherein $R^1$, $R^{1'}$, $R^2$ and $R^{2'}$ are hydrogen.

18. The AAV vector according to claim 8, wherein $L^2$ is an optionally substituted 5- or 6-membered heteroaryl group comprising 1-3 heteroatoms independently selected from nitrogen, oxygen, or sulfur.

\* \* \* \* \*